US012795756B2

(12) United States Patent
Wu et al.

(10) Patent No.: US 12,795,756 B2
(45) Date of Patent: Nov. 10, 2026

(54) NETWORK CONNECTION METHOD, RELATED APPARATUS, AND SYSTEM

(71) Applicant: Huawei Technologies Co., Ltd., Shenzhen (CN)

(72) Inventors: Xingchen Wu, Beijing (CN); Wenchao Zhu, Shenzhen (CN); Yuan Wang, Shenzhen (CN); Yufeng Mao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 18/507,861

(22) Filed: Nov. 13, 2023

(65) Prior Publication Data

US 2024/0121840 A1 Apr. 11, 2024

Related U.S. Application Data

(63) Continuation of application No. PCT/CN2022/091682, filed on May 9, 2022.

(30) Foreign Application Priority Data

May 14, 2021 (CN) ........................ 202110526259.X
Jul. 29, 2021 (CN) ........................ 202110867211.5
(Continued)

(51) Int. Cl.
*H04W 76/14* (2018.01)
*H04W 8/22* (2009.01)
(Continued)

(52) U.S. Cl.
CPC ............. *H04W 76/14* (2018.02); *H04W 8/22* (2013.01); *H04W 48/20* (2013.01); *H04W 84/12* (2013.01)

(58) Field of Classification Search
CPC ....... H04W 76/14; H04W 8/22; H04W 8/005; H04W 48/20; H04W 84/12; H04W 12/06;
(Continued)

(56) References Cited

U.S. PATENT DOCUMENTS 9,480,076 B2 * 10/2016 Jung ................... H04W 72/121
2015/0351004 A1 * 12/2015 Ko .......................... H04W 4/80
455/434
(Continued)

FOREIGN PATENT DOCUMENTS

CN 102624729 A 8/2012
CN 106030560 A 10/2016
(Continued)

OTHER PUBLICATIONS

IEEE Std 802.11™—2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Feb. 6, 2012, total 2793 pages.

(Continued)

*Primary Examiner* — Candal Elpenord
(74) *Attorney, Agent, or Firm* — Slater Matsil, LLP

(57) ABSTRACT

This application discloses a network connection method, a related apparatus, and a system. In the method, an electronic device may continuously borrow a network connection capability of another device to continuously access the internet, may temporarily borrow a web capability of another device to access a captive portal wireless network, or may temporarily borrow a network connection capability of another device to activate an eSIM or a blank SIM. According to the method, the electronic device may smoothly connect to the internet by using the network
(Continued)

connection capability or the web capability of the another device, and communicate with the internet, to provide various services for a user.

20 Claims, 35 Drawing Sheets

(30) Foreign Application Priority Data

| | | |
|---|---|---|
| Aug. 6, 2021 | (CN) | 202110900989.1 |
| Aug. 12, 2021 | (CN) | 202110926406.2 |
| Nov. 27, 2021 | (CN) | 202111439016.9 |

(51) Int. Cl.
*H04W 48/20* (2009.01)
*H04W 84/12* (2009.01)

(58) Field of Classification Search
CPC .... H04W 12/069; H04W 12/088; H04L 67/02
USPC .................................................. 370/329–330
See application file for complete search history.

(56) References Cited

U.S. PATENT DOCUMENTS

| | | | | |
|---|---|---|---|---|
| 2016/0156719 | A1 | 6/2016 | Mobarak et al. | |
| 2018/0242135 | A1* | 8/2018 | Lee | H04W 8/005 |
| 2019/0037620 | A1* | 1/2019 | Hamachi | H04W 12/06 |
| 2019/0141786 | A1* | 5/2019 | Park | H04W 4/80 |
| 2020/0092926 | A1* | 3/2020 | Li | H04W 8/005 |
| 2020/0213557 | A1* | 7/2020 | Jeong | H04N 21/6437 |
| 2023/0021994 | A1* | 1/2023 | Gu | H04N 21/43615 |

FOREIGN PATENT DOCUMENTS

| | | |
|---|---|---|
| WO | 2017132961 A1 | 8/2017 |
| WO | 2019140657 A1 | 7/2019 |

OTHER PUBLICATIONS

Harrington, Kendra, "Wi-Fi Peer-to-Peer (P2P) Technical Specification v1.5", Wi-Fi Alliance, Aug. 5, 2014, total 183 pages.

* cited by examiner

CONT. FROM FIG. 2B-1

Terminal device 100–user interface 31

Terminal device 100–user interface 32

Terminal device 300–user interface 41

Terminal device 200–user interface 51

Terminal device 200–user interface 52

Terminal device 200–user interface 53

Terminal device 200–user interface 54

Terminal device 200–user interface 55

NETWORK CONNECTION METHOD, RELATED APPARATUS, AND SYSTEM

CROSS-REFERENCE TO RELATED APPLICATIONS

This application is a continuation of International Application No. PCT/CN2022/091682 filed on May 9, 2022, which claims priority to Chinese Patent Application No. 202110526259.X filed on May 14, 2021, and Chinese Patent Application No. 202110867211.5, filed on Jul. 29, 2021, and Chinese Patent Application No. 202110900989.1, filed on Aug. 6, 2021, and Chinese Patent Application No. 202110926406.2, filed on Aug. 12, 2021 and Chinese Patent Application No. 202111439016.9, filed on Nov. 27, 2021. All of the aforementioned patent applications are hereby incorporated by reference in their entireties.

TECHNICAL FIELD

This application relates to the field of terminal devices and the field of communication technologies, and in particular, to a network connection method, a related apparatus, and a system.

BACKGROUND

With popularization of terminal devices, an individual may have a plurality of terminal devices, for example, a mobile phone, a tablet computer, a large-screen television, a smart sound box, and a smartwatch. Most functions of the terminal device can be used only after the internet is accessed. How the terminal device connects to a network is a research focus in this field.

SUMMARY

This application provides a network connection method, a related apparatus, and a system, so that an electronic device can smoothly connect to the internet, and communicate with the internet.

According to a first aspect, an embodiment of this application provides a network connection method, applied to a communication system including a first device and a second device. The method includes: The first device establishes a first communication connection to the second device, where the first communication connection includes any one of the following: a wireless fidelity peer-to-peer (Wi-Fi P2P) connection, a Bluetooth connection, a near field communication NFC connection, a wired connection, or an Ethernet connection; and the first device communicates with the internet through the second device based on the first communication connection; or the first device sends an activation request to an operator server through the second device based on the first communication connection, and receives a profile sent by the operator server, where the profile is used to activate the first device, and the activated first device has a network connection capability.

According to the network connection method provided in the first aspect, the first device may communicate with the internet or perform an activation operation by using a network connection capability of the second device.

With reference to the first aspect, in a first implementation, the first device is configured to communicate with the internet through the second device based on the first communication connection; and before establishing the first communication connection to the second device, the first device further receives network connection capability information sent by the second device, where the network connection capability information indicates whether the second device connects to a network.

According to the method provided in the first implementation of the first aspect, provided that another device in the communication system can connect to the internet, the electronic device can smoothly connect to the internet by borrowing a network connection capability of the another device.

With reference to the first implementation of the first aspect, in some implementations, the second device may access the internet by using one or more of a WLAN created by a wireless access point, a cellular network, or a wired manner. That is, the second device may share one or more network connection capabilities of the second device with the first device. When the second device shares a plurality of network connection capabilities with the first device, a speed of communication between the first device and the internet can be increased, and user experience can be improved.

With reference to the first implementation of the first aspect, in some implementations, in a process in which the first device communicates with the internet through the second device, the method further includes one or more of the following: The first device connects to a wireless access point AP in the communication system, and accesses the internet by using a wireless local area network WLAN created by the AP; the first device connects to a network device in the communication system, accesses a cellular network through the network device, and accesses the internet by using the cellular network; or the first device accesses the internet in a wired manner.

In the foregoing implementation, when accessing the internet through the second device, the first device may also access the internet, to implement multi-channel network concurrency and increase a speed of communicating with the internet.

With reference to the first implementation of the first aspect, in some implementations, the Wi-Fi P2P connection between the first device and the second device and the connection between the first device and the AP are established by the first device by using a wireless fidelity Wi-Fi network interface controller. That is, even if only one Wi-Fi network interface controller is configured for the electronic device, the electronic device may share a network connection capability of another device by using the method in the first implementation of the first aspect.

With reference to the first implementation of the first aspect, in some implementations, the first device may establish a second communication connection to the second device, and receive, based on the second communication connection, the network connection capability information sent by the second device. After the first device selects the second device, and before the first device communicates with the internet through the second device, the first device may establish the first communication connection to the second device. The first communication connection and the second communication connection are different.

That is, the first device and the second device may use different connections to synchronize the network connection capability information and share the network connection capability.

With reference to the foregoing implementation, the second communication connection includes any one of the following: a communication connection established based on a wireless access point in the communication system, a communication connection established when the second device is in an AP mode, a wireless fidelity peer-to-peer Wi-Fi P2P connection, a Bluetooth connection, a near field communication NFC connection, a wired connection, or a remote connection.

With reference to the first implementation of the first aspect, in some implementations, the first device may establish the first communication connection to the second device, and receive, based on the first communication connection, the network connection capability information sent by the second device.

That is, the first device and the second device may use a same connection to synchronize the network connection capability information and share the network connection capability. In this way, interaction between the devices can be reduced, and network sharing efficiency can be improved.

With reference to the first implementation of the first aspect, in some implementations, before establishing the first communication connection to the second device based on the network connection capability information of the second device, the first device may receive network connection capability information sent by a third device other than the first device and the second device, where the network connection capability information sent by the third device indicates whether the third device connects to a network; and the first device selects the second device from a network-connected device. In this way, the first device may learn whether another device in the communication system connects to a network, and select a proper second device from the network-connected device to borrow a network connection capability of the second device.

With reference to the first implementation of the first aspect, in some implementations, the first device may select the second device from another device in the communication system in any one or more of the following manners.

1. The first device determines, in the network-connected electronic device as the second device, an electronic device selected by a user.

Specifically, the first device displays one or more device options. The device option corresponds to a network-connected device in the another device. The first device receives a first operation performed on the device option, and selects an electronic device corresponding to the device option on which the first operation is performed as the second device.

In the manner 1, the user may independently select the second device based on a requirement, to fully meet an actual requirement of the user and improve user experience.

2. The first device selects a trusted device as the second device from the network-connected electronic device.

The trusted device includes a device that logs in to a same system account as the first device, a device bound to the first device, a device that joins a same group as the first device, or a device that is set by a user.

In the manner 2, the first device may connect to the internet through a trusted and secure electronic device, to ensure data security of the first device and avoid a risk such as data leakage.

3. The first device selects a control device of the first device as the second device from the network-connected electronic device.

4. The network connection capability information further indicates network quality of another device, and the first device selects an electronic device with best network quality as the second device from the another network-connected device.

In this way, a network with best network quality can be shared with the first device, to improve efficiency of accessing the internet by the first device and improve user experience.

5. The first device determines a most recently selected device as the second device.

With reference to the first implementation of the first aspect, in some implementations, the first device may further select a to-be-shared first network connection manner in advance. There may be the following several methods for selecting the first network connection manner.

1. If the first device has a display, the first device may display one or more network connection manner options. The network connection manner option corresponds to a network connection manner, and the network connection manner includes one or more of the following: connecting to a network by using a cellular network or a WLAN, or in a wired manner. The first device receives a second operation performed on the network connection manner option. The first network connection manner is a network connection manner corresponding to the network connection manner option on which the second operation is performed.

2. If the first device does not have an information input/output apparatus, the control device of the first device may select the first network connection manner, and then notify the first device.

3. If the first device does not have a display, the user may enter a voice instruction, and the first device selects the first network connection manner based on the voice instruction.

After determining the first network connection manner, the first device may send indication information of the first network connection manner to the second device, so that the second device uses the first network connection manner to support the first device in communicating with the internet.

With reference to the first implementation of the first aspect, in some implementations, the first device may further select a to-be-shared first network in advance. There may be the following several methods for selecting the first network.

1. If the first device has a display, the first device may display one or more network options. The network option corresponds to a network to which the second device connects and that accesses the internet, and the second device connects to one or more networks that access the internet. The first device receives a third operation performed on the network option. The first network is a network corresponding to the network option on which the third operation is performed.

2. If the first device does not have an information input/output apparatus, the control device of the first device may select the first network, and then notify the first device.

3. If the first device does not have a display, the user may enter a voice instruction, and the first device selects the first network based on the voice instruction.

4. The first device determines a network with best network quality as the first network, determines a network borrowed for a largest quantity of times as the first network, or determines a most recently borrowed network as the first network.

After determining the first network, the first device may send indication information of the first network to the second device, so that the second device uses the first network to support the first device in communicating with the internet.

With reference to the first implementation of the first aspect, in some implementations, the second device may independently determine a first network used to support the first device in communicating with the internet. For example, the first network includes any one or more of the following: a network with best network quality, a most recently selected network, or any network in a network to which the second device connects and that accesses the internet.

With reference to the first implementation of the first aspect, in some implementations, before receiving the network connection capability information sent by the second device, the first device may further enable a first communication service. The first communication service is used by the first device to communicate with the internet through the second device based on the first communication connection to the second device.

A manner of enabling the first communication service may include: The first device receives a fourth operation used to enable the first communication service, and enables the first communication service in response to the fourth operation; or the first device enables the first communication service by default.

With reference to the first implementation of the first aspect, in some implementations, before the first device communicates with the internet through the second device, the first device may send a request message to the second device, where the request message is used by the first device to request to communicate with the internet through the second device; the second device displays third prompt information and a first control in response to the request message, where the third prompt information is used to provide a prompt indicating that the first device requests to communicate with the internet through the second device; and the second device receives a fifth operation performed on the first control, and sends a feedback message to the first device, where the feedback message indicates that the second device agrees to support the first device in communicating with the internet.

In the foregoing implementation, the first device can share the network connection capability of the second device only after the user agrees to share a network, so that the user can have full right to know.

With reference to the first implementation of the first aspect, in some implementations, before the first device communicates with the internet through the second device, the first device may send a request message to the second device, where the request message is used by the first device to request to communicate with the internet through the second device; and after receiving the request message, the second device may determine whether the first device is a trusted device of the second device, and if the first device is a trusted device of the second device, send a feedback message to the first device.

In the foregoing implementation, when the trusted device of the second device initiates the network sharing request, the second device may directly respond to the request, and support the first device in communicating with the internet. In this solution, no user intervention is required, data security of the first device is ensured, and a risk such as data leakage is avoided.

With reference to the first implementation of the first aspect, in some implementations, the communication system further includes a network device and a server. The second device connects to the network device, and accesses a cellular network through the network device. The cellular network accesses the internet. The network device connects to the server. The second device enables a traffic-free service for a first application. The method further includes: The server monitors a data packet transmitted by the second device by using the cellular network; and the server skips calculating traffic fees required for transmitting the data packet from the first application.

In the foregoing implementation, if the second device enables the traffic-free service, when a data packet involved in running of a traffic-free application in the first device is transmitted by using the cellular network of the second device, required traffic fees are not calculated.

With reference to the first aspect, in a second implementation, before sending the activation request to the operator server through the second device based on the first communication connection and receiving the profile sent by the operator server, the first device may further receive an activation instruction sent by the second device. The activation instruction triggers the first device to send the activation request to the operator server.

A subscriber identity module may include an eSIM or a physical blank SIM. The first device may be a first device for which a subscriber identity module is configured, and the second device may be a second device having a network connection capability.

The profile may be specifically an operator profile. The profile may include, for example, but is not limited to a combination of a file system, file content, data, and an application provided on a universal integrated circuit card (UICC), and mainly carries information such as an international mobile subscriber identity (IMSI) and an authentication parameter. After the profile is activated, a mobile network corresponding to the profile may be accessed. In this embodiment of this application, after the profile is activated, the subscriber identity module may connect to the network, and the first device for which the subscriber identity module is configured may be activated, to provide a communication service. The UICC may include a SIM and an eSIM. This is not limited in this application.

According to the method provided in the second implementation of the first aspect, the first device may establish a near field connection to the second device, so that the second device and the first device may serve as two peer network-connected parties, and serve as a server and a client for each other to provide respective services for each other. The first device may obtain the profile from the operator server by using a network of the second device, to activate the first device. In this technical solution, no devices other than the second device and the first device need to participate. This is very convenient, it is easier to meet an activation condition, and user experience is better. In addition, an operator does not need to preset a profile for the eSIM or the blank SIM. This can reduce costs of a device manufacturer and costs of a card manufacturer, and save operator number resources.

With reference to the second implementation of the first aspect, in some possible implementations, the receiving a profile from the operator server through the second device based on the near field connection includes: receiving a fourth data packet from the operator server from the second device based on the near field connection. The fourth data packet is a data packet fed back by the operator server for the activation request, and the fourth data packet carries the profile.

In the foregoing technical solution, the first device may use the second device as a server. After check performed by the operator server on the activation request sent by the first device to the operator server through the second device succeeds, the operator server may send the fourth data packet that carries the profile to the first device through the second device, so that the first device can be successfully activated.

With reference to the second implementation of the first aspect, in some possible implementations, the method further includes: sending management interface data of the first device to the second device based on the near field connection. The management interface data is used to generate a management interface, the management interface is used to enter an activation code and/or setting information, the activation code corresponds to the profile, and the setting information is used to configure a parameter of the first device.

In the foregoing technical solution, the first device may use the second device as a client, and the first device sends the management interface data to the second device based on the near field connection between the first device and the second device, so that the management interface is displayed on the second device, to provide an entry for entering the activation code and/or the setting information for the user, so as to help the user perform an activation operation and/or a setting operation on the first device.

With reference to the second implementation of the first aspect, in some possible implementations, the activation instruction and the activation request carry the activation code.

With reference to the second implementation of the first aspect, in some possible implementations, the method further includes: receiving the setting information from the second device based on the near field connection; and configuring the parameter of the first device based on the setting information.

In the foregoing technical solution, the first device may use the second device as a service end, and may receive the setting information from the second device based on the near field connection to the second device, so that in an activation process, the first device can respond to setting of the first device by the user, and configure the parameter of the first device.

With reference to the second implementation of the first aspect, in some possible implementations, the activation instruction, the activation request, and the profile are activation data, the management interface data and the setting information are setting data, and a transmission path of the activation data is different from a transmission path of the setting data.

In the foregoing technical solution, the first device may perform different processing on activation data and setting data generated by the first device or received from the second device.

With reference to the second implementation of the first aspect, in some possible implementations, that a transmission path of the activation data is different from a transmission path of the setting data includes: A destination address of the activation data is different from a destination address of the setting data.

The destination address of the activation data is different from the destination address of the setting data. The first device may set different destination addresses for the activation data and the setting data generated by the first device, and may further receive the activation data or the setting data from the second device, so that the management interface data of the first device may be sent to the second device, and the activation request of the first device may be sent to the operator server through the second device, to implement activation.

With reference to the second implementation of the first aspect, in some possible implementations, that a transmission path of the activation data is different from a transmission path of the setting data includes a near field connection manner used for transmitting the activation data is different from a near field connection manner used for transmitting the setting data. The near field connection manner includes a Bluetooth connection, a Wi-Fi direct connection, a serial bus (USB) connection, or an Ethernet connection.

When the first device and the second device establish at least two near field connection channels, the near field connection manner used for transmitting the activation data is different from the near field connection manner used for transmitting the setting data. The first device may send the activation data and the setting data generated by the first device to the second device through different near field connection channels, and receive the activation data and the setting data from the second device through different near field connection channels, so that the management interface data of the first device may be sent to the second device, and the activation request of the first device may be sent to the operator server through the second device, to implement activation.

With reference to the second implementation of the first aspect, in some possible implementations, that a transmission path of the activation data is different from a transmission path of the setting data includes: A port through which the activation data is transmitted is different from a port through which the setting data is transmitted.

When each of the first device and the second device has at least two transmission ports, the port through which the activation data is transmitted is different from the port through which the setting data is transmitted. The first device may send the activation data and the setting data generated by the first device to the second device through different ports according to a routing rule, and receive the activation data and the setting data from the second device through different ports, so that the management interface data of the first device may be sent to the second device, and the activation request of the first device may be sent to the operator server through the second device, to implement activation.

In a second implementation of the first aspect, this application provides an access point activation method. The method may be performed by a second device, may be performed by a component (for example, a chip or a chip system) disposed in a second device, or may be implemented by a logical module or software that can implement all or some functions of a second device. This is not limited in this embodiment of this application. The following is merely an example, and the access point activation method provided in this application is described by using the second device as an execution body.

For example, the method includes: sending an activation instruction to an access point, namely, a first device, based on a near field connection to the first device, where the activation instruction is used to download a profile; receiving an activation request from the first device based on the near field connection, where the activation request is used to request to download the profile from an operator server; forwarding the activation request to the operator server; receiving the profile from the operator server; and forwarding the profile to the first device based on the near field connection.

A subscriber identity module may include an eSIM or a physical blank SIM. The second device is a second device having a network connection capability, and the first device may be a first device for which a subscriber identity module is configured.

Based on the foregoing solution, the second device may establish a near field connection to the first device, so that the second device and the first device may serve as two peer network-connected parties, and serve as a server and a client for each other to provide respective services for each other. The second device may obtain the profile from the operator server by using a network of the second device, and forward the profile to the first device, to activate the first device. In this technical solution, no devices other than the second device and the first device need to participate. This is very convenient, it is easier to meet an activation condition, and user experience is better. In addition, an operator does not need to preset a profile for the eSIM or the blank SIM. This can reduce costs of a device manufacturer and costs of a card manufacturer, and save operator number resources.

With reference to the second implementation of the first aspect, in some possible implementations, the receiving the profile from the operator server includes: receiving a fourth data packet from the operator server. The fourth data packet is a data packet fed back by the operator server for the activation request, and the fourth data packet carries the profile.

In the foregoing technical solution, the second device may be used as a server of the first device. After check performed by the operator server on the activation request succeeds, the second device may help the first device receive the fourth data packet that carries the profile from the operator server.

With reference to the second implementation of the first aspect, in some possible implementations, the forwarding the profile to the first device based on the near field connection includes: forwarding the fourth data packet to the first device.

In the foregoing technical solution, the second device may be used as a server of the first device, and the second device may forward the fourth data packet that is received from the operator server and that carries the profile to the first device.

With reference to the second implementation of the first aspect, in some possible implementations, the method further includes: receiving management interface data of the first device from the first device based on the near field connection. The management interface data is used by the second device to display a management interface, the management interface is used to enter an activation code and/or setting information, the activation code corresponds to the profile, and the setting information is used to configure a parameter of the first device.

In the foregoing technical solution, the second device may be used as a client of the first device, receive the management interface data of the first device from the first device based on the near field connection to the first device, and display the management interface of the first device, to provide an entry for entering the activation code and/or the setting information for a user, so as to help the user perform an activation operation and/or a setting operation on the first device.

With reference to the second implementation of the first aspect, in some possible implementations, the activation instruction and the activation request carry the activation code.

With reference to the second implementation of the first aspect, in some possible implementations, the method further includes: sending the setting information to the first device based on the near field connection.

In the foregoing technical solution, the second device may be used as a server of the first device, and may send the setting information to the first device based on the near field connection to the first device in response to the setting operation performed by the user in the management interface of the first device, so that in an activation process, the first device can receive the setting information of the user for the first device.

With reference to the second implementation of the first aspect, in some possible implementations, that a transmission path of activation data is different from a transmission path of setting data includes: A destination address of the activation data is different from a destination address of the setting data.

The destination address of the activation data is different from the destination address of the setting data. The second device may set different destination addresses for activation data and setting data generated by the second device, and may further process or forward activation data or setting data sent by the first device and the operator server, so that the second device can receive the management interface data of the first device that is sent by the first device, and help the first device forward the activation request of the first device to the operator server, to implement activation.

With reference to the second implementation of the first aspect, in some possible implementations, that a transmission path of activation data is different from a transmission path of setting data includes: A near field connection manner used for transmitting the activation data is different from a near field connection manner used for transmitting the setting data. The near field connection manner includes a Bluetooth connection, a Wi-Fi direct connection, a serial bus (universal serial bus, USB) connection, or an Ethernet connection.

When the second device and the first device establish at least two near field connection channels, the near field connection manner used for transmitting the activation data is different from the near field connection manner used for transmitting the setting data. The second device may send activation data and setting data generated by the second device to the first device by using different near field connections, receive activation data and setting data from the first device through different near field connection channels, process the received setting data, and help the first device forward the received activation data to the operator server, to implement activation.

With reference to the second implementation of the first aspect, in some possible implementations, that a transmission path of activation data is different from a transmission path of setting data includes: A port through which the activation data is transmitted is different from a port through which the setting data is transmitted.

When each of the second device and the first device has at least two transmission ports, the port through which the activation data is transmitted is different from the port through which the setting data is transmitted. The second device may send activation data and setting data generated by the second device to the first device through different ports, receive activation data and setting data from the first device through different ports, process the received setting data, and help the first device forward the received activation data to the operator server, to implement activation.

According to a second aspect, this application provides a network connection method. The method is applied to a first device. The method includes an operation performed by the first device in any one of the first aspect or the possible implementations of the first aspect. For details, refer to the foregoing descriptions. Details are not described herein.

According to a third aspect, this application provides a network connection method. The method is applied to a second device. The method includes an operation performed by the second device in any one of the first aspect or the possible implementations of the first aspect. For details, refer to the foregoing descriptions. Details are not described herein.

According to a fourth aspect, this application provides a network connection method. The method is applied to a communication system including a fourth device, a fifth device, and an AP device. The method includes: The AP device is configured to: provide a captive portal wireless network, and send a first data packet to the fourth device after receiving an access request of the fourth device. The first data packet includes page data of a portal website, and the portal website is a login authentication website corresponding to the captive portal wireless network. The fourth device is configured to: obtain the first data packet sent by the AP device, and forward the first data packet to the fifth device. The fifth device is configured to: display a portal website page based on the page data of the portal website in the received first data packet, generate a second data packet corresponding to a login confirmation operation after detecting a fifth operation performed by a user on the portal website page, and send the second data packet to the fourth device. The fourth device is further configured to: receive the second data packet sent by the fifth device, forward the second data packet to the AP device, and determine that login authentication for the captive portal wireless network is completed.

According to the network connection method provided in the fourth aspect, the fourth device that does not have a web capability can display a login authentication page of the portal website by using a web capability of the fifth device, and complete login authentication for captive portal Wi-Fi, to access captive portal Wi-Fi.

With reference to the fourth aspect, that the fourth device determines that login authentication for the captive portal wireless network is completed includes: The fourth device determines, based on a first preset occasion, that login authentication for the captive portal wireless network is completed. The first preset occasion includes one or more of the following content: a state of a received data packet sent by the AP device or a data packet sent by the fifth device is a state indicating that sending of a hypertext transfer protocol HTTP data packet is disabled, a preset period, a preset time point, or a signal that is sent by the fifth device and that is used for confirming completion of login authentication is received.

In some implementations, in a process of forwarding the data packets sent by the AP device and the fifth device, the fourth device may determine, based on a preset login confirmation occasion, whether login authentication is completed, and after determining that login authentication is completed, access captive portal Wi-Fi provided by the AP device.

With reference to any one of the fourth aspect or the implementations of the fourth aspect, that the fourth device determines that login authentication for the captive portal wireless network is completed includes: The fourth device determines, in a first preset manner, that login authentication for the captive portal wireless network is completed. The first preset manner includes: after an HTTP request is sent to the AP device, if a received HTTP status code is not 302, it is determined that login authentication for the captive portal wireless network is completed; and/or after at least two domain name system DNS query requests with different domain names are sent to the AP device, if different internet protocol IP addresses corresponding to the at least two DNS query requests with different domain names are received, it is determined that login authentication for the captive portal wireless network is completed.

In some implementations, if the network provided by the AP device is captive portal Wi-Fi, a redirection technology preconfigured in the AP device includes an HTTP redirection technology or a DNS redirection technology. Therefore, the fourth device can quickly determine, in the first preset manner by using a received request response sent by the AP device, whether the network provided by the AP device is captive portal Wi-Fi. Further, network type determining efficiency can be improved, and network type determining difficulty can be reduced.

With reference to any one of the fourth aspect or the implementations of the fourth aspect, before the fourth device forwards the first data packet to the fifth device, the method further includes: The fourth device establishes a communication connection to the fifth device having a world wide web capability. That the fifth device has a web capability includes that HTTP or the hypertext transfer protocol secure HTTPS is supported, and a web application is installed.

In some implementations, when the fourth device does not have a web capability, and wants to access captive portal Wi-Fi, the fourth device needs to use the web capability of the fifth device. Therefore, after determining that a network type of the to-be-accessed network is captive portal Wi-Fi, the fourth device needs to establish a communication connection to the fifth device having a web capability, to transmit a data packet in a subsequent login authentication process.

With reference to any one of the fourth aspect or the implementations of the fourth aspect, the method further includes: The fourth device sends a disconnection signal to the fifth device. The disconnection signal is used to disconnect the communication connection to the fifth device.

In this way, after completing login authentication by using the web capability of the fifth device, the fourth device disconnects the communication connection to the fifth device, to independently access captive portal Wi-Fi.

With reference to any one of the fourth aspect or the implementations of the fourth aspect, that the fourth device obtains the first data packet sent by the AP device includes: The fourth device sends a network access request to the AP device, where the network access request carries at least one HTTP request and/or at least two DNS query requests with different domain names; receives a third data packet sent by the AP device, where the third data packet includes an address of the portal website; determines that the network provided by the AP device is the captive portal wireless network, and sends an access request of the portal website to the AP device, where the access request carries the address of the portal website; and receives the first data packet sent by the AP device.

In some implementations, when the fourth device needs to access a network, the fourth device needs to send an access request to a network hotspot. In addition, based on the fact that a redirection technology applied when the network provided by the AP device is captive portal Wi-Fi includes the HTTP redirection technology or the DNS redirection technology, the network access request carries at least one HTTP request and/or at least two DNS query requests with different domain names, so that the network type provided by the AP device can be determined based on a network access response.

With reference to any one of the fourth aspect or the implementations of the fourth aspect, the third data packet further includes an HTTP status code, and that the fourth device determines that the network provided by the AP device is the captive portal wireless network includes: If determining that the HTTP status code is 302, the fourth device determines that the network provided by the AP device is the captive portal wireless network.

With reference to any one of the fourth aspect or the implementations of the fourth aspect, that the fourth device determines that the network provided by the AP device is the captive portal wireless network includes: If determining that addresses in the third data packet are a same IP address, the fourth device determines that the network provided by the AP device is the captive portal wireless network.

According to the fourth aspect, after the fifth device sends the second data packet to the fourth device, the method further includes: The fifth device sends a signal for confirming completion of login authentication to the fourth device in response to a seventh operation performed by the user.

According to any one of the fourth aspect or the implementations of the fourth aspect, the fifth device has a world wide web (web) capability; that the fifth device has a web capability includes that the fifth device supports the hypertext transfer protocol HTTP or the hypertext transfer protocol secure HTTPS, and a web application is installed; and before the receiving the first data packet sent by the fourth device, the method further includes: establishing a communication connection to the fourth device.

According to any one of the fourth aspect or the implementations of the fourth aspect, the method further includes the fifth device receives a disconnection signal sent by the fourth device. The disconnection signal is used to disconnect the communication connection to the fourth device.

According to a fifth aspect, this application provides a network connection method. The method is applied to a fourth device. The method includes an operation performed by the fourth device in any one of the fourth aspect or the possible implementations of the fourth aspect. For details, refer to the foregoing descriptions. Details are not described herein.

According to a sixth aspect, this application provides a network connection method. The method is applied to a fifth device. The method includes an operation performed by the fifth device in any one of the fourth aspect or the possible implementations of the fourth aspect. For details, refer to the foregoing descriptions. Details are not described herein.

According to a seventh aspect, this application provides an electronic device, including a memory and one or more processors. The memory is coupled to the one or more processors. The memory is configured to store computer program code, and the computer program code includes computer instructions. The one or more processors invoke the computer instructions to enable the electronic device to perform the method in any one of the second aspect or the implementations of the second aspect, any one of the third aspect or the implementations of the third aspect, any one of the fifth aspect or the implementations of the fifth aspect, or any one of the sixth aspect or the implementations of the sixth aspect.

According to an eighth aspect, this application provides a communication system, including a first device and a second device. The first device is configured to perform the method in any one of the second aspect or the implementations of the second aspect, and the second device is configured to perform the method in any one of the third aspect or the implementations of the third aspect.

According to a ninth aspect, this application provides a communication system, including a fourth device and a fifth device. The fourth device is configured to perform the method in any one of the fifth aspect or the implementations of the fifth aspect, and the fifth device is configured to perform the method in any one of the sixth aspect or the implementations of the sixth aspect.

According to a tenth aspect, this application provides a computer-readable storage medium, including instructions. When the instructions run on an electronic device, the electronic device is enabled to perform the method in any one of the second aspect or the implementations of the second aspect, any one of the third aspect or the implementations of the third aspect, any one of the fifth aspect or the implementations of the fifth aspect, or any one of the sixth aspect or the implementations of the sixth aspect.

According to an eleventh aspect, this application provides a computer program product. When the computer program product runs on a computer, the computer is enabled to perform the method in any one of the second aspect or the implementations of the second aspect, any one of the third aspect or the implementations of the third aspect, any one of the fifth aspect or the implementations of the fifth aspect, or any one of the sixth aspect or the implementations of the sixth aspect.

According to a twelfth aspect, this application provides a circuit system. The circuit system includes a processing circuit. The processing circuit is configured to perform the method in any one of the first aspect or the implementations of the first aspect; or the processing circuit is configured to perform the method in any one of the second aspect or the implementations of the second aspect, any one of the third aspect or the implementations of the third aspect, any one of the fifth aspect or the implementations of the fifth aspect, or any one of the sixth aspect or the implementations of the sixth aspect.

According to a thirteenth aspect, this application provides a chip system, including at least one processor and at least one interface circuit. The at least one interface circuit is configured to: perform a sending and receiving function, and send instructions to the at least one processor. When the at least one processor executes the instructions, the at least one processor performs the method in any one of the second aspect or the implementations of the second aspect, any one of the third aspect or the implementations of the third aspect, any one of the fifth aspect or the implementations of the fifth aspect, or any one of the sixth aspect or the implementations of the sixth aspect.

According to the embodiments provided in this application, the electronic device can smoothly connect to the internet, and communicate with the internet.

BRIEF DESCRIPTION OF THE DRAWINGS

FIG. 2B-1 and FIG. 2B-2 are a diagram of a software architecture of a terminal device according to an embodiment of this application;

DETAILED DESCRIPTION OF ILLUSTRATIVE EMBODIMENTS

Figure 1:
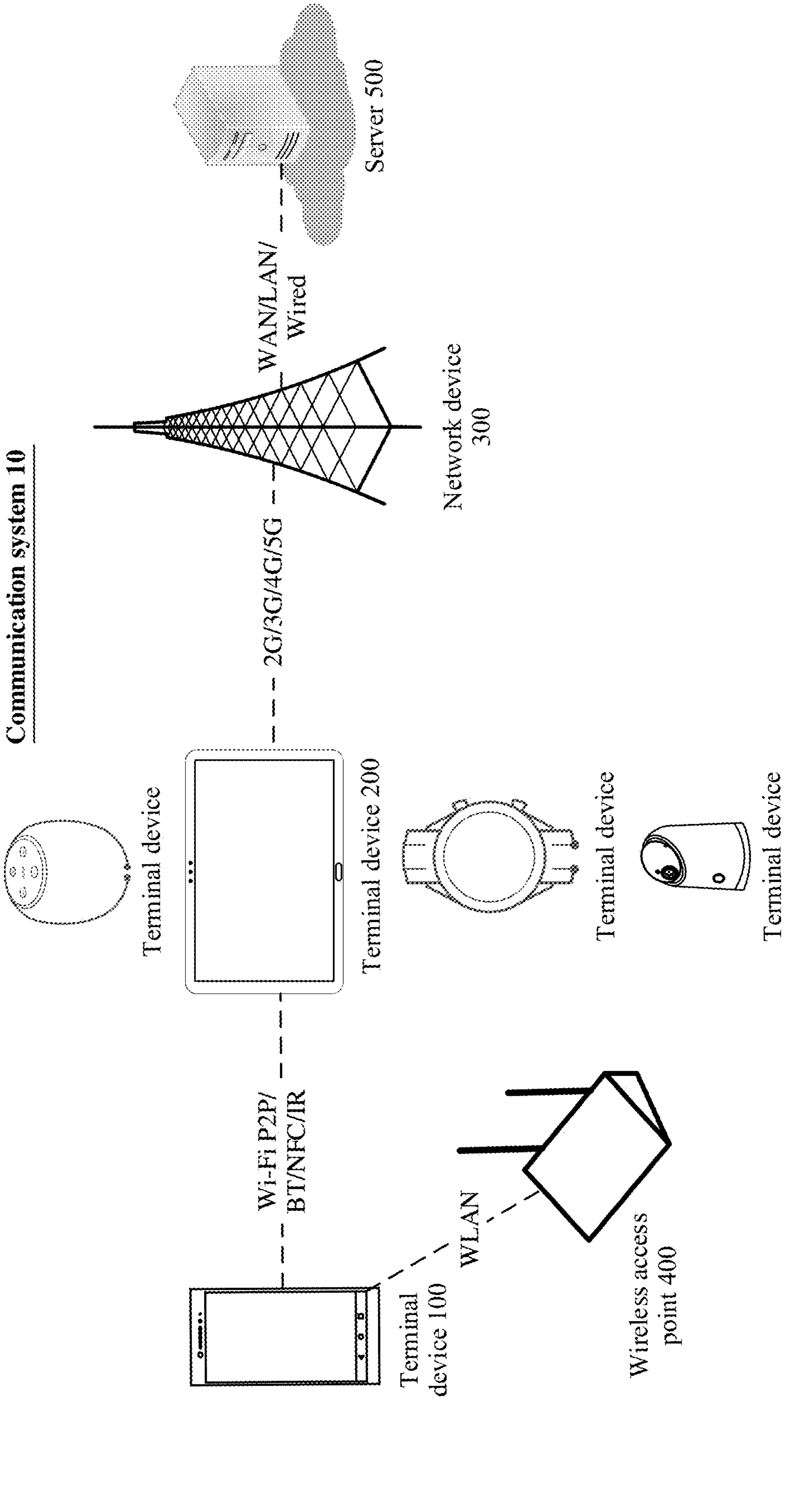
FIG. 1 is a diagram of an architecture of a communication system according to an embodiment of this application.

The following clearly describes technical solutions in embodiments of this application with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the descriptions of embodiments of this application, unless otherwise specified, "a plurality of" means two or more.

A term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (XML). The interface source code is parsed and rendered on a terminal device, and finally presented as content that can be identified by the user. The user interface is usually represented in a form of a graphical user interface (GUI), and is a user interface that is related to a computer operation and that is graphically displayed. The user interface may be a visual interface element such as text, an icon, a button, a menu, a tab, a text box, a dialog box, a status bar, a navigation bar, or a widget that is displayed on a display of the terminal device.

The following embodiments of this application provide a network connection method, a related apparatus, and a system. In the network connection method, an electronic device may smoothly connect to the internet by using a capability of another device, and communicate with the internet. The capability that is of the another device and that is used by the electronic device may include, for example, a network connection capability and a web capability. The electronic device may include a terminal device such as a mobile phone, a tablet computer, a large-screen television, a smart sound box, a smartwatch, or an in-vehicle infotainment, and may further include a device that may be used as a wireless access point (AP), for example, a router or customer premises equipment (CPE).

The internet is a collection of information and resources, and may be formed by interconnecting a plurality of subnets. The internet is configured to provide functions such as information search, query, and communication.

After connecting to a network, different electronic devices can communicate with the internet and provide different functions for a user.

For example, after connecting to a network, a terminal device such as a mobile phone, a tablet computer, a large-screen television, a smart sound box, a smartwatch, or an in-vehicle infotainment may provide various services, for example, music playing, video playing, navigation, and a game.

After connecting to a network, a device used as an AP, for example, a router or CPE, may send a wireless fidelity (Wi-Fi) signal, and enable a terminal device that receives the Wi-Fi signal to connect to the network through the AP.

With popularization of terminal devices, an individual may have a plurality of terminal devices. Most functions of the terminal device can be used only after the internet is accessed. The terminal device may connect to a wireless local area network (WLAN) through an AP, may directly connect to a cellular network, or may access the internet by borrowing a cellular network connection capability of another device by using a hotspot.

However, only one set of components, for example, a Wi-Fi network interface controller and an antenna, configured to receive and send a Wi-Fi signal is usually configured for the terminal device. If the terminal device connects to a WLAN generated by a wireless access point, the terminal device cannot borrow a cellular network of another device by using a hotspot.

In the network connection method provided in embodiments of this application, the terminal device may establish a communication connection to another device in a manner different from a hotspot, and the another device connects to the internet. Then, the terminal device may communicate with the internet through the another device based on the communication connection. That is, the terminal device may continuously borrow a network connection capability of the another device to connect to the internet. In this way, provided that another device near the terminal device connects to the internet, the terminal device may connect to the internet by borrowing a network connection capability of the another device. In some other embodiments, the terminal device may connect to the internet by borrowing a network connection capability of a remote device. The network connection capability is a capability of connecting to and accessing the internet.

The AP may be used to provide a public captive portal wireless network (captive portal Wi-Fi) for a user in public places such as an airport, a station, a shopping mall, and a cafe, to meet a network use requirement of the user and ensure network security. Herein, captive portal Wi-Fi is an open wireless network that provides security authentication. When the terminal device used as a station (STA) device requests to access captive portal Wi-Fi, the AP intercepts the request of the STA device, and provides a login portal page for specific authentication or user license agreement description. After determining that the STA device completes authentication or agrees to the license agreement, the AP allows the STA device to access captive portal Wi-Fi. Therefore, the STA device needs to have a world wide web (Web) capability to display a login portal page, complete user authentication or agree to a license agreement, and implement network access. However, some devices that do not have a web capability cannot access captive portal Wi-Fi. Consequently, the network use requirement of the user cannot be met, and user experience is affected.

In the network connection method provided in embodiments of this application, when a terminal device that does not have a web capability needs to access captive portal Wi-Fi, the terminal device may temporarily use a web capability of another terminal device to complete authentication, and access captive portal Wi-Fi, to meet a requirement of a user for different terminal devices to access captive portal Wi-Fi, and improve user experience.

An electronic device that supports an embedded subscriber identity module (eSIM) or a physical blank subscriber identity module (SIM), for example, an AP (for example, CPE), a smartwatch, a smart band, or an in-vehicle infotainment, can use, by using the eSIM or the blank SIM only after the eSIM or the blank SIM is activated, a network (for example, a cellular network) provided by a communication service operator. Usually, a device such as CPE creates a WLAN by using a hotspot, and another device such as a mobile phone connects to the WLAN to log in to a management interface of the CPE, to provide an entry for a user to perform an operation of activating an eSIM or a blank SIM. In addition, the device such as the CPE needs to access a network to complete activation. However, due to a limitation of a hotspot communication protocol, when the CPE is used as a server and a terminal device such as a mobile phone is used as a client to access the management interface of the CPE, the CPE cannot reversely access a network capability of the terminal device such as the mobile phone. Therefore, the device such as the CPE further needs to access the network through another device such as a router. That is, when the device such as the CPE activates the eSIM or the blank SIM, at least two other devices (for example, a mobile phone and a router) are required. One device is used to log in to a management interface of the device such as the CPE, and the other device is used to provide an initial network connection capability for the device such as the CPE. In this activation manner, there are many and complex operation steps, a large quantity of devices are involved, an activation condition is strict, and user experience is poor.

In the network connection method provided in embodiments of this application, an electronic device that supports an eSIM or a blank SIM, for example, CPE, a smartwatch, a smart band, or an in-vehicle infotainment, may establish a connection to a network-connected terminal device, the device such as the CPE may serve as a server to provide a management interface for the terminal device, and the terminal device may serve as a server to provide a network connection capability for the device such as the CPE, so that the device such as the CPE may connect to a network to activate the eSIM or the blank SIM. According to the network connection method, the electronic device that supports the eSIM or the blank SIM may temporarily borrow a network connection capability of another terminal device to successfully activate the eSIM or the blank SIM. In this method, no other devices need to participate. This is very convenient, it is easier to meet an activation condition, and user experience is better.

The following describes in detail the network connection method provided in embodiments of this application.

How a terminal device continuously borrows a network connection capability of another device to connect to a network is first described.

In the network connection method provided in embodiments of this application, the terminal device may establish a communication connection to another device in a manner different from a hotspot, and the another device connects to the internet. Then, the terminal device may communicate with the internet by borrowing a network connection capability of the another device based on the communication connection.

In embodiments of this application, a terminal device that borrows a network connection capability of another device may also be referred to as a client, a primary device, or a host, and another device that provides a network connection capability may also be referred to as a server, an auxiliary device, or an auxiliary machine. For ease of description, subsequently, the terminal device that borrows a network connection capability of another device is referred to as a first device, and the another device that provides a network connection capability is referred to as a second device.

A communication connection established by the first device to the second device in a manner different from a hotspot may include any one of the following: a wireless fidelity direct (Wi-Fi direct)/wireless fidelity peer-to-peer (Wi-Fi peer-to-peer, Wi-Fi P2P) connection, a Bluetooth (BT) connection, a near field communication (NFC) connection, an infrared (IR) connection, a wired connection, an Ethernet connection, a remote connection, or the like. The Bluetooth connection may be a classic Bluetooth connection, or may be a Bluetooth low energy (BLE) connection. The remote connection means that the first device and the second device each connect to a server and communicate with each other through the server.

The hotspot is a technology in which a cellular network signal received by a terminal device is converted into a Wi-Fi signal for sending. Establishing a connection by using a hotspot means that a terminal device works in an AP mode and creates a wireless local area network, and then another terminal device connects to the wireless local area network created by the terminal device, to establish a connection to the terminal device.

The second device may access the internet by using one or more of a WLAN created by a wireless access point, a cellular network, or a wired manner, and then the first device may access the internet by using the communication connection to the second device and a connection between the second device and the internet. That is, the second device may share one or more network connection capabilities of the second device with the first device. When the second device shares a plurality of network connection capabilities with the first device, a speed of communication between the first device and the internet can be increased, and user experience can be improved.

In the network connection method, in a process in which the first device establishes a communication connection to and communicates with the second device, the first device may further access the internet by using one or more of a WLAN created by a wireless access point, a cellular network, or a wired manner. The first device establishes a connection to the second device in a manner different from a hotspot. Therefore, the first device may simultaneously access the internet by using the WLAN created by the wireless access point. That is, the first device accesses the internet, which imposes no impact on borrowing, by the first device, a network connection capability of the second device. In this way, when accessing the internet through the second device, the first device may also access the internet, to implement multi-channel network concurrency and increase a speed of communicating with the internet.

FIG. 1 is a diagram of an architecture of a communication system 10 according to an embodiment of this application.

As shown in FIG. 1, the communication system 10 includes a plurality of terminal devices, for example, a terminal device 100 and a terminal device 200, and further includes one or more network devices 300 and one or more APs 400.

The plurality of terminal devices, for example, the terminal device 100 or the terminal device 200, in the communication system 10 may be of various types. A specific type of the terminal device 100 or the terminal device 200 is not limited in this embodiment of this application. For example, the terminal device 100 or the terminal device 200 may include a mobile phone, may further include a tablet computer, a desktop computer, a laptop computer, a handheld computer, a notebook computer, a large-screen television, a smart screen, a wearable device, an augmented reality (AR) device, a virtual reality (VR) device, an artificial intelligence (AI) device, an in-vehicle infotainment, a smart headset, and a game console, and may further include an internet of things (IoT) device or a smart home device such as a smart sound box, a smart lamp, a smart air conditioner, a smart water heater, or a camera. This is not limited thereto. The terminal device 100 may further include a non-portable terminal device such as a laptop computer (laptop) having a touch-sensitive surface or a touch panel or a desktop computer having a touch-sensitive surface or a touch panel.

Different software operating systems (OS) may be configured for the plurality of terminal devices in the communication system 10, and include but are not limited to Harmony OS, Android®, iOS®, Windows®, Linux®, and the like. A same software operating system may alternatively be configured for the plurality of terminal devices, for example, Harmony OS may be configured for the plurality of terminal devices.

The plurality of terminal devices in the communication system 10 may communicate with each other by using any one or more of the following technologies: Wi-Fi softAP, a WLAN, BT, Wi-Fi P2P, NFC, IR, a wired technology, or a remote communication technology. For example, the Wi-Fi softAP technology is the same as the hotspot. A terminal device may be implemented as a wireless access point by using software. After another device accesses a WLAN generated by the wireless access point, the terminal device may communicate with the another device by using Wi-Fi softAP. For another example, the terminal device may communicate with another device in a same wireless local area network by using a wireless local area network (WLAN). For another example, the terminal device may discover another nearby device by using a short-range communication technology such as BT or NFC, and communicate with the another device after establishing a communication connection to the another device. For another example, the plurality of terminal devices may log in to a same account, for example, log in to a same system account (for example, a Huawei account), then communicate, by using a cellular network technology such as 3G, 4G, or 5G or a wide area network technology, with a server (for example, a server provided by Huawei) that maintains the system account, and then communicate through the server.

It may be learned that the plurality of terminal devices in the communication system 10 may be terminal devices at a short distance, or may be terminal devices at a long distance.

The network device 300 is provided by a communication service operator, and is configured to communicate with the terminal device by using an air interface technology. The air interface technology may include 2G (for example, a global system for mobile communications (GSM)), 3G (for example, a universal mobile telecommunications system (UMTS), wideband code division multiple access (WCDMA), time division-synchronous code division multiple access (TD-SCDMA)), long term evolution (LTE)/4G, and a new radio access technology (new radio access technology, New RAT), for example, 4.5G, 5G, and future 6G.

The network device 300 may be a base transceiver station (BTS) in GSM or CDMA, may be a NodeB in WCDMA, or may be an evolved NodeB (eNB) or a relay station in LTE, an access network device in a 5G network, an access network device in a public land mobile network (PLMN), or the like.

The network device 300 is responsible for connecting the terminal device to a core network by using a wired or wireless communication technology, and providing a connection between the terminal device and the internet. The network device 300, the core network, and the terminal device construct a cellular network.

The wireless access point 400 may be a router, CPE, a gateway, a bridge, or the like.

The wireless access point 400 is configured to create a WLAN. In some embodiments, the wireless access point 400 may be configured to create a captive portal wireless network (captive portal Wi-Fi). After joining the network created by the wireless access point 400, the terminal device may connect to the internet through the wireless access point 400.

A device such as a router, a gateway, or a bridge may be configured to convert a wired network into a wireless WLAN, to facilitate access by the terminal device.

The CPE is configured to: receive a mobile signal (namely, a cellular network signal) sent by the network device 300, and forward the mobile signal in a form of a Wi-Fi signal. The CPE may simultaneously provide Wi-Fi signals for a plurality of terminal devices, may further enhance the Wi-Fi signals for a second time, and is a widely applied access device.

In this embodiment of this application, the terminal device 100 may learn of network connection capability information of another terminal device in the communication system 10 based on communication between terminal devices. The network connection capability information indicates whether the terminal device connects to a network, and may further indicate one or more of a network connection manner of the terminal device, an identifier of a network to which the terminal device connects and that accesses the internet, and quality of the network to which the terminal device connects and that accesses the internet. Specifically, each device may learn of the network connection capability information of the another terminal device by using one or more of a wireless technology such as Wi-Fi P2P, a Wi-Fi software access point (softAP), a WLAN, BT, NFC, or IR, a wired technology, or a remote connection technology.

Then, the terminal device 100 determines, in a network-connected terminal device, a terminal device that provides a network connection capability. The terminal device that is determined by the terminal device 100 and that provides the network connection capability may be referred to as the terminal device 200. For a policy of determining, by the terminal device 100, the terminal device that provides the network connection capability, refer to detailed descriptions in subsequent method embodiments. Details are not described herein. After the terminal device that provides the network connection capability is determined, a communication connection, for example, a Wi-Fi direct/Wi-Fi P2P connection, a BT connection, an NFC connection, an IR connection, a wired connection, an Ethernet connection, or a remote connection, may be established between the terminal device 100 and the terminal device 200 in a manner different from a hotspot. Herein, the connection that is established between the terminal device 100 and the terminal device 200 and that is different from the hotspot manner may be the same as or different from a communication connection established when the terminal device 100 obtains network connection capability information of the terminal device 200. If the communication connection established when the terminal device 100 obtains the network connection capability information of the terminal device 200 is a connection different from the hotspot manner, after selecting the terminal device 200, the terminal device 100 may not need to establish another communication connection.

The terminal device 200 connects to the internet. The terminal device 200 may access the WLAN created by the wireless access point 400, and connect to the internet through the wireless access point 400. The terminal device 200 may alternatively connect to the network device 300, and connect to the internet by using the cellular network. The terminal device 200 may alternatively connect to the internet in a wired manner, for example, by using a network cable. In addition, the terminal device 200 may connect to the internet by using a combination of any several of the foregoing manners.

The terminal device 100 is configured to: access the internet based on the communication connection to the terminal device 200 and a connection between the second device and the internet, and communicate with the internet.

In a process in which the terminal device 100 establishes a communication connection to and communicates with the terminal device 200, the terminal device 100 may also access the internet. The terminal device 100 may access the WLAN created by the wireless access point 400, and connect to the internet through the wireless access point 400. The terminal device 100 may alternatively connect to the network device 300, and connect to the internet by using the cellular network. The terminal device 100 may alternatively connect to the internet in a wired manner, for example, by using a network cable. In addition, the terminal device 100 may connect to the internet by using a combination of any several of the foregoing manners. The terminal device 100 and the terminal device 200 may connect to different wireless access points 400, or may connect to different network devices 300.

In some embodiments, the communication system 10 may further include a server 500 provided by the communication service operator. The server 500 may connect to the network device 300 in a wired or wireless manner, for example, by using a wide area network (WAN) technology or a local area network (LAN) technology. The server 500 may be configured to monitor an amount of data transmitted by the terminal device by using the cellular network, that is, may monitor an amount of data transmitted by the terminal device through the network device 300. The server 500 may charge each terminal device based on a detected amount of data transmitted by the terminal device. The communication service operator is a provider of the network device 300.

In some embodiments, the server 500 may perform traffic-free processing on a data packet that is from a traffic-free application and that is transmitted by the terminal device 200 through the network device 300, that is, waive fees required for transmitting the data packet. A data packet involved in communication of the terminal device 200 includes a data packet from the terminal device 100.

For example, in a process in which the terminal device 100 communicates with the internet through the terminal device 200, an involved data packet may further carry an identifier of an application or other information about an application (for example, an identifier or an address of a server that provides a service for the application). If the data packet is from a traffic-free application, the server 500 may waive fees required for transmitting the data packet. For descriptions of the traffic-free application, refer to descriptions in subsequent method embodiments.

The server 500 and the network device 300 may alternatively be combined into a same device. This is not limited herein. For example, the network device 300 may further perform an operation performed by the server 500.

For specific functions of the devices in the communication system 10, refer to detailed descriptions in subsequent method embodiments.

The communication system 10 shown in FIG. 1 is merely an example. In specific implementation, the communication system 10 may further include more devices. This is not limited herein. The communication system 10 may also be referred to as another term such as a distributed system. This is not limited herein.

Figure 2A:
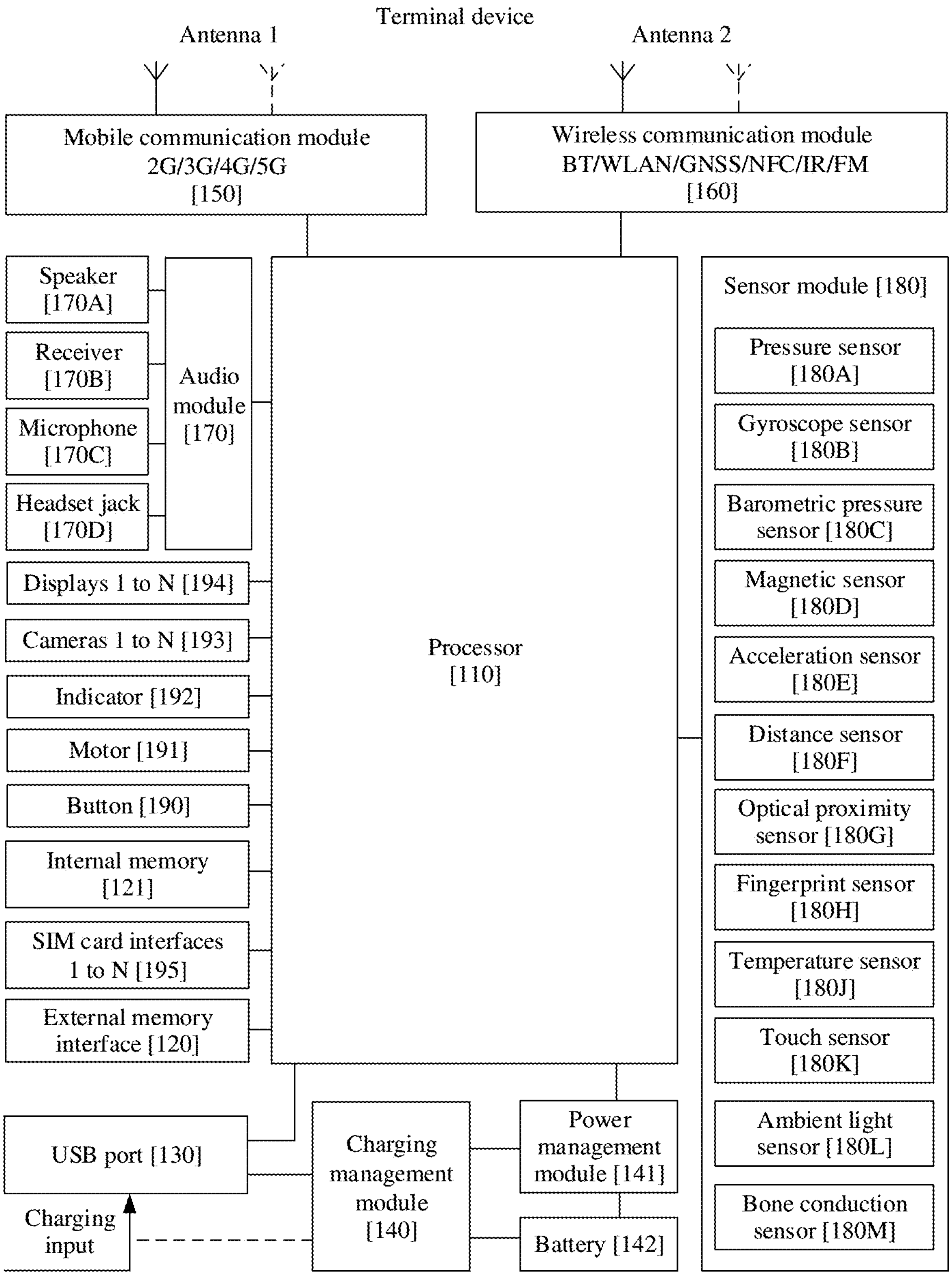
FIG. 2A is a diagram of a hardware structure of a terminal device according to an embodiment of this application.

FIG. 2A is a schematic diagram of a structure of a terminal device according to an embodiment of this application. The terminal device may be the terminal device 100 or the terminal device 200 in the communication system shown in FIG. 1.

The terminal device may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, and reduces a waiting time of the processor 110, and therefore improves system efficiency.

A wireless communication function of the terminal device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the terminal device and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the terminal device and that includes a wireless local area network (WLAN) (for example, a Wi-Fi network), Bluetooth (BT), a global navigation satellite system (GNSS), frequency modulation (FM), a near field communication (NFC) technology, an infrared (IR) technology, or the like. The wireless communication module 160 may be one or more components into which at least one communication processing module is integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal device, the antenna 1 is coupled to the mobile communication module 150, and the antenna 2 is coupled to the wireless communication module 160, so that the terminal device may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In this embodiment of this application, the terminal device may include one or more network interface controllers (NICs). The network interface controller is equipped with a built-in processor and memory, configured to perform operations such as data encapsulation and decapsulation, link management, and encoding and decoding.

The network interface controller may also be referred to as a network interface card, a physical network interface controller, a physical network interface card, or the like.

The network interface controller in the terminal device in this embodiment of this application may include any one or more of the following.

1. Wi-Fi Network Interface Controller in the Wireless Communication Module 160

The Wi-Fi network interface controller supports standards such as 802.11a, 802.11b, 802.11g, and 802.11n formulated by the Institute of Electrical and Electronics Engineers (IEEE) and the Wi-Fi P2P technical specification formulated by the Wi-Fi Alliance. The Wi-Fi network interface controller supports the terminal device in communicating with another device by using the foregoing standard.

In some embodiments, some Wi-Fi network interface controllers may support only standards such as 802.11a, 802.11b, 802.11g, and 802.11n, and some other Wi-Fi network interface controllers may support only the Wi-Fi P2P technical specification.

Standards such as 802.11a, 802.11b, 802.11g, and 802.11n support the terminal device in connecting to a wireless local area network created by a wireless access point 400, and further support the terminal device in connecting to a wireless local area network created when another device works in an AP mode. The Wi-Fi P2P technology specification supports the terminal device in establishing a Wi-Fi P2P connection to another device. One Wi-Fi network interface controller can simultaneously support the terminal device in connecting to a wireless local area network and establishing a Wi-Fi P2P connection to another device.

One Wi-Fi network interface controller cannot simultaneously support the terminal device in connecting to two or more wireless local area networks, and supports the terminal device in connecting to only one WLAN at a time. Therefore, one Wi-Fi network interface controller cannot connect to the WLAN created when the another device works in the AP mode while connecting to the WLAN created by the wireless access point 400.

In some embodiments, the Wi-Fi network interface controller may further support a Bluetooth wireless communication technology standard formulated by the IEEE, for example, 802.15. The Bluetooth standard supports the terminal device in communicating with another device by using a Bluetooth technology.

2. Cellular Network Interface Controller in the Mobile Communication Module 150

The cellular network interface controller supports standards such as GSM, GPRS, CDMA, WCDMA, TD-SCDMA, LTE, and NR. The cellular network interface controller supports the terminal device in communicating with another device by using the foregoing standard.

3. Wired Network Interface Controller

The wired network interface controller refers to an optical Ethernet adapter, which is also referred to as an optical network interface controller. The wired network interface controller connects to a network cable, and communicates with another device through the network cable. The wired network interface controller supports an Ethernet standard, and supports the terminal device in communicating with another device by using the Ethernet standard.

The terminal device implements a display function by using the GPU, the display 194, the application processor, and the like. The GPU is a microprocessor for image processing, and connects to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD). The display panel may alternatively be manufactured by using an organic light-emitting diode (OLED), an active-matrix organic light emitting diode (AMOLED), a flexible light-emitting diode (flex light-emitting diode, FLED), a mini LED, a micro LED, a micro OLED, a quantum dot light emitting diode (QLED), or the like. In some embodiments, the terminal device may include one or N displays 194, where N is a positive integer greater than 1.

The terminal device may implement a photographing function by using the ISP, the camera 193, the video codec, the GPU, the display 194, the application processor, and the like.

The internal memory 121 may include one or more random access memories (random access memory, RAM) and one or more nonvolatile memories (nonvolatile memory, NVM).

The random access memory may include a static random access memory (SRAM), a dynamic random access memory (DRAM), a synchronous dynamic random access memory (SDRAM), a double data rate synchronous dynamic random access memory (double data rate synchronous dynamic random access memory, DDR SDRAM, for example, a fifth generation DDR SDRAM is usually referred to as a DDR5 SDRAM), and the like. The nonvolatile memory may include a magnetic disk storage device, a flash memory, and the like.

The random access memory may be directly read and written by the processor 110, may be configured to store an operating system or an executable program (for example, machine instructions) of another program that is running, and may be further configured to store data of a user, data of an application, and the like.

The nonvolatile memory may also store an executable program, data of a user, data of an application, and the like, which may be loaded into the random access memory in advance for directly reading and writing by the processor 110.

The terminal device may implement an audio function, for example, music playing and recording, by using the audio module 170, the speaker 170A, the receiver 170B, the microphone 170C, the headset jack 170D, the application processor, and the like.

The SIM card interface 195 is configured to connect to a SIM card. The SIM card may be inserted into the SIM card interface 195 or removed from the SIM card interface 195, to come into contact with and be separated from the terminal device. The terminal device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The terminal device interacts with a network by using the SIM card, to implement functions such as a call and data communication. In some embodiments, the terminal device uses an eSIM, namely, an embedded SIM card. The eSIM card may be embedded into the terminal device, and cannot be separated from the terminal device.

The plurality of SIM cards may belong to different communication service operators, or may belong to a same communication service operator. The terminal device interacts, by using the SIM card, with a network device 300 provided by a communication service operator to which the SIM card belongs, to communicate with a cellular network, and implement functions such as a call and data communication.

Different SIM cards have different identifiers. The identifier of the SIM card may be, for example, an international mobile subscriber identity (IMSI) or a communication number (for example, a mobile phone number) bound to the SIM card.

It may be understood that the structure shown in this embodiment of this application does not constitute a specific limitation on the terminal device. In some other embodiments of this application, the terminal device may include more or fewer components than those shown in the figure, some components may be combined, some components may be split, or a different component arrangement may be used. For example, the terminal device shown in FIG. 2A may not have a component such as a display. The components shown in the figure may be implemented by hardware, software, or a combination of software and hardware.

When the terminal device shown in FIG. 2A is the terminal device 100, details are as follows:

The wireless communication module 160 or the mobile communication module 150 may be configured to obtain network connection capability information of another terminal device in a communication system 10.

The internal memory 121 is configured to store network connection capability information of the terminal device 100, and is further configured to store network connection capability information of another terminal device that is obtained by the terminal device 100.

The processor 110 is configured to select a terminal device as the terminal device 200 from a network-connected terminal device in the communication system 10.

The wireless communication module 160 or the mobile communication module 150 is further configured to: establish a communication connection to the terminal device 200 in a manner different from a hotspot, and communicate with the internet through the terminal device 200 based on the communication connection, to the terminal device 200, that is different from the hotspot.

The display 194 may be configured to display a user interface that is implemented on the terminal device 100 and that is provided in subsequent method embodiments.

For details about steps performed by modules in the terminal device 100, refer to detailed descriptions in subsequent method embodiments.

When the terminal device shown in FIG. 2A is the terminal device 200, details are as follows:

The wireless communication module 160 or the mobile communication module 150 may be configured to send network connection capability information of the terminal device 200 to another terminal device, including the terminal device 100, in a communication system 10.

The internal memory 121 is configured to store the network connection capability information of the terminal device 200, and is further configured to store network connection capability information of another terminal device that is obtained by the terminal device 200.

The wireless communication module 160 or the mobile communication module 150 is further configured to: establish a communication connection to the terminal device 100 in a manner different from a hotspot, and support the terminal device 100 in communicating with the internet based on the communication connection, to the terminal device 100, that is different from the hotspot.

The display 194 may be configured to display a user interface that is implemented on the terminal device 200 and that is provided in subsequent method embodiments.

For details about steps performed by modules in the terminal device 200, refer to detailed descriptions in subsequent method embodiments.

A software system of a terminal device may use a layered architecture, an event-driven architecture, a microkernel architecture, a micro service architecture, or a cloud architecture. The software system of the terminal device includes but is not limited to Harmony OS, Android®, iOS®, Windows®, Linux®, Unix®, MacOS®, and the like. In embodiments of this application, an Android system of a layered architecture is used as an example to describe a software structure of the terminal device. However, this is not limited in this application.

Figures 1, 2B:
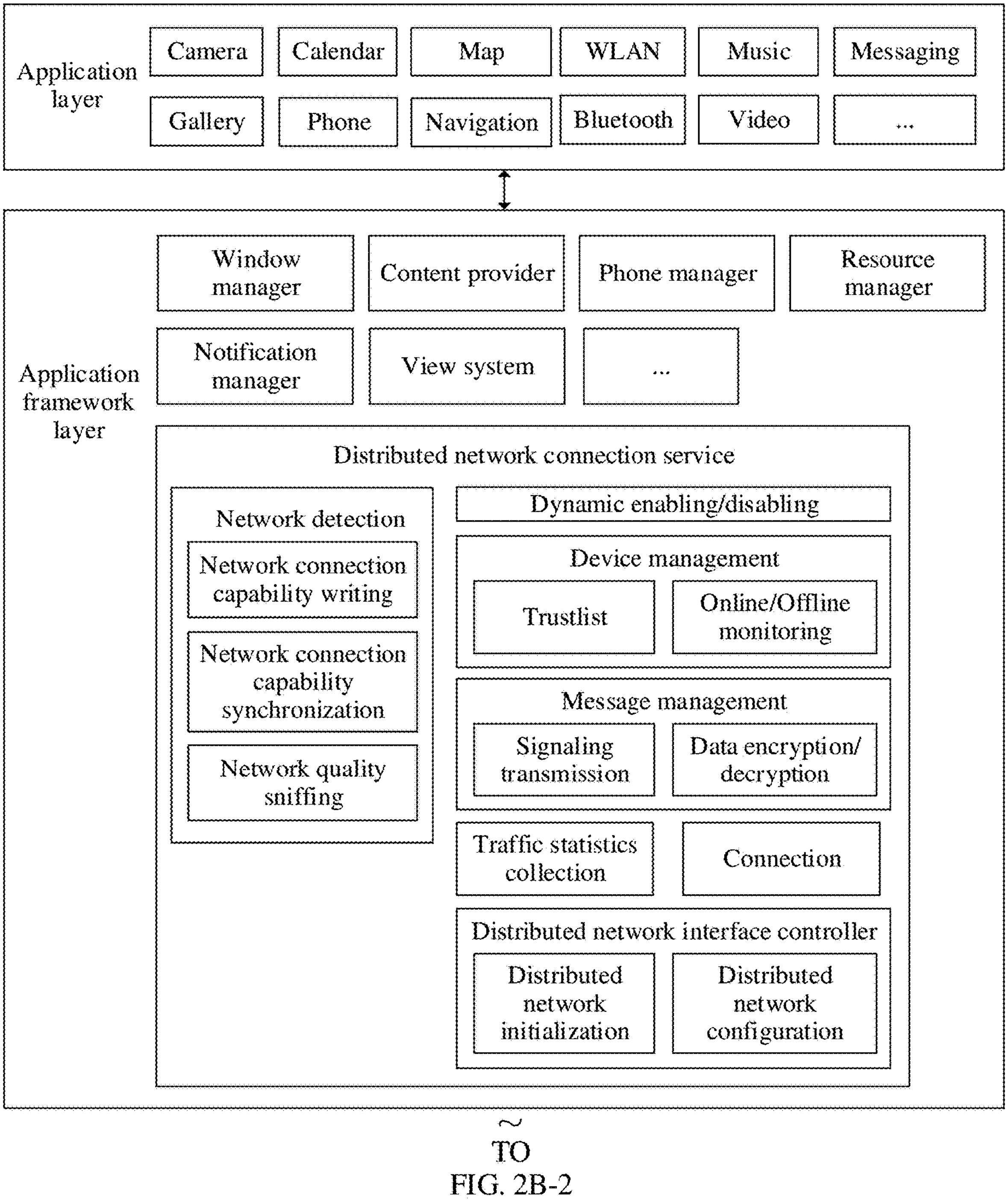
Figures 2, 2B:
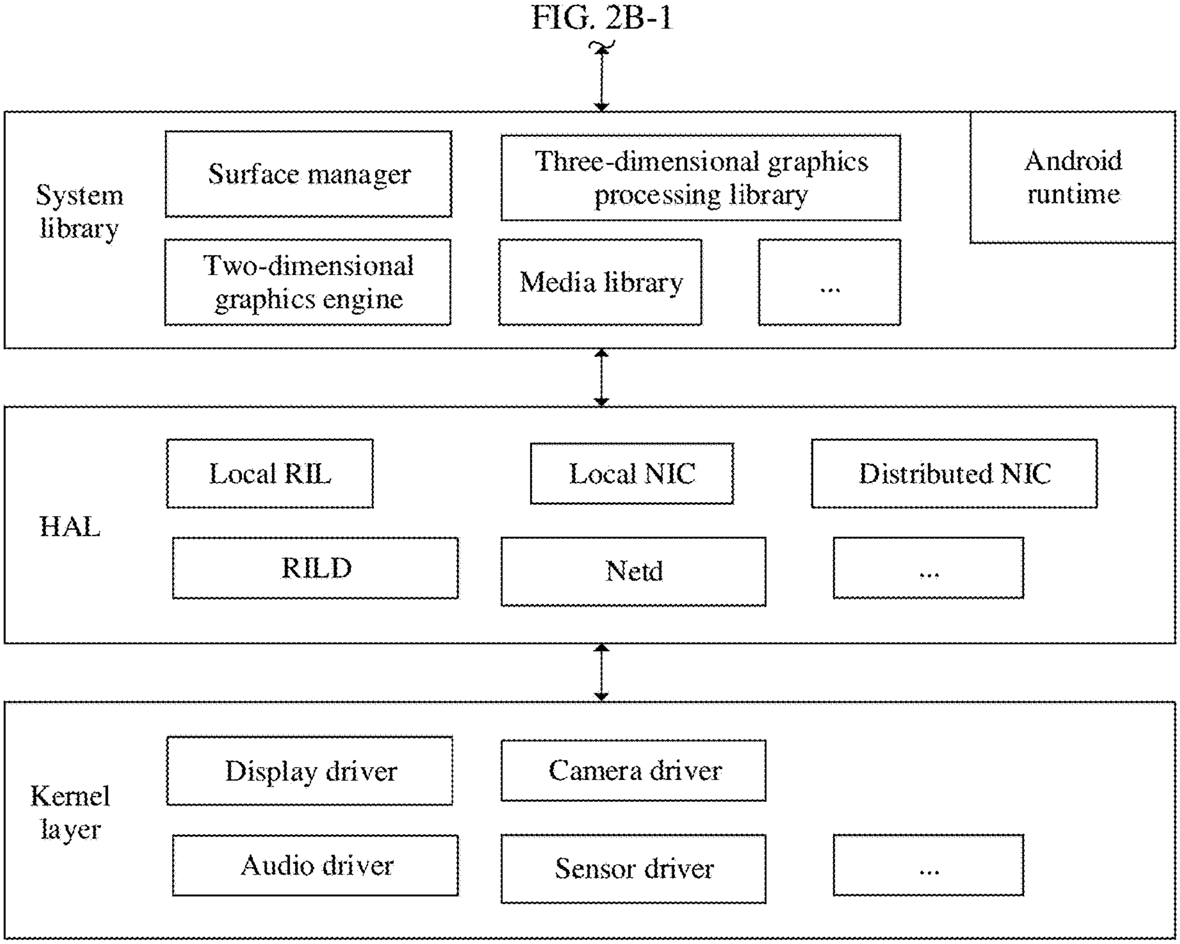

FIG. 2B-1 and FIG. 2B-2 are a block diagram of a software structure of a terminal device according to an embodiment of this application. The terminal device may be the terminal device 100 or the terminal device 200 in the communication system shown in FIG. 1.

In a layered architecture, software is divided into several layers, and each layer has a clear role and task. The layers communicate with each other through a software interface. In some embodiments, an Android system is divided into five layers: an application layer, an application framework layer, an Android runtime and system library, a hardware abstraction layer (HAL), and a kernel layer from top to bottom.

The application layer may include a series of application packages.

As shown in FIG. 2B-1 and FIG. 2B-2, the application packages may include applications such as Camera, Gallery, Calendar, Phone, Map, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 2B-1 and FIG. 2B-2, the application framework layer may include a distributed network connection service, a system service (SystemService), a connectivity service (ConnectivityService), a window manager, a content provider, a view system, a phone manager, a resource manager, a notification manager, and the like.

The distributed network connection service is used to provide a connection between the terminal device and another device, and support the terminal device in accessing the internet by using the connection.

The distributed network connection service may include the following several modules: a network detection module, a dynamic enabling/disabling module, a device management module, a message management module, a traffic statistics collection module, a connection module, and a distributed network interface controller module.

The network detection module is configured to detect and synchronize a network connection capability. The network detection module may specifically include a network connection capability writing module, a network connection capability synchronization module, and a network quality sniffing module. The network connection capability writing module is configured to obtain a network connection capability of the terminal device. The network connection capability synchronization module is configured to send network connection capability information of the terminal device to another terminal device in the communication system 10, and is further configured to receive network connection capability information sent by the another terminal device. The network quality sniffing module is configured to detect network quality of the terminal device.

The dynamic enabling/disabling module is responsible for managing enabling or disabling of the "distributed network connection" service. For example, when the terminal device 100 needs to connect to a network, but currently no network such as Wi-Fi or cellular is available, the dynamic enabling/disabling module automatically enables the "distributed network connection" service, to attempt to borrow a network connection capability of another device. For another example, if the terminal device 100 is currently borrowing a network connection capability of another device, but the another device suddenly loses the network connection capability, the dynamic enabling/disabling module searches around for another device that can connect to a network, and borrows a network connection capability of the another device.

The device management module is configured to manage another device associated with the terminal device. The device management module may specifically include a device trustlist module and an online/offline monitoring module. The device trustlist module is configured to manage a trustlist. The trustlist may include one or more devices. For specific implementation of the trustlist, refer to detailed descriptions in subsequent method embodiments. The online/offline monitoring module is responsible for sensing a device in the communication system 10 in which the terminal device 100 is located, for example, monitoring a device joining or leaving the communication system 10.

The message management module is configured to transmit a message. The message management module may include a signaling transmission module configured to transmit signaling and a data encryption/decryption module configured to encrypt/decrypt data.

The traffic statistics collection module is configured to collect statistics on an amount of data transmitted by the terminal device by using a cellular network. Specifically, the traffic statistics collection module may collect statistics on an amount of data transmitted when the terminal device accesses the cellular network, or may collect statistics on an amount of data transmitted when the terminal device accesses the cellular network through another terminal device.

The connection module may be configured to create a communication connection between the terminal device and another terminal device in a manner other than a hotspot. For example, the connection module may be a P2P module or a Wi-Fi P2P service, and is configured to establish a Wi-Fi P2P connection between two terminal devices.

The distributed network interface controller module may include a distributed network connection initialization module and a distributed network connection configuration module. The distributed network connection initialization module is configured to: establish, inside the terminal device 100, a distributed network that can sense an application, that is, notify each application that the application currently can borrow a network connection capability of another device to communicate with the internet, and bind the distributed network to the connection module, so that each application can borrow the network connection capability of the another device to access the internet. The distributed network connection configuration module is configured to obtain network configuration information, for example, an internet protocol (internet protocol, IP) address, a domain name, and a network connection status, of another device from which the terminal device borrows a network connection capability.

In the modules of the distributed network connection service, the network detection module may further belong to the connectivity service, and the dynamic enabling/disabling module, the device management module, the message management module, the traffic statistics collection module, the connection module, and the distributed network interface controller module may further belong to the system service.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying text and a control for displaying a picture. The view system may be configured to construct an application. A display interface may include one or more views. For example, a display interface including a short message service message notification icon may include a text display view and a picture display view.

The phone manager is configured to provide a communication function of the terminal device, for example, management of a call status (including answering, declining, or the like).

The resource manager provides various resources such as a localized string, an icon, a picture, a layout file, and a video file for an application.

The notification manager enables an application to display notification information in a status bar, and may be configured to convey a notification message that may automatically disappear after a short pause and require no user interaction. For example, the notification manager is configured to: notify download completion, provide a message notification, and the like. The notification manager may alternatively be a notification that appears in a top status bar of the system in a form of a graph or scroll bar text, for example, a notification of an application running in background or a notification that appears on a screen in a form of a dialog window. For example, text information is displayed in the status bar, an alert tone is made, the terminal device vibrates, or an indicator light flashes.

The Android runtime includes a kernel library and a virtual machine. The Android runtime is responsible for scheduling and management of the Android system.

The HAL is an interface layer between a kernel and hardware, and provides an interface for invoking hardware of the terminal device. The HAL may include a plurality of modules, and each module implements a set of interfaces for a particular type of hardware. When the application framework layer invokes the hardware of the terminal device, the terminal device may load a corresponding module in the HAL. For example, the HAL layer may include a local RIL, an RILD, a Netd, a local NIC, a distributed NIC, and the like. The local RIL and the RILD are bridges for communication between telephony and a modem. The Netd is a background daemon program specifically responsible for network management and control. The local NIC provides an interface for invoking a network interface controller to connect the terminal device to the internet. The distributed NIC provides an interface for invoking a network interface controller to connect the terminal device to the internet by borrowing a network connection capability of another device.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playing and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes, with reference to a series of user interfaces provided in an example of this application, the network connection method provided in embodiments of this application.

FIG. 3A to FIG. 3I show examples of user interfaces involved when a terminal device 100 having a display borrows a network connection capability of another device.

In a possible implementation, the device that provides the network connection capability for the terminal device 100 may be a trusted device of the terminal device 100. The trusted device may include but is not limited to at least one of the following devices: a device that logs in to a same account or home account as the terminal device 100, a device bound to the terminal device 100, a device that joins a same group (for example, a family group) as the terminal device 100, a device authenticated by the terminal device 100 through scanning, a device used by a contact added by the terminal device 100, a device that is preset by a user to which the terminal device 100 belongs, a device located in a same local area network as the terminal device 100, a device that is set by a user, or the like. The trusted device provides the network connection capability for the terminal device 100, to improve data security of the terminal device 100 and avoid a risk of data leakage.

In some other embodiments, the device that provides the network connection capability for the terminal device 100 may be a device in a communication system 10 in which the terminal device 100 is located, for example, may be a device, in the communication system 10, selected by a user, or may be a device, in the communication system 10, selected by the terminal device 100 by default.

Figure 3A:
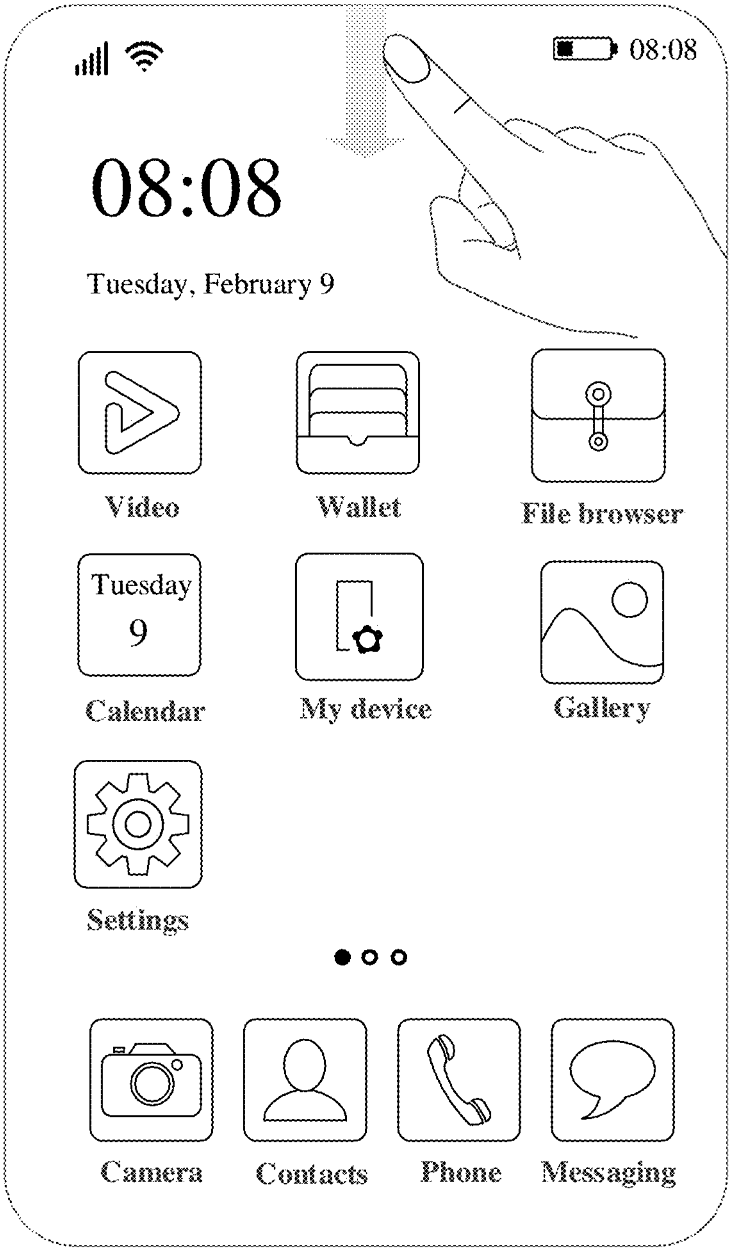
FIG. 3A to FIG. 3I, FIG. 4A to FIG. 4C, and FIG. 5A to FIG. 5E show a series of user interfaces according to an embodiment of this application.

FIG. 3A shows an example user interface 31 that is on the terminal device 100 and that is used to display an installed application.

A status bar, a calendar and time indicator, a weather indicator, a page indicator, a tray that includes a frequently used application icon, and other application icons are displayed in the user interface 31.

The status bar may include one or more signal strength indicators of a mobile communication signal (which may also be referred to as a cellular signal), a Bluetooth indicator, one or more signal strength indicators of a Wi-Fi signal, a battery status indicator, a time indicator, and the like. The calendar and time indicator indicates a calendar and current time.

The weather indicator indicates weather.

The page indicator may indicate a specific page on which a user is currently browsing an application icon. In this embodiment of this application, application icons may be distributed on a plurality of pages, and the user may slide to the left or to the right to browse application icons on different pages.

Icons of frequently used applications, for example, a phone icon, a messaging icon, a camera icon, and a contacts icon, may be displayed in the tray that includes a frequently used application icon.

The other application icons are used to display icons of some applications installed in the terminal device, for example, may include an icon of a video application, an icon of a wallet, an icon of a file browser, an icon of a calendar, an icon of a device management application, an icon of a settings application, and an icon of a gallery application.

This is not limited thereto. The user interface 31 shown in FIG. 3A may further include a navigation bar, a sidebar, and the like. In some embodiments, the user interface 31 shown as an example in FIG. 3A may be referred to as a home screen.

Figure 3B:
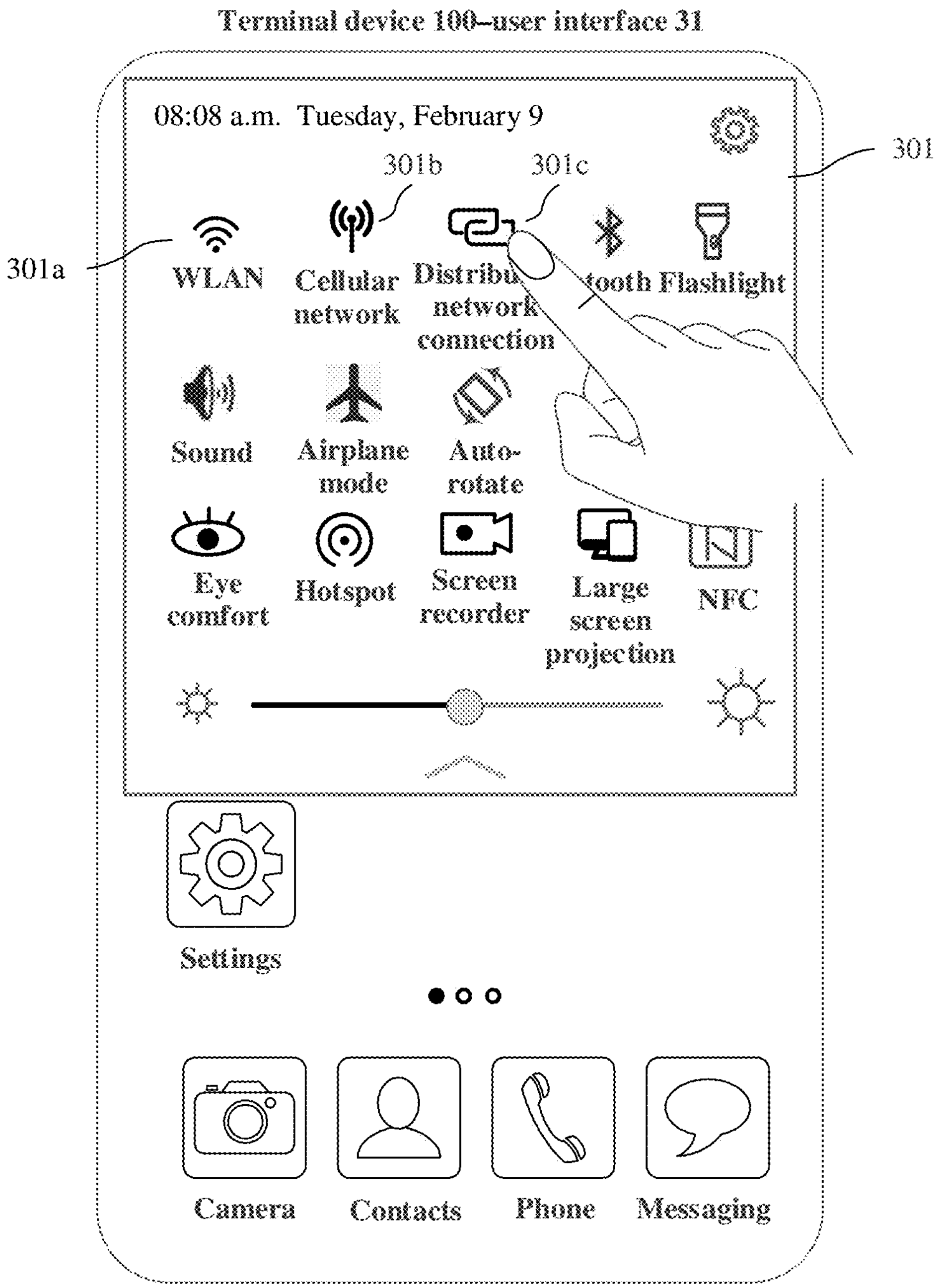
Figure 3C:
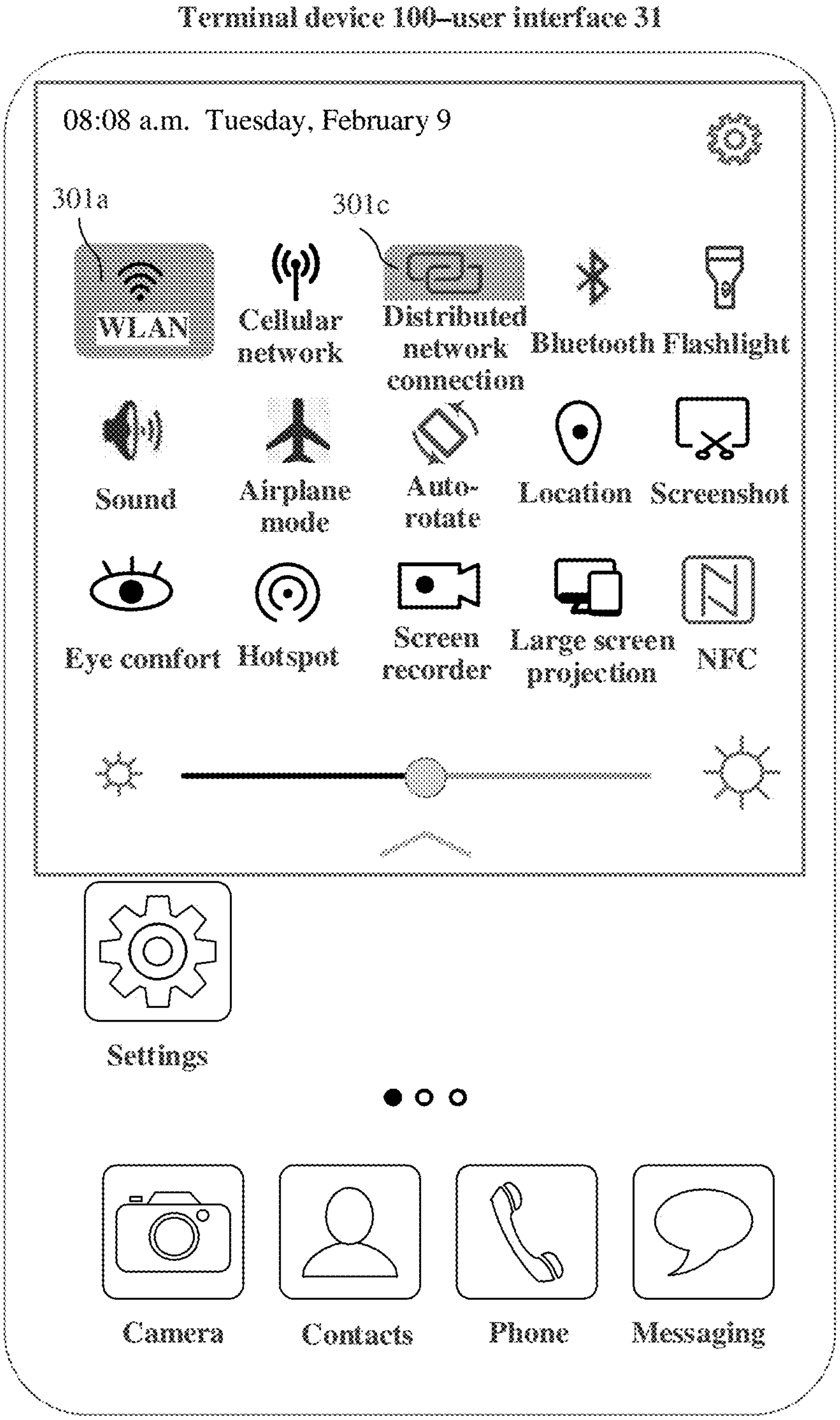

FIG. 3B and FIG. 3C show a manner in which the terminal device 100 borrows a network connection capability of another device by using a notification bar.

With reference to FIG. 3A, the terminal device 100 may detect a user operation that is of sliding downward from the top and that is performed on the user interface 31, and display, in response to the user operation, a notification bar 301 shown in FIG. 3B.

This is not limited to the manner shown in FIG. 3A. When displaying another user interface, the terminal device 100 may display, in response to a detected user operation of sliding downward from the top, a notification bar 301 shown in FIG. 3B.

On/off controls of some functions, for example, a wireless local area network (WLAN) on/off control 301*a*, a cellular network on/off control 301*b*, a "distributed network connection" on/off control 301*c*, a Bluetooth on/off control, a flashlight on/off control, a sound on/off control, an airplane mode on/off control, an auto-rotate on/off control, and a screenshot on/off control, are displayed in the notification bar 301.

"Distributed network connection" is a service or function provided by the terminal device, and is used to support the terminal device in establishing, in a manner different from a hotspot, a communication connection to another device that accesses the internet, and communicating with the internet through the another device based on the communication connection. That is, "distributed network connection" supports the terminal device in borrowing a network connection capability of another device and sharing a network of the another device.

"Distributed network connection" is merely a word used in this embodiment, a meaning represented by the word is recorded in this embodiment, and a name of the word cannot constitute any limitation on this embodiment. In some other embodiments of this application, "distributed network connection" may also be referred to as another term such as "network sharing".

An implementation form of each on/off control of a function in the notification bar 301 is not limited in this embodiment of this application, for example, may be an icon or text.

In addition, the calendar and time indicator, a settings control, a screen brightness adjustment bar, and the like may be further displayed in the notification bar 301.

The terminal device 100 may detect a user operation (for example, a tap operation or a touch operation) performed on an on/off control of a function in the notification bar 301, and enable or disable the function corresponding to the control in response to the user operation.

As shown in FIG. 3B, the terminal device may further detect a user operation performed on the "distributed network connection" on/off control 301*c*, and directly borrow a network connection capability of another device in response to the operation, or borrow a network connection capability of another device after the another device agrees. Specifically, the terminal device 100 selects a network-connected terminal device as a terminal device 200 from another terminal device in the communication system 10, and establishes a communication connection to the terminal device 200 in a manner different from a hotspot, to borrow a network connection capability of the terminal device 200. Herein, for a policy of selecting the terminal device 200 by the terminal device 100 and specific implementation in which the terminal device 100 borrows the network connection capability of the terminal device 200, refer to detailed descriptions in subsequent method embodiments.

As shown in FIG. 3C, after responding to the user operation performed on the on/off control of the function in the notification bar 301, the terminal device 100 may highlight the corresponding on/off control, to prompt the user with information indicating that the function corresponding to the on/off control is enabled. For example, the wireless local area network (WLAN) on/off control 301*a* and the "distributed network connection" on/off control 301*c* are highlighted in FIG. 3C, to prompt the user with information indicating that both a WLAN function and a network sharing function are enabled.

Figure 3D:
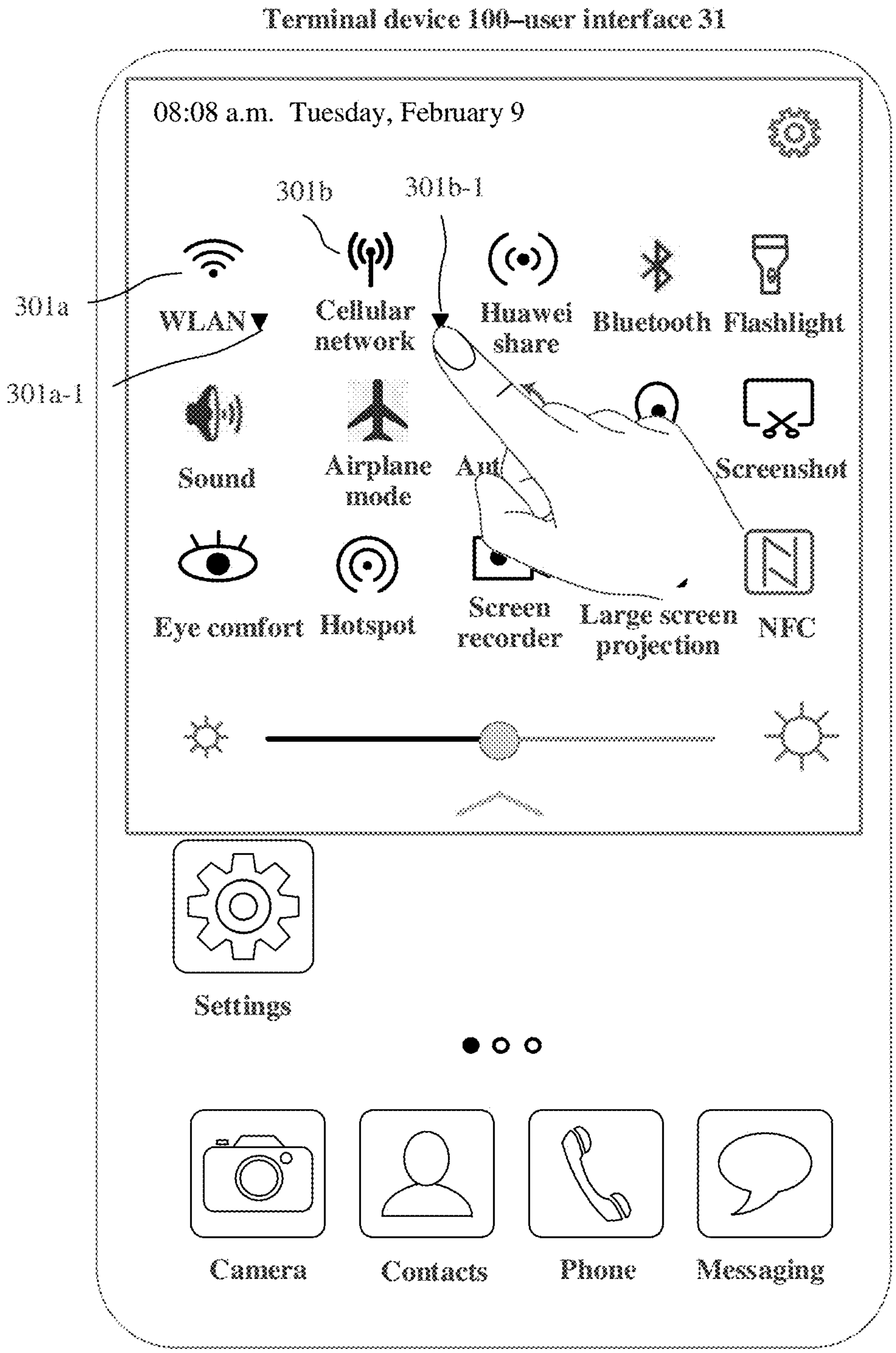
Figure 3E:
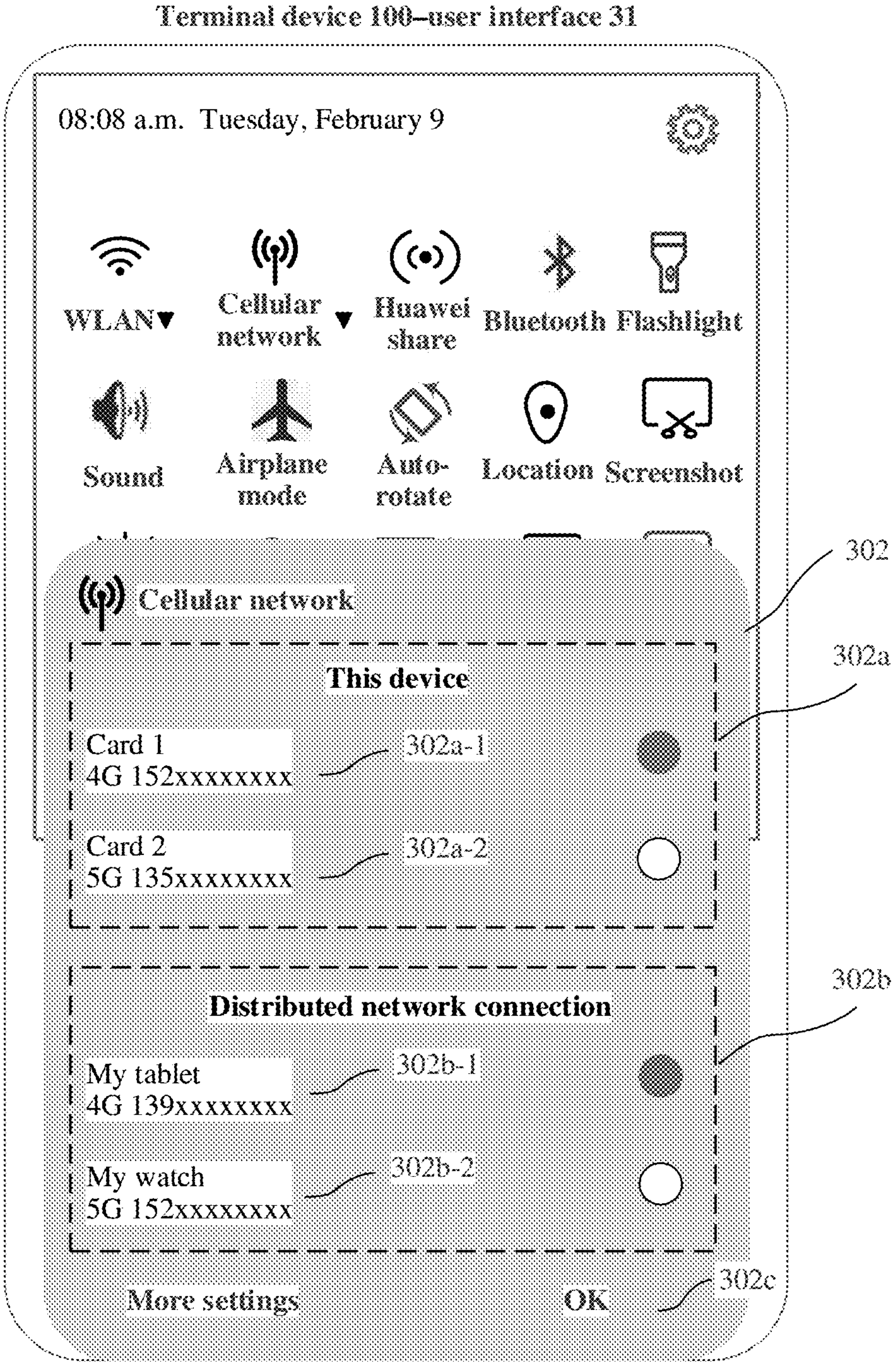
Figure 3F:
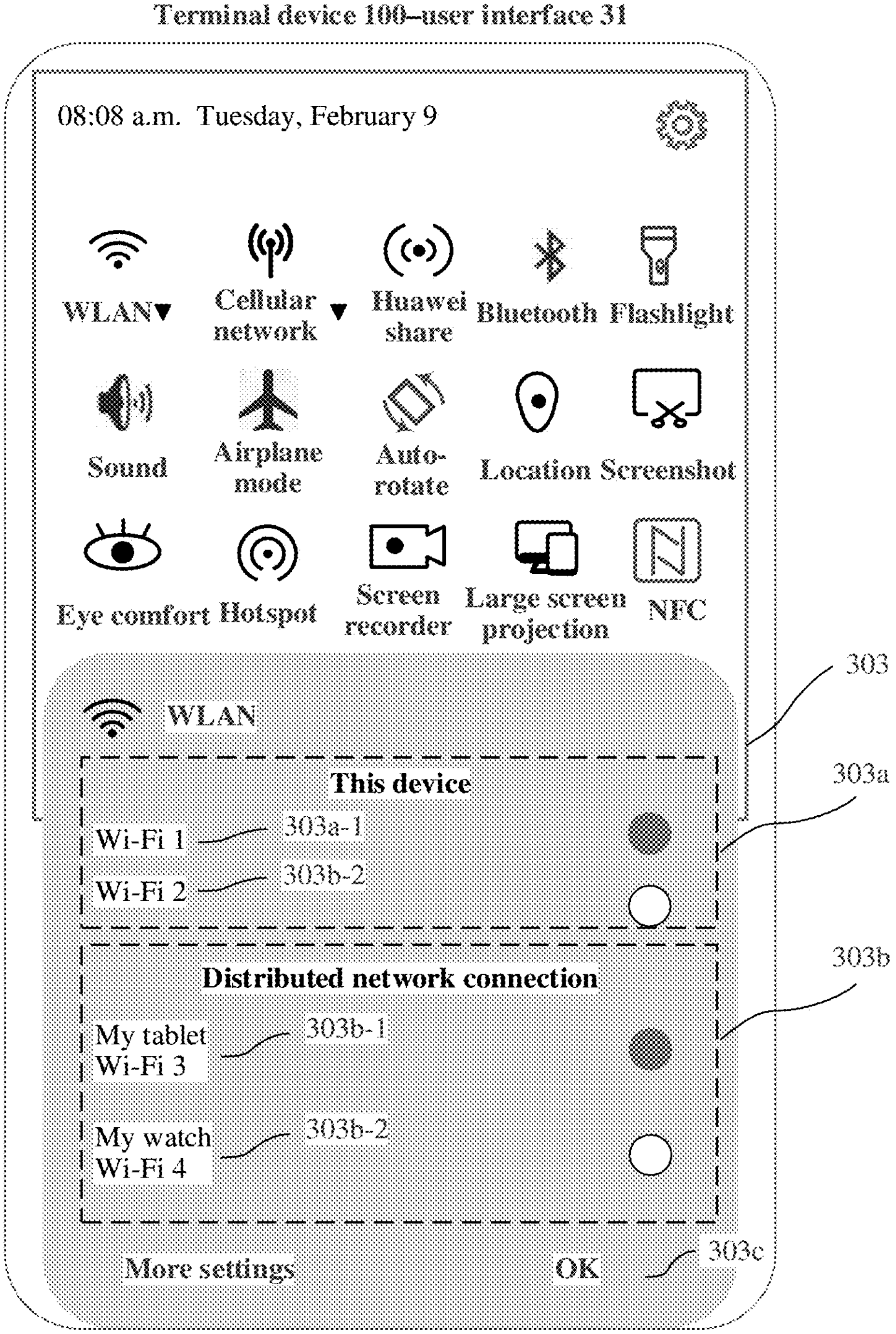

FIG. 3D to FIG. 3F show another manner in which the terminal device 100 borrows a network connection capability of another device by using a notification bar.

FIG. 3D and FIG. 3E show a manner in which the terminal device 100 borrows a cellular network capability of another device by using a notification bar.

A user interface 31 shown in FIG. 3D may be displayed by the terminal device 100 in response to the user operation of sliding downward from the top in FIG. 3A.

A difference between the user interfaces 31 shown in FIG. 3D and FIG. 3B lies in that a notification bar 301 in FIG. 3D does not include a "distributed network connection" on/off control 301*c*, a drop-down control 301*a*-1 is added to a wireless local area network (WLAN) on/off control 301*a*, and a drop-down control 301*b*-1 is added to a cellular network on/off control 301*b*.

As shown in FIG. 3D, the terminal device 100 may detect a user operation performed on the cellular network on/off control 301*b* or a user operation performed on the drop-down control 301*b*-1, and display a cellular network settings window 302 shown in FIG. 3E.

A cellular network display area 302*a* of this device and a cellular network display area 302*b* of another device are displayed in the cellular network settings window 302.

The display area 302*a* is used to display a cellular network option corresponding to a cellular network to which the terminal device 100 connects, for example, cellular network options 302*a*-1 and 302*a*-2.

The display area 302*b* is used to display a cellular network option corresponding to a cellular network to which another terminal device in the communication system 10 connects, for example, cellular network options 302*b*-1 and 302*b*-2.

Each terminal device connects to a cellular network by using a SIM card. Therefore, the cellular network to which the terminal device can connect is a cellular network to which the terminal device can connect by using a SIM card. One terminal device may connect to one or more cellular networks.

In this embodiment of this application, the cellular network option indicates a cellular network, and may include an identifier of a SIM card in the terminal device, for example, a phone number or an international mobile subscriber identity (IMSI). The cellular network option may further include an identifier of an air interface technology currently provided by a network device 300 to which the terminal device can connect by using the corresponding SIM card, where the air interface technology is, for example, 2G, 3G, 4G, or 5G, so that the user can select a proper air interface technology for the terminal device 100 to access the cellular network.

In addition to an identifier of a SIM card in the another device, the cellular network option in the display area 302*b* may further include a device identifier, for example, a name and a model of a device that connects to a corresponding cellular network. That is, the cellular network option in FIG. 3E is also a device option. In this way, it may be convenient for the user to select a proper terminal device 200 for the terminal device 100 and borrow a cellular network capability of the terminal device 200.

The terminal device 100 may detect a user operation of selecting the cellular network option in the display area 302*a*, then detect a user operation performed on an OK control 302*c*, and connect to a cellular network corresponding to the cellular network option in response to the operation. In some other embodiments, after detecting a user operation of selecting the cellular network option in the display area 302*a*, the terminal device 100 may directly connect to a cellular network corresponding to the cellular network option.

The terminal device 100 may detect a user operation of selecting the cellular network option in the display area 302*b*, then detect a user operation performed on the OK control 302*c*, and in response to the operation, directly borrow a cellular network of a device corresponding to the cellular network option, or request to borrow a cellular network of a device corresponding to the cellular network option.

In some other embodiments, in response to a detected user operation of selecting the cellular network option in the display area 302*b*, the terminal device 100 may directly borrow a cellular network of a device corresponding to the cellular network option, or request to borrow a cellular network of a device corresponding to the cellular network option.

Herein, the device corresponding to the cellular network option selected by the terminal device 100 in the display area 302*b* is the terminal device 200 selected by the terminal device 100. For specific implementation in which the terminal device 100 borrows the cellular network of the terminal device 200, refer to detailed descriptions in subsequent method embodiments.

FIG. 3D and FIG. 3F show a manner in which the terminal device 100 borrows a WLAN capability of another device by using a notification bar.

The terminal device 100 may further detect a user operation performed on the wireless local area network (WLAN) on/off control 301*a* in FIG. 3D or a user operation performed on the drop-down control 301*a*-1, and display a wireless local area network (WLAN) settings window 303 shown in FIG. 3F.

A WLAN display area 303*a* of this device and a WLAN display area 303*b* of another device are displayed in the WLAN settings window 303.

The display area 303*a* is used to display a WLAN option corresponding to a WLAN found by the terminal device 100, for example, WLAN options 303*a*-1 and 303*a*-2.

The display area 303*b* is used to display a WLAN option corresponding to a WLAN to which another device in the communication system 10 connects, for example, WLAN options 303*b*-1 and 303*b*-2. Herein, all WLANs corresponding to the WLAN options in the display area 303*b* access the internet.

One terminal device may connect to one or more WLAN networks. The terminal device connects to the WLAN by using a Wi-Fi network interface controller. When a plurality of Wi-Fi network interface controllers are configured for the terminal device, the terminal device may connect to a plurality of WLANs.

The WLAN option may include an identifier of a WLAN, for example, a name of an available WLAN.

In addition to the identifier of the WLAN, the WLAN option in the display area 303*b* may further include a device identifier, for example, a name and a model of a device that connects to a corresponding WLAN. That is, the WLAN option in FIG. 3F is also a device option. In this way, it may be convenient for the user to select a proper terminal device 200 for the terminal device 100 and borrow a WLAN capability of the terminal device 200.

The terminal device 100 may detect a user operation of selecting the WLAN option in the display area 303*a*, then detect a user operation performed on an OK control 303*c*, and connect to a WLAN corresponding to the WLAN option in response to the operation. In some other embodiments, after detecting a user operation of selecting the WLAN option in the display area 303*a*, the terminal device 100 may directly connect to a WLAN corresponding to the WLAN option.

The terminal device 100 may detect a user operation of selecting the WLAN option in the display area 303*b*, then detect a user operation performed on the OK control 303*c*, and in response to the operation, directly borrow a WLAN of a device corresponding to the WLAN option, or request to borrow a WLAN of a device corresponding to the WLAN option.

In some other embodiments, in response to a detected user operation of selecting the WLAN option in the display area 303*b*, the terminal device 100 may directly borrow a WLAN of a device corresponding to the WLAN option, or request to borrow a WLAN of a device corresponding to the WLAN option.

Herein, the device corresponding to the WLAN option selected by the terminal device 100 in the display area 303*b* is the terminal device 200 selected by the terminal device 100. For specific implementation in which the terminal device 100 borrows the WLAN of the terminal device 200, refer to detailed descriptions in subsequent method embodiments.

Figure 3G:
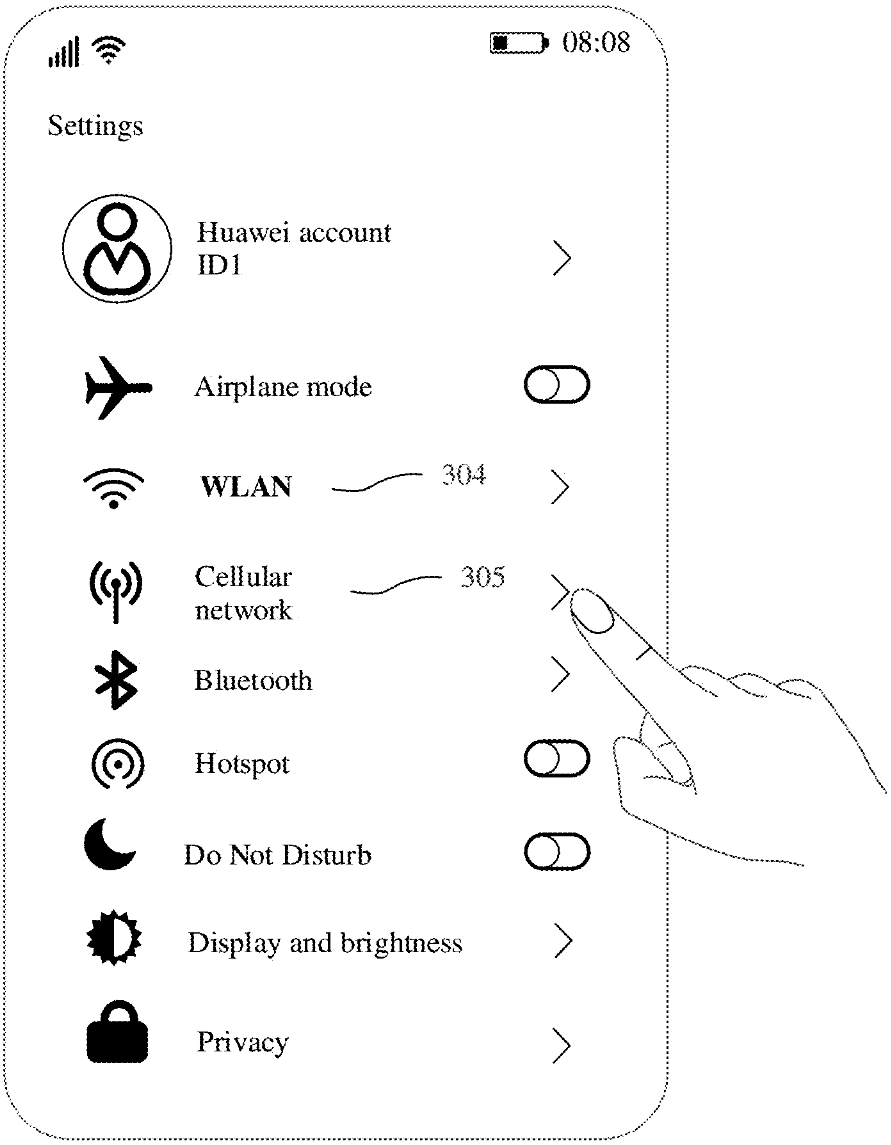
Figure 3H:
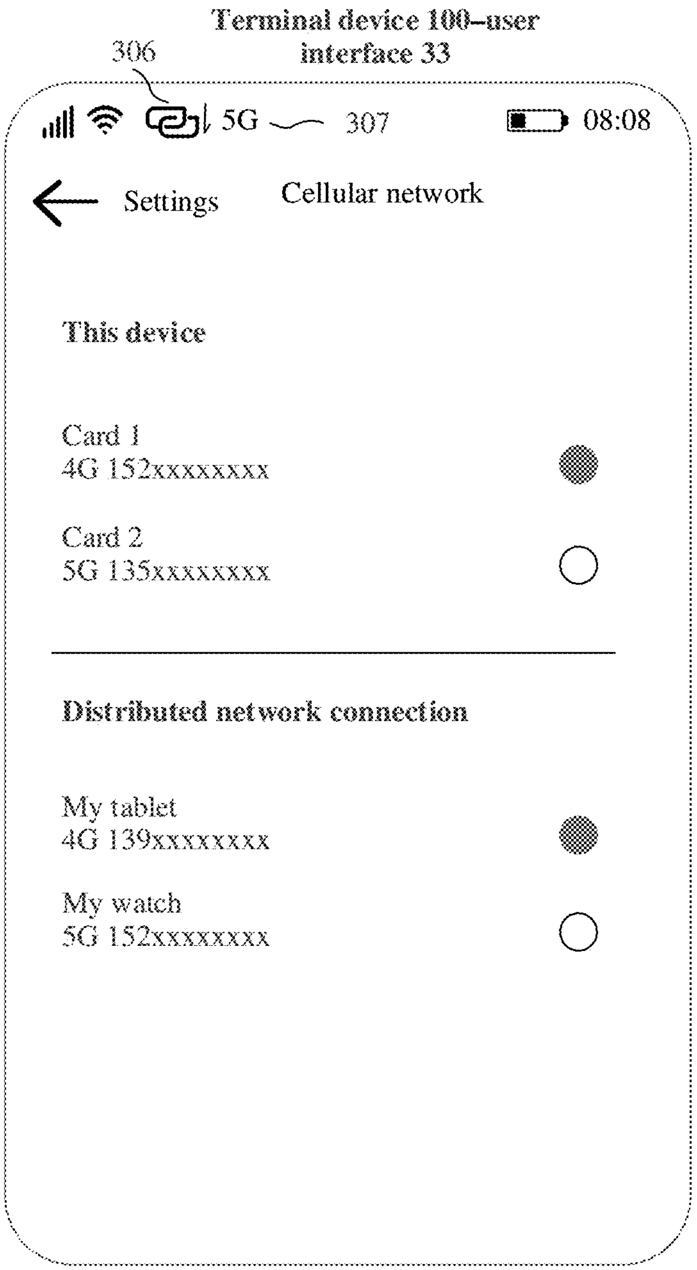
Figure 3I:
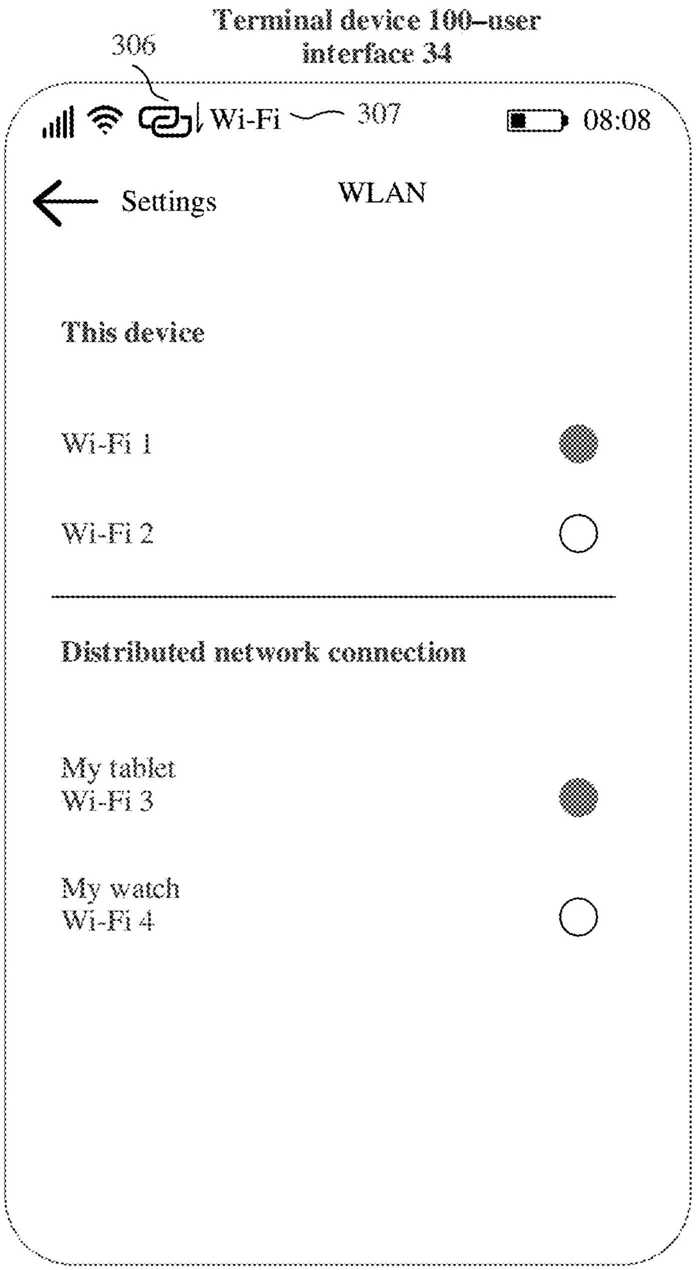

FIG. 3G to FIG. 3I show a manner in which the terminal device 100 borrows a network connection capability of another device by using a settings application (settings).

FIG. 3G shows a user interface 32 provided by the settings application installed in the terminal device 100. The user interface 32 may be displayed by the terminal device 100 in response to a user operation performed on the icon of the settings application in the user interface 31 shown in FIG. 3A, or displayed in response to a user operation performed on the settings control in FIG. 3B or FIG. 3C. The settings application is an application used to set functions of the terminal device.

As shown in FIG. 3G, one or more functional options, for example, a system account option, an airplane mode on/off option, a WLAN option 304, a cellular network option 305, and a Bluetooth option, are displayed in the user interface 32.

The terminal device 100 may detect a user operation performed on the cellular network option 305, and display a user interface 33 used to set a cellular network. Content displayed in the user interface 33 is similar to that in the cellular network settings window 302 in FIG. 3E. The user may set, in the user interface 33, a cellular network to which the terminal device 100 of the user connects and a borrowed cellular network of another device. For a specific operation, refer to related descriptions in FIG. 3E.

The terminal device 100 may further detect a user operation performed on the WLAN option 304, and display a user interface 34 used to set a WLAN. Content displayed in the user interface 34 is similar to that in the WLAN settings window 303 in FIG. 3F. The user may set, in the user interface 34, a WLAN to which the terminal device 100 of the user and a borrowed WLAN of another device. For a specific operation, refer to related descriptions in FIG. 3F.

It may be learned from user interfaces 31 shown in FIG. 3E and FIG. 3F that the user may simultaneously select a plurality of network options. For example, as shown in FIG. 3E, the user may select a cellular network option of this device to access a cellular network of this device, or may select a cellular network option of another device in the communication system 10 to borrow a cellular network of the another device. For example, as shown in FIG. 3F, the user may select a WLAN option of this device to access a WLAN of this device, or may select a WLAN option of another device in the communication system 10 to borrow a WLAN of the another device.

In some other embodiments, after the user selects a plurality of network options, the terminal device 100 may access or borrow a network corresponding to the network option according to a preset rule. The preset rule is not limited in this embodiment of this application. For example, as shown in FIG. 3E or FIG. 3F, if the user selects a plurality of network options, the terminal device 100 may preferentially borrow a network of another device.

This is not limited to simultaneous selection of a plurality of network options. In some embodiments, the terminal device 100 may allow selection of only one network option at a time. In this way, the terminal device 100 may directly access or borrow a network corresponding to the network option selected by the user.

This is not limited to the several manners that are shown as examples in FIG. 3A to FIG. 3I and in which the terminal device 100 borrows a network connection capability of another device. In some other embodiments, the terminal device 100 may borrow the network connection capability of the another device in another manner. This is not specifically limited herein.

For example, the settings application in the terminal device 100 may provide a "distributed network connection" on/off control, and after a user operation performed on the on/off control is detected, a network connection capability of another device is borrowed.

For another example, the terminal device 100 may further display a device option of a network-connected terminal device in the communication system 10. Then, the terminal device 100 may detect a user operation performed on the device option, and borrow a network connection capability of the terminal device corresponding to the device option in response to the user operation. Herein, for details about a network connection manner and a specific network in the network connection capability borrowed by the terminal device 100, refer to detailed descriptions in subsequent method embodiments. Details are not described herein.

This is not limited to the cellular network option and the WLAN option shown in FIG. 3D to FIG. 3I. The terminal device 100 may further provide more network connection manner options of other devices, for example, a wired manner, for the user to select.

After successfully borrowing the network connection capability of the another device, the terminal device 100 may further output prompt information to prompt the user with information indicating that the terminal device 100 is currently borrowing the network connection capability of the another device.

FIG. 3H and FIG. 3I further show prompt information output after the terminal device 100 successfully borrows a network connection capability of another device.

As shown in FIG. 3H and FIG. 3I, after successfully borrowing the network connection capability of the another device, the terminal device 100 may display a network sharing identifier 306 in the status bar. The network sharing identifier 306 indicates that the terminal device 100 is currently borrowing the network connection capability of the another device.

In some embodiments, the terminal device 100 may further display more information in the status bar. For example, indication information 307 of a network connection manner borrowed by the terminal device 100 may be further displayed in the status bar. The network connection manner may include connecting to the internet by using a cellular network, a WLAN, a wired network, or the like. The cellular network may further include 2G, 3G, 4G, 5G, 6G, or the like. For example, indication information 307 in FIG. 3H indicates that the terminal device 100 currently borrows a 5G cellular network of another device, and indication information 307 in FIG. 3I indicates that the terminal device 100 currently borrows a WLAN of another device.

In some embodiments, the terminal device 100 may further display an identifier of the borrowed network, an identifier of the terminal device 200 that provides the network connection capability, network quality of the borrowed network, and the like in the status bar.

The foregoing information is not limited to being displayed in the status bar. In some other embodiments, the terminal device 100 may prompt, in another manner, the user with information indicating that the terminal device 100 is currently borrowing the network connection capability of the another device, the borrowed network connection manner, the borrowed network, network quality of the terminal device 200, and the network quality of the borrowed network. This is not limited herein. For example, the terminal device 100 may further output voice prompt information.

The terminal device 100 with the user interfaces shown in FIG. 3A to FIG. 3I has a display, and the terminal device 100 having a display may borrow a network connection capability of another device in the manners shown in FIG. 3A to FIG. 3I.

This is not limited thereto. A terminal device 100 that does not have a display may also borrow a network connection capability of another device.

Figure 4A:
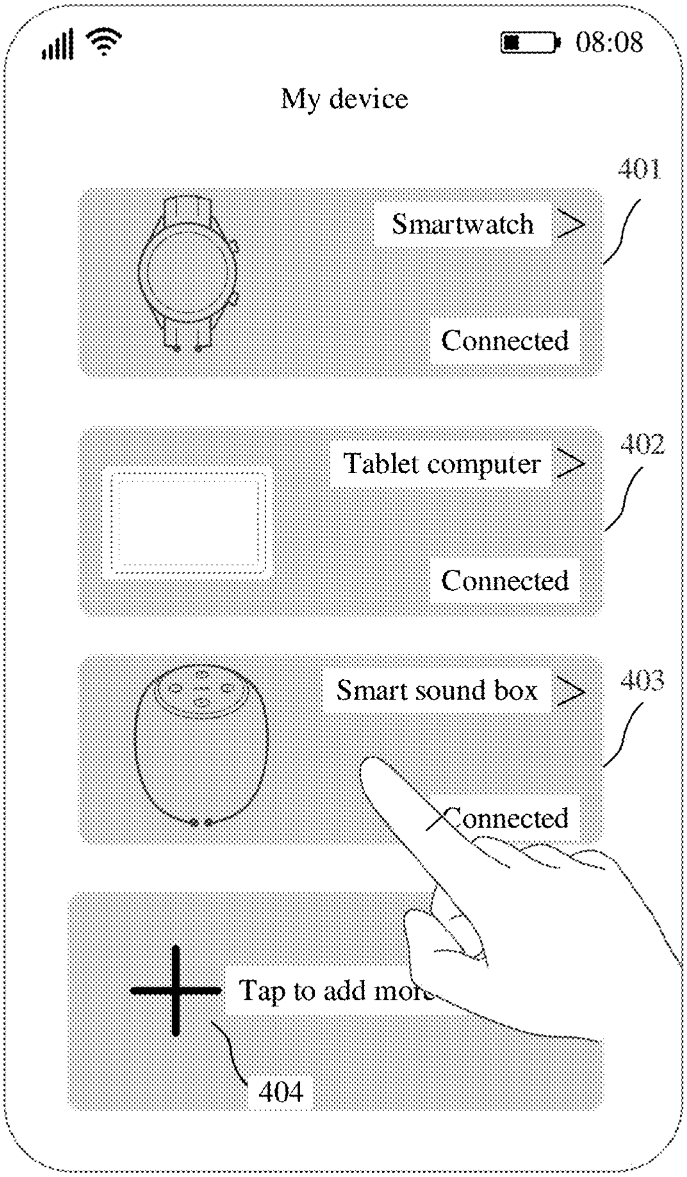
Figure 4B:
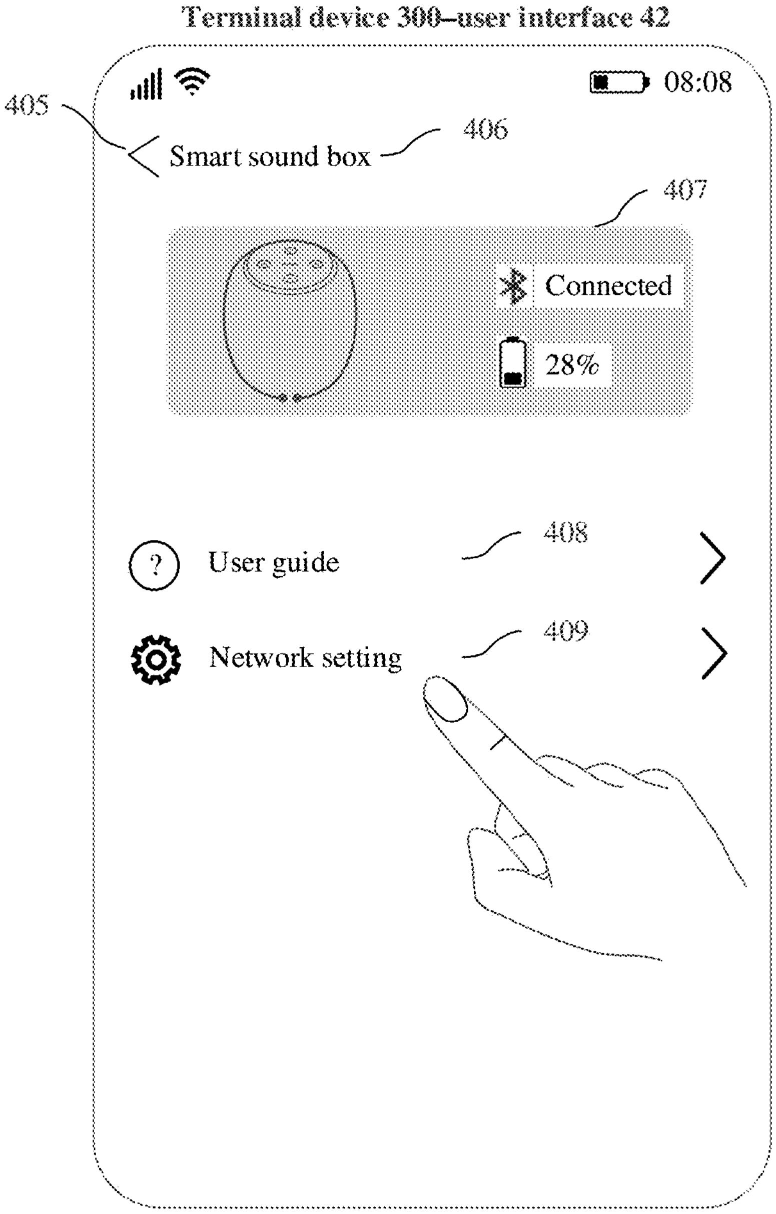
Figure 4C:
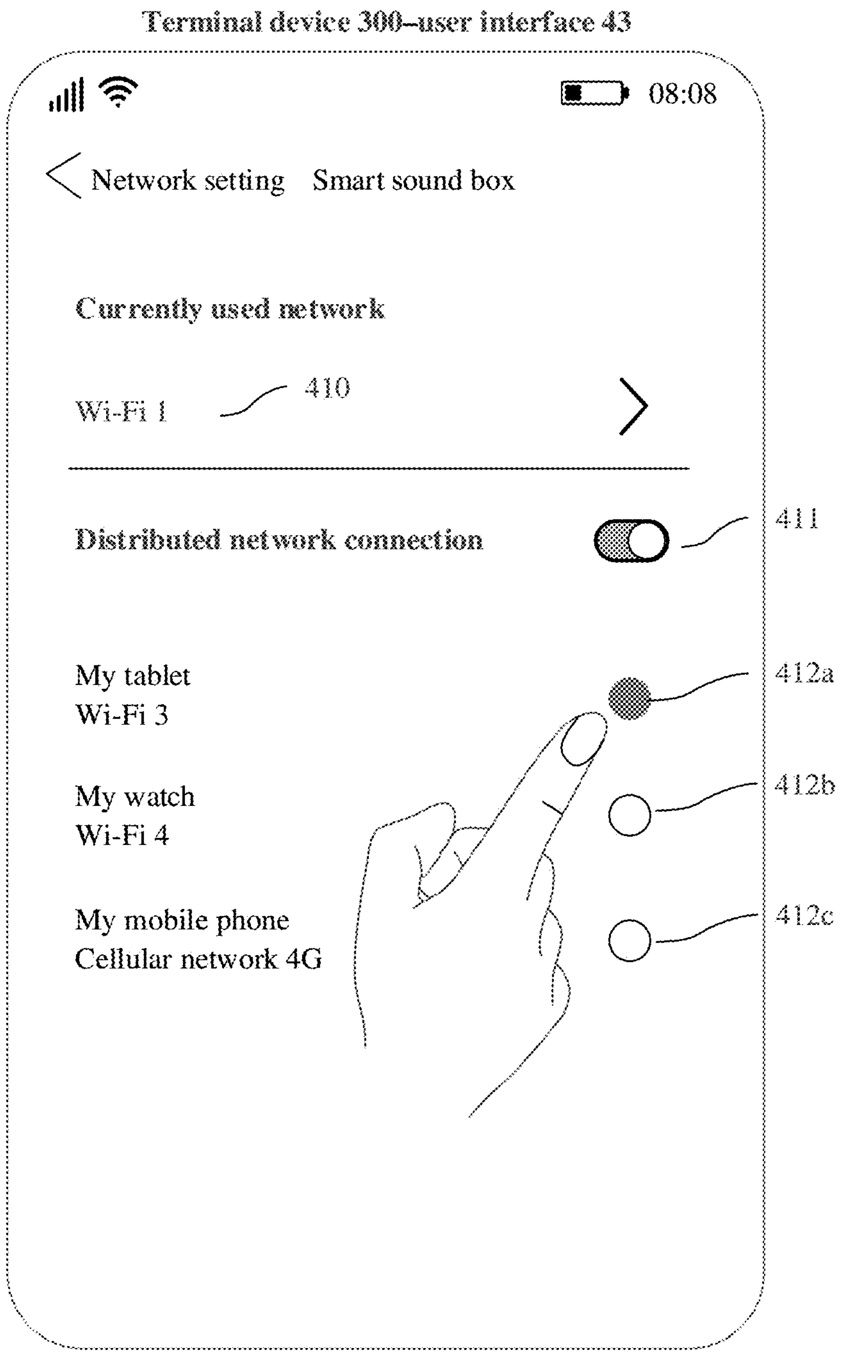

FIG. 4A to FIG. 4C show examples of user interfaces involved when a terminal device 100 that does not have a display borrows a network connection capability of another device.

FIG. 4A to FIG. 4C show user interfaces provided by a control device of the terminal device 100, for example, a terminal device 300. The terminal device 300 is also a terminal device in the communication system 10 shown in FIG. 1. For example, the terminal device 300 may be a mobile phone, and the terminal device 100 may be a device, for example, a smart sound box, that does not have a display.

A terminal device in the communication system 10 may be bound to another device. After being bound to the another device, the terminal device may manage functions of the bound another device by using a device management application configured to manage a bound device.

FIG. 4A shows an example of a user interface 41 provided by a device management application installed in the terminal device 300. A tab of one or more devices bound to the terminal device 300, for example, a tab 401 of a smartwatch, a tab 402 of a tablet computer, and a tab 403 of a smart sound box, and a control 404 used to bind a new device are displayed in the user interface 41.

The control 404 may be configured to detect a user operation, and the terminal device 300 may discover another nearby device in response to the user operation, and be bound to the another nearby device. A manner in which the terminal device 300 discovers and is bound to the another device is not specifically limited herein. For example, the terminal device 300 may discover the another device by using a technology such as Bluetooth or Wi-Fi, then send a binding request, and be successfully bound to the another device.

The tab of the device may include a picture and a name of the device, a status of connection to the terminal device 100, and the like. The tab of the device may detect a user operation, and the terminal device 300 may display more information about the device corresponding to the tab in response to the user operation.

As shown in FIG. 4A, the terminal device 300 may detect a user operation performed on the tab 403 of the terminal device 100 (namely, the smart sound box), and display, in response to the user operation, a user interface 42 shown in FIG. 4B.

A back button 405, a current page indicator 406, an information display area 407 of the smart sound box, a control 408, and a control 409 are displayed in the user interface 42.

The back button 405 is used to monitor a user operation, and the terminal device 300 may display a previous-level interface in response to the user operation, for example, display the user interface 41 shown in FIG. 4A.

The current page indicator 406 indicates a current page. For example, text information "smart sound box" indicates that the current page is a page used to manage the smart sound box.

The information display area 407 is used to display various pieces of information about the smart sound box, for example, may include a picture, a status of connection to the terminal device 300, and a remaining battery level.

The control 409 is configured to monitor a user operation, and the terminal device 300 may display, in response to the user operation, a page used to set a network connection function of the terminal device 100 (namely, the smart sound box).

A user interface 43 shown in FIG. 4C is an example of the page used to set the network connection function of the terminal device 100 (namely, the smart sound box). A back button, a current page indicator, current network information 410, a "distributed network connection" on/off control 411, and a network option of one or more other devices, for example, WLAN options 412*a* and 412*b* and a cellular network option 412*c*, are displayed in the user interface 43.

The back button is used to monitor a user operation, and the terminal device 300 may display a previous-level interface in response to the user operation, for example, display the user interface 42 shown in FIG. 4B.

The current page indicator indicates a current page. For example, text information "smart sound box and network setting" indicates that the current page is used to set the network connection function of the terminal device 100 (namely, the smart sound box).

The current network information 410 is used to display a network to which the terminal device 100 (namely, the smart sound box) currently connects. As shown in FIG. 4C, the terminal device 100 (namely, the smart sound box) currently connects to a WLAN named "Wi-Fi 1".

The "distributed network connection" on/off control 411 is configured to monitor a user operation, and the terminal device 300 may enable or disable "distributed network connection" of the terminal device 100 (namely, the smart sound box) in response to the user operation.

As shown in FIG. 4C, after the terminal device enables distributed network sharing, the terminal device 300 displays a network option of one or more other devices. For specific implementation of the network option, refer to related descriptions of the cellular network option in FIG. 3E and the WLAN option in FIG. 3F.

The terminal device 300 may trigger, in response to a detected user operation of selecting the network option, the terminal device 100 (namely, the smart sound box) to borrow a network provided by a device corresponding to the network option. Herein, the device corresponding to the network option is a terminal device 200.

This is not limited to the manner shown in FIG. 4C. The terminal device 300 may trigger, in another manner, the terminal device 100 (namely, the smart sound box) to borrow a network provided by another device. For example, the terminal device 300 may provide different network options, in different network connection manners, for a user to select. For another example, after enabling distributed network sharing, the terminal device 300 may further directly trigger the terminal device 100 to borrow a network provided by another device.

This is not limited to the manner that is shown in FIG. 4A to FIG. 4C and in which the terminal device 300 is used to trigger the terminal device 100 to borrow a network connection capability of another device. When the terminal device 100 does not have a display, the terminal device 100 may further receive a voice instruction of the user, and borrow a network connection capability of another device in response to the voice instruction. In addition, the terminal device 100 may further directly borrow a network connection capability of the control device of the terminal device 100, a network connection capability of a device that logs in to a same system account as the terminal device 100, or the like. For details, refer to detailed descriptions in subsequent method embodiments.

Figure 5A:
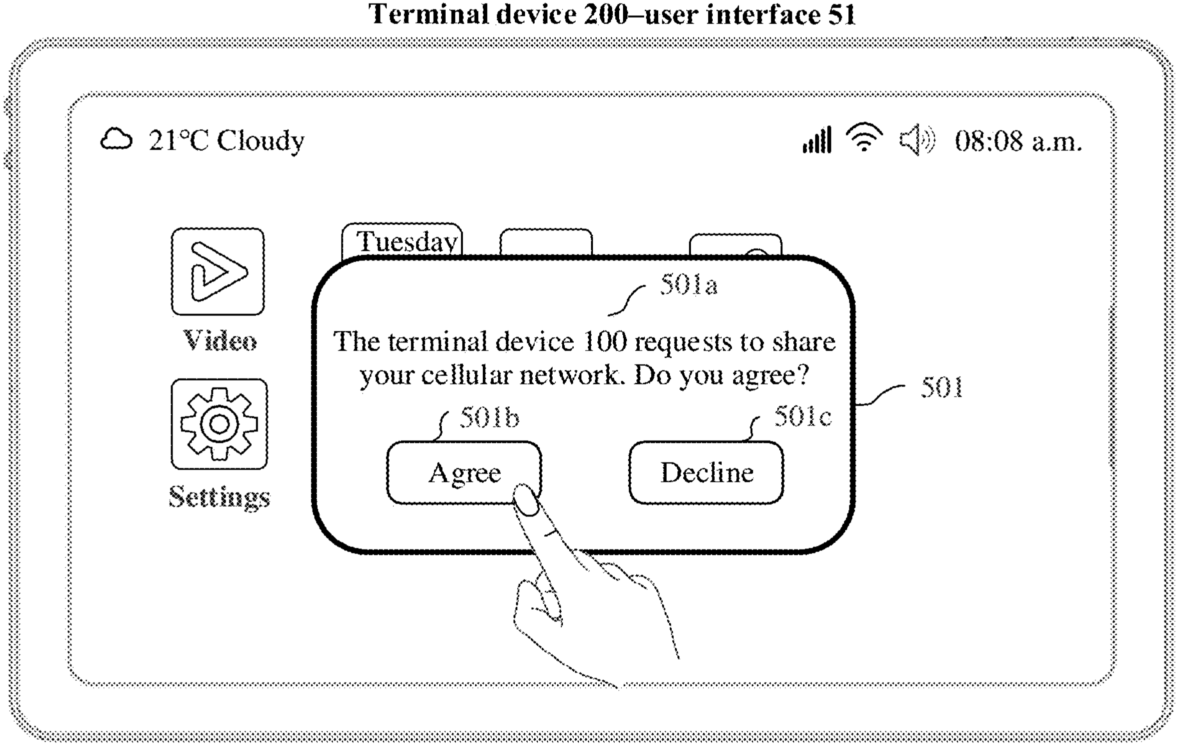
Figure 5B:
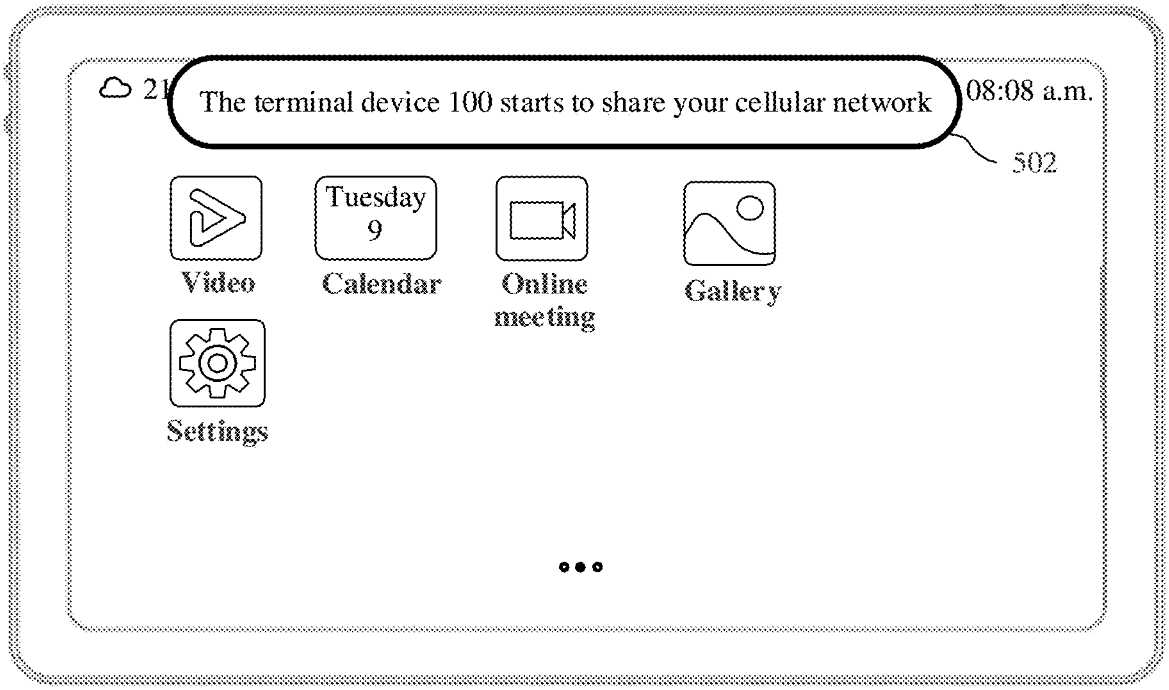
Figure 5C:
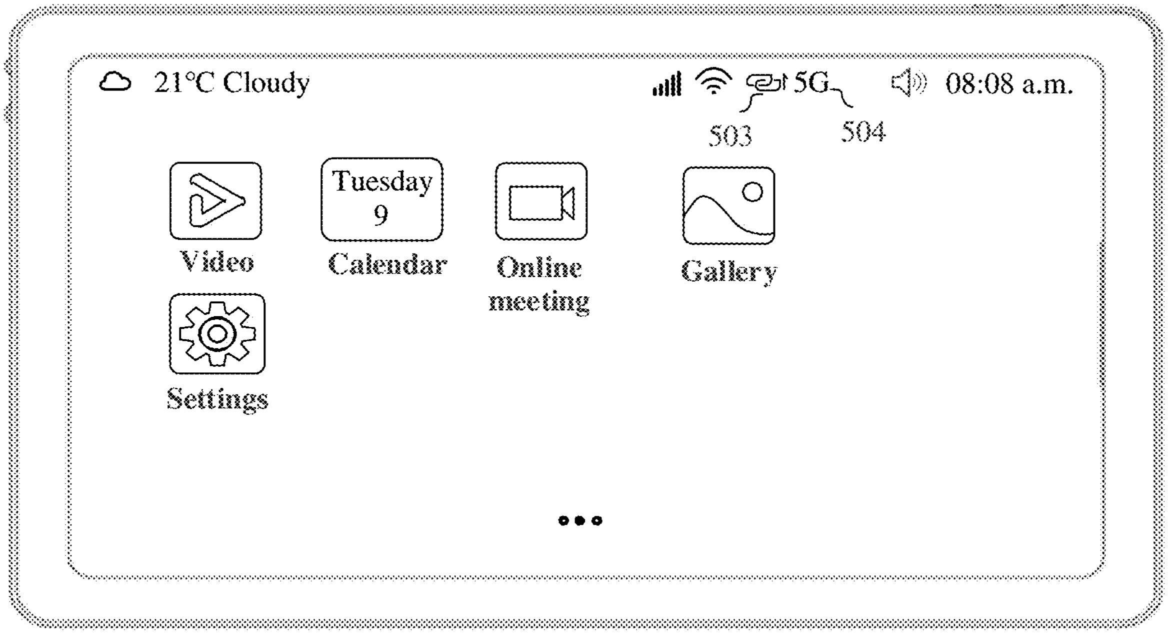

FIG. 5A to FIG. 5C show user interfaces involved when a terminal device 200 provides a network connection capability for a terminal device 100.

FIG. 5A shows a user interface 51 displayed when the terminal device 200 receives a request for borrowing the network connection capability from the terminal device 100.

A prompt window 501 is displayed in the user interface 51. Prompt information 501*a*, a control 501*b*, and a control 501*c* are displayed in the prompt window 501.

The prompt information 501*a* is used to prompt a user with information indicating that the terminal device 100 currently requests to borrow the network connection capability of the terminal device 200. In some embodiments, the prompt information 501*a* may further provide a prompt indicating a type of a network that the terminal device 100 requests to borrow.

The control 501*b* is configured to monitor a user operation, and the terminal device 200 may agree, in response to the user operation, to lend the network connection capability to the terminal device 100.

The control 501*c* is configured to monitor a user operation, and the terminal device 200 may decline, in response to the user operation, to lend the network connection capability to the terminal device 100.

This is not limited to the prompt window 501 shown in FIG. 5A. The terminal device 200 may respond, in another manner, to the request for borrowing the network connection capability from the terminal device 100. For example, the terminal device 100 may generate and display a PIN code. After the user enters the same PIN code on the terminal device 200, the terminal device 200 agrees to lend the network connection capability to the terminal device 100.

FIG. 5B shows prompt information displayed by the terminal device 200 after the terminal device 100 successfully borrows the network connection capability of the terminal device 200.

As shown in FIG. 5B, the terminal device 200 may display prompt information 502 in a form of a notification. The prompt information 502 is used to prompt the user with information indicating that the terminal device 100 starts to share the network connection capability of the terminal device 200. In some embodiments, the prompt information 502 may further provide a prompt indicating a type of a network borrowed by the terminal device 100. The prompt information 502 may disappear after being displayed for a period of time, and require no user interaction.

FIG. 5C shows another type of prompt information output by the terminal device 200 after the terminal device 100 successfully borrows a network connection capability of another device.

As shown in FIG. 5C, after lending the network connection capability to the terminal device 100, the terminal device 200 may display a network sharing identifier 503 in a status bar. The network sharing identifier 503 is used to provide a prompt indicating that the terminal device 200 is currently lending the network connection capability to another device.

In some embodiments, the terminal device 200 may further display more information in the status bar. For example, indication information 504 of a network connection manner lent by the terminal device 200 to the another device may be further displayed in the status bar. The network connection manner may include accessing the internet by using a cellular network, a WLAN, a wired network, or the like. The cellular network may further include 2G, 3G, 4G, 5G, 6G, or the like. For example, the indication information 504 in FIG. 5C indicates that the terminal device 200 currently lends a 5G cellular network to the another device.

In some embodiments, the terminal device 200 may further display an identifier of the terminal device 100 that borrows the network connection capability, network quality of the borrowed network, and the like in the status bar.

The foregoing information is not limited to being displayed in the status bar. In some other embodiments, the terminal device 200 may prompt, in another manner, the user with information indicating that the terminal device 200 is currently lending the network connection capability to the another device, the provided network connection manner, network quality of the terminal device 100 that borrows the network connection capability, and the network quality of the borrowed network. This is not limited herein. For example, the terminal device 200 may further output voice prompt information.

Figure 5D:
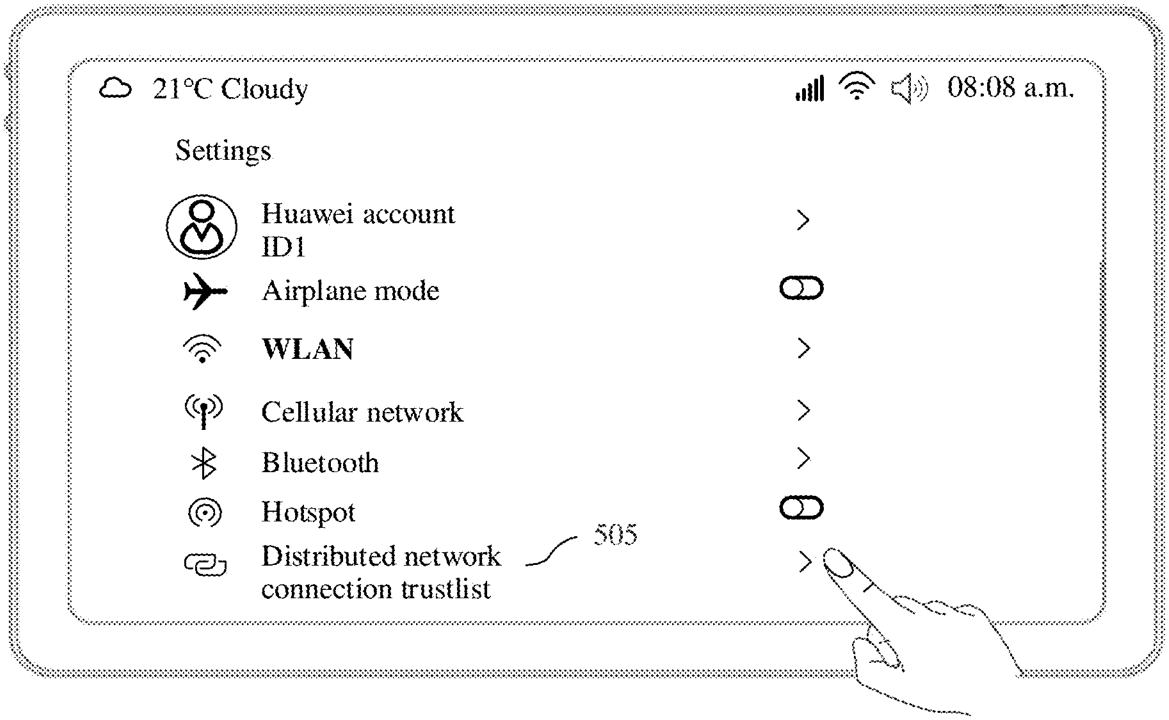
Figure 5E:
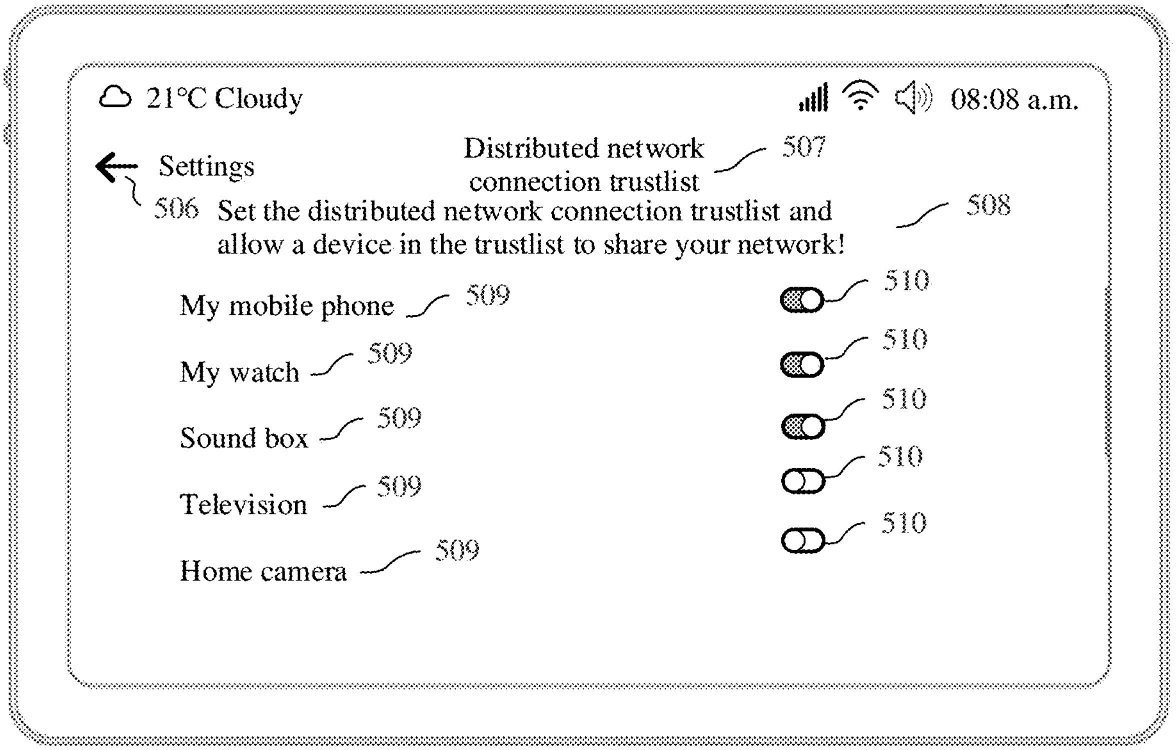

FIG. 5D and FIG. 5E show user interfaces involved when the terminal device 200 sets a trustlist.

FIG. 5D shows a user interface 54 provided by a settings application installed in the terminal device 200. The user interface 54 may be displayed by the terminal device 100 in response to a user operation performed on an icon of the settings application on a home screen.

As shown in FIG. 5D, one or more functional options, for example, a system account option, an airplane mode on/off option, a WLAN option, a cellular network option, a Bluetooth option, a hotspot option, and a trustlist option 505, are displayed in the user interface 54.

The terminal device 100 may detect a user operation performed on the trustlist option 505, and display a user interface 55 that is used to set a trustlist and that is shown in FIG. 5E.

As shown in FIG. 5E, a status bar, a back button 506, a current page indicator 507, prompt information 508, one or more device options 509, and a control 510 corresponding to the device option are displayed in the user interface 55.

The back button 506 is used to monitor a user operation, and the terminal device 200 may display a previous-level interface in response to the user operation, for example, display the user interface 54 shown in FIG. 5D.

The current page indicator 507 indicates a current page. For example, text information "distributed network connection trustlist" indicates that the current page is a page used to set a trustlist.

The prompt information 508 is used to prompt the user with information indicating that a device added to the trustlist can use the network connection capability of the current device (namely, the terminal device 200).

The one or more device options correspond to a device that connects to the terminal device 200.

The terminal device 200 may detect a user operation performed on the control 510 corresponding to the device option, and in response to the user operation, add a device indicated by the device option corresponding to the control 510 to the trustlist or delete a device indicated by the device option from the trustlist.

As shown in FIG. 5E, the trustlist that is set by the user includes a mobile phone, a watch, and a sound box, that is, the mobile phone, the watch, and the sound box may share the network connection capability of the terminal device 200.

This is not limited to the manner that is of setting the trustlist and that is shown in FIG. 5D and FIG. 5E. In some other embodiments of this application, the terminal device 200 may set the trustlist in another manner. For example, the terminal device 200 may further add a device that has historically borrowed the terminal device 200 to the trustlist, or the terminal device 200 may add each device bound to the terminal device 200 to the trustlist.

Based on the communication system 10 shown in FIG. 1, the terminal device described in FIG. 2A, FIG. 2B-1, and FIG. 2B-2, and the user interface provided in the foregoing UI embodiment, the following describes in detail the network connection method provided in embodiments of this application.

Figure 6:
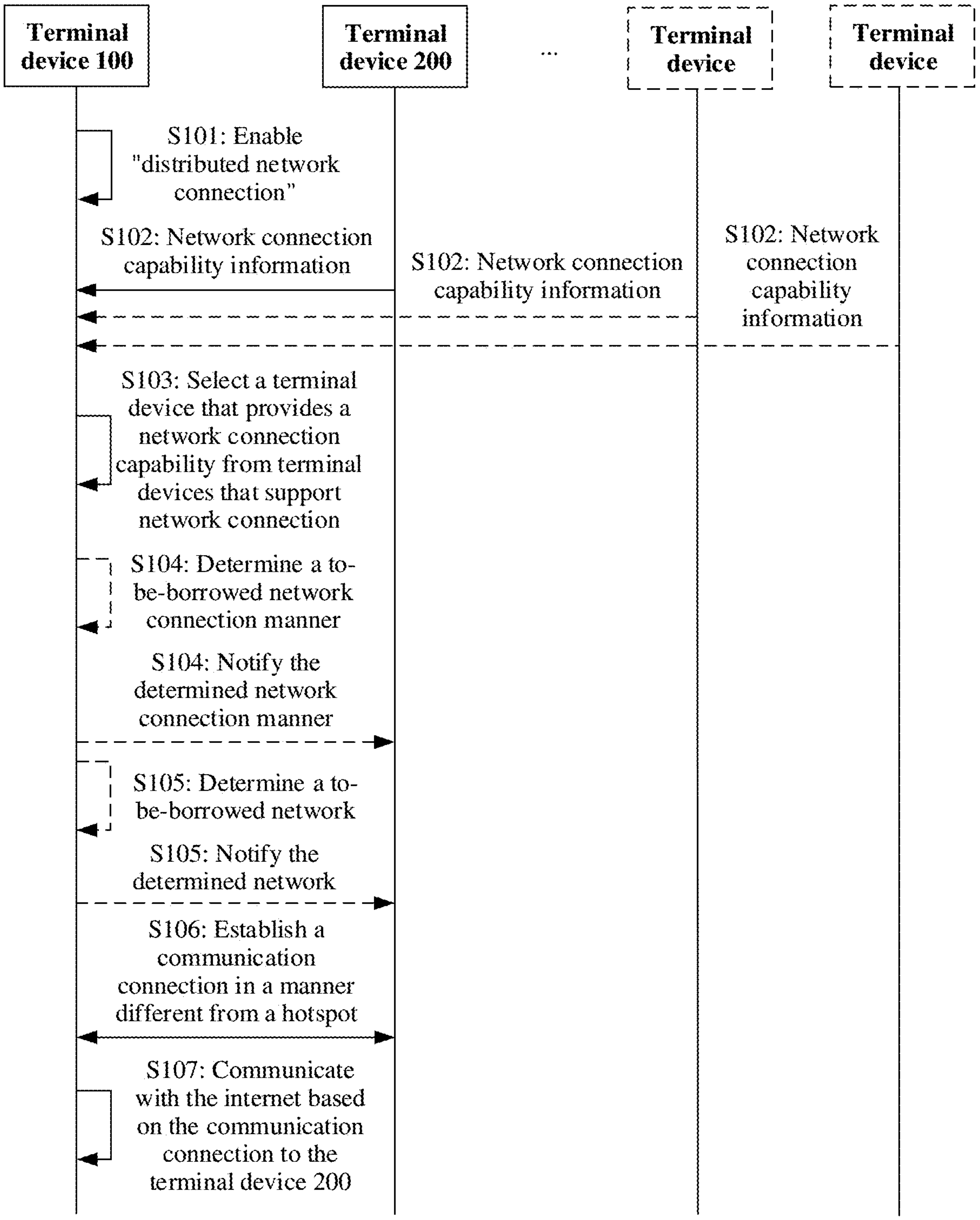
FIG. 6 is a flowchart of a network connection method according to an embodiment of this application.

FIG. 6 shows an example of a procedure of a network connection method according to an embodiment of this application. In the network connection method shown in FIG. 6, a terminal device 100 may continuously borrow a network connection capability of another device to continuously access a network.

As shown in FIG. 6, the method may include the following steps.

Step S101: The terminal device 100 enables "distributed network connection".

The terminal device 100 may be any terminal device in a communication system 10. The terminal device 100 may have an information input/output apparatus (for example, a display), for example, may be a mobile phone, a tablet computer, or a large-screen television. Alternatively, the terminal device 100 may not have an information input/output apparatus (for example, a display), for example, may be a smart sound box or a smart camera.

"Distributed network connection" is a service or function provided by the terminal device, and is used to support the terminal device in establishing, in a manner different from a hotspot, a communication connection to another device that accesses the internet, and communicating with the internet through the another device based on the communication connection. That is, "distributed network connection" supports the terminal device in borrowing a network connection capability of another device.

In some embodiments of this application, the terminal device 100 may enable "distributed network connection" by default. In this way, the network connection capability of the another device can be borrowed without specially enabling "distributed network connection" on the terminal device 100.

In some other embodiments of this application, the terminal device 100 may enable "distributed network connection" in response to a received user operation (for example, a tap operation or a touch operation). For example, with reference to FIG. 3B, an operation used to enable "distributed network connection" may include a user operation performed on the "distributed network connection" on/off control 301*c* in the user interface 31 shown in FIG. 3B. This is not limited thereto. The terminal device 100 may further respond to another user operation, for example, a user operation performed on a "distributed network connection" on/off control provided by a settings application in the terminal device 100, an operation entered on a physical button, or a voice instruction. This is not limited in this embodiment of this application.

In some other embodiments of this application, if the terminal device 100 does not have an information input/output apparatus, a control device, for example, a terminal device 300, of the terminal device 100 may trigger, in response to a received user operation, the terminal device 100 to enable "distributed network connection". For example, with reference to FIG. 4C, the terminal device 300 may detect a user operation (for example, a tap operation or a touch operation) performed on the control 411, and send a message indicating to enable "distributed network connection" to the terminal device 100 in response to the user operation. Herein, for a communication technology used when the terminal device 300 sends a message to the terminal device 100, refer to related descriptions in subsequent step S102.

"Distributed network connection" may also be referred to as a first communication service, and the user operation used to enable "distributed network connection" may be referred to as a fourth operation.

Step S102: The terminal device 100 obtains network connection capability information of another device in the communication system 10.

network, or the like. The cellular network may further include 2G, 3G, 4G, 5G, 6G, or the like.

The network identifier uniquely indicates a network. A network identifier of the cellular network may include an identifier of a SIM card or an air interface technology used when the terminal device accesses the cellular network, for example, may be "4G 139xxxxxxxx". A network identifier of the WLAN may include an identifier of a wireless access point 400 that creates the WLAN or a name of the WLAN, for example, may be "Wi-Fi 3".

The network quality may be determined based on a network speed, for example, an uplink/downlink transmission rate, a packet loss rate, a delay, bandwidth, or signal strength. The network quality may include the foregoing several factors, may be classified into high, medium, low, and other levels, or may be measured by using a score.

The terminal device may connect to one or more networks that access the internet.

For example, Table 1 lists an example of network connection capability information of a terminal device.

TABLE 1

| Whether the terminal device connects to a network | Network connection manner | Identifier of a connected network that accesses the internet | Quality of the connected network that accesses the internet |
|---|---|---|---|
| Connects to a network | Connects to the network by using a cellular network | 4G 139xxxxxxxx<br>5G 139xxxxxxxx | High<br>High |
| | Connects to the network by using a WLAN | Wi-Fi 3 | Medium |
| | Connects to the network by using a wired network | Wired network 1 | High |

The communication system 10 may include a plurality of terminal devices. For types of the plurality of terminal devices, refer to related descriptions in FIG. 1. For example, a mobile phone, a tablet computer, a smartwatch, and a smart sound box may be included.

Each terminal device in the communication system 10 may detect a network connection capability of the terminal device. The network connection capability of the terminal device depends on a hardware configuration and a software setting of the terminal device.

The network connection capability includes whether the terminal device connects to a network. If a SIM card is configured for the terminal device, and a cellular network service and a cellular network function are enabled, the terminal device may access the internet by using a cellular network. If the terminal device joins a WLAN created by a wireless access point 400, and the WLAN connects to the internet, the terminal device may access the internet by using the WLAN. If the terminal device may access the internet in a wired manner, the terminal device may access the internet by using a wired network.

In some embodiments, the network connection capability may further include one or more of the following: a network connection manner of the terminal device, an identifier of a network to which the terminal device connects and that accesses the internet, and quality of the network to which the terminal device connects and that accesses the internet.

The network connection manner may include accessing the internet by using a cellular network, a WLAN, a wired A network connection capability of the terminal device shown in Table 1 specifically includes connecting to a network and connecting to the network by using the cellular network, the WLAN, and the wired network. The network to which the terminal device connects and that accesses the internet includes a cellular network whose identifier is "4G 139xxxxxxxx", a cellular network whose identifier is "5G 139xxxxxxxx", a wireless local area network whose identifier is "Wi-Fi 3", and a wired network whose identifier is "wired network 1". Network quality of the several networks is respectively high, high, medium, and high.

Terminal devices in the communication system 10 may communicate with each other by using any one or more of the following technologies: Wi-Fi softAP, a WLAN, BT, Wi-Fi P2P, NFC, IR, a wired technology, or a remote communication technology. For specific implementation of communication between the terminal devices in the communication system, refer to related descriptions in FIG. 1.

That is, a connection that is between the devices in the communication system 10 and that is used to synchronize the network connection capability information includes any one of the following: a communication connection established based on the wireless access point 400 in the communication system, a communication connection established when another device is in an AP mode, a wireless fidelity peer-to-peer Wi-Fi P2P connection, a Bluetooth connection, a near field communication NFC connection, a wired connection, an Ethernet connection, a remote connection, or the like.

Based on the foregoing listed technologies of communication between devices, the terminal device in the communication system 10 may synchronize or send network connection capability information of the terminal device to another device in any one of the following cases:

1. After sensing the another device in the communication system 10, the terminal device sends the network connection capability information of the terminal device to the sensed another device. The terminal device may sense the another device in the communication system 10 by using the foregoing listed technologies of communication between devices. In this way, all terminal devices that join the communication system 10 can learn of the network connection capability information of the another device.

2. The terminal device may periodically send the network connection capability information of the terminal device to the another device in the communication system 10. A sending period is not specifically limited, and may be, for example, 1 day or 1 week.

3. When the network connection capability of the terminal device changes or is updated, the terminal device may send the network connection capability information of the terminal device to the another device in the communication system 10. In this way, when a network connection capability of a terminal device changes or is updated, it can be ensured that another terminal device in the communication system 10 can learn of a latest network connection capability of the terminal device.

The network connection capability information specifically indicates a network connection capability of the terminal device. That is, the network connection capability information indicates whether the terminal device connects to a network, and may further indicate one or more of a network connection manner of the terminal device, an identifier of a network to which the terminal device connects and that accesses the internet, and quality of the network to which the terminal device connects and that accesses the internet.

After obtaining the network connection capability information of the another device in the communication system 10, the terminal device 100 may further display the network connection capability information of the another device to a user. In this way, the user can conveniently learn of a network connection capability that is of another device and that can be borrowed by the terminal device 100, to trigger the terminal device 100 to borrow the network connection capability of the another device.

For example, FIG. 3E, FIG. 3F, FIG. 3H, and FIG. 3I show network connection capability information that is of another device in the communication system 10 and that is displayed and obtained by the terminal device 100. As shown in FIG. 3E and FIG. 3H, the terminal device 100 displays a cellular network type and a SIM card identifier of the another device (for example, a tablet or a watch). As shown in FIG. 3F and FIG. 3H, the terminal device 100 displays a name of a WLAN network to which the another device (for example, a tablet or a watch) connects.

This is not limited to the network connection capability information that is of the another device and that is displayed by the terminal device 100 in FIG. 3E, FIG. 3F, FIG. 3H, and FIG. 3I. In some other embodiments, the terminal device 100 may further display more network connection capability information of the another device, for example, may further display signal strength and a signal transmission rate. This is not limited herein.

Step S103: The terminal device 100 determines, in network-connected terminal devices, a terminal device that provides a network connection capability.

The terminal device 100 may determine, in the network-connected terminal devices by using any one or a combination of the following policies, the terminal device that provides the network connection capability.

1. The terminal device 100 determines, in a network-connected terminal device trusted by the terminal device 100, the terminal device that provides the network connection capability.

A terminal device trusted by the terminal device 100 may be referred to as a trusted device of the terminal device 100.

The trusted device of the terminal device 100 includes but is not limited to a device that logs in to a same system account (for example, a Huawei account) as the terminal device 100, a device bound to the terminal device 100, a device that joins a same group (for example, a family group) as the terminal device 100, a device that is set by the user, or the like.

With reference to the user interface 32 provided by the terminal device 100 shown in FIG. 3G and the user interface 54 provided by the terminal device 200 shown in FIG. 5D, it may be learned that both the terminal device 100 and the terminal device 200 log in to a Huawei account whose account name is "ID1".

With reference to the user interface 41 provided by the terminal device 300 shown in FIG. 4A, the user may bind the terminal device 300 to another device by tapping the control 404. The terminal device 100 may also be bound to another device in a similar manner. This is not limited thereto. The terminal device 100 may be further bound to another device in another manner, for example, bound to the another device in a touch manner or by using NFC. This is not limited herein.

After being bound to a plurality of devices, the terminal device 100 may further add the plurality of devices to a same group or different groups in response to a user operation. For example, the user may create two groups: a family group and an office group, and then add the devices to different groups.

In addition, the user may further manually set the trusted device on the terminal device 100. A manner of setting the trusted device is not limited herein. For example, the settings application in the terminal device 100 may provide a user interface for setting the trusted device, and the user may set the trusted device by using the user interface.

It may be learned that all trusted devices of the terminal device 100 are related to a user operation, and are secure devices trusted by the user. Herein, if the terminal device 100 has an information input/output apparatus, the terminal device 100 may independently complete a related operation related to the trusted device. If the terminal device 100 does not have an information input/output apparatus, the control device (for example, the terminal device 300) of the terminal device 100 may complete a related operation related to the trusted device. For example, the terminal device 300 may bind the terminal device 100 to another device, add the terminal device 100 and the another device to a same group, and provide a user interface for the user to set the trusted device, and the like.

In the policy 1, the terminal device 100 selects the trusted device as the terminal device that provides the network connection capability, and therefore the terminal device 100 can connect to the internet through the trusted and secure terminal device, to ensure data security of the terminal device 100 and avoid a risk such as data leakage.

2. The terminal device 100 determines, in the network-connected terminal device as the terminal device that provides the network connection capability, a terminal device selected by the user.

Specifically, the terminal device 100 may provide options of a plurality of network-connected terminal devices for the user to select, and determine, as the terminal device that provides the network connection capability, the terminal device selected by the user.

For example, with reference to FIG. 3E, the terminal device 100 may detect a user operation performed on the cellular network option 302*b*-1 in the cellular network display area 302*b* of another device, and determine a terminal device (namely, a tablet computer) corresponding to the cellular network option 302*b*-1 as the terminal device that provides the network connection capability.

For another example, with reference to FIG. 3F, the terminal device 100 may detect a user operation performed on the WLAN option 303*b*-1 in the WLAN display area 303*b* of another device, and determine a terminal device (namely, a tablet computer) corresponding to the WLAN option 303*b*-1 as the terminal device that provides the network connection capability.

For another example, with reference to FIG. 3H and FIG. 3I, the terminal device 100 may further detect a user operation performed on the cellular network option or the WLAN option, and determine a corresponding device as the terminal device that provides the network connection capability.

In the policy 2, the user may independently determine, based on a requirement, the terminal device that provides the network connection capability, to fully meet an actual requirement of the user and improve user experience.

In the policy 2, the user operation used to determine the terminal device that provides the network connection capability may be referred to as a first operation. For example, the first operation may include a user operation performed on the cellular network option 302*b*-1 in the cellular network display area 302*b* of another device, a user operation performed on the WLAN option 303*b*-1 in the WLAN display area 303*b* of another device, or a user operation performed on the cellular network option or the WLAN option.

3. The terminal device 100 selects, from the network-connected terminal device, a control device of the terminal device 100 as the terminal device that provides the network connection capability.

For example, a smartphone may be bound to devices such as a smartwatch, a smart sound box, a door lock, and a smart screen, and is used as a control device to control the devices bound to the smartphone. If the terminal device 100 is a smartwatch, a smart sound box, a door lock, or a smart screen, the terminal device 100 may select a control device, that is, select a smartphone, as the terminal device that provides the network connection capability.

This is not limited to the foregoing three policies. In this embodiment of this application, the terminal device 100 may further determine, based on another policy, the terminal device that provides the network connection capability. This is not limited herein. For example, from the network-connected terminal device, the terminal device 100 may randomly select a terminal device as the terminal device that provides the network connection capability, select a terminal device with best network quality as the terminal device that provides the network connection capability, select a terminal device whose network connection capability is borrowed for a largest quantity of times as the terminal device that provides the network connection capability, or select a terminal device whose network connection capability is most recently borrowed as the terminal device that provides the network connection capability.

Any several of the foregoing policies may be used in combination. For example, the terminal device 100 may determine, as the terminal device that provides the network connection capability by using a combination of the policy 1 and the policy 2 in a network-connected terminal device trusted by the terminal device 100, a terminal device selected by the user.

In some other embodiments of this application, if the terminal device 100 does not have an information input/output apparatus, the control device, for example, the terminal device 300, of the terminal device 100 may select, for the terminal device 100, the terminal device that provides the network connection capability. A policy used when the terminal device 300 selects, for the terminal device 100, the terminal device that provides the network connection capability is the same as the foregoing policy used when the terminal device 100 selects the terminal device 200. The terminal device 300 may notify the terminal device 100 of the selected terminal device that provides the network connection capability.

For example, with reference to FIG. 4C, the terminal device 300 may detect a user operation performed on the WLAN option 412*a*, and send an identifier of a terminal device (namely, a tablet computer) corresponding to the WLAN option 412*a* to the terminal device 100, and then the terminal device 100 determines the terminal device (namely, the tablet computer) indicated by the identifier as the terminal device that provides the network connection capability.

When the terminal device 100 does not have a display, the terminal device 100 may further receive a voice instruction of the user by using a microphone, and borrow a network connection capability of another device in response to the voice instruction.

In this embodiment of this application, the terminal device that is determined by the terminal device 100 and that provides the network connection capability may also be referred to as the terminal device 200.

Optional step S104: The terminal device 100 determines a to-be-borrowed network connection manner, and notifies the terminal device 200 of the network connection manner.

In this embodiment of this application, by performing optional step S104, the terminal device 100 may determine the to-be-borrowed network connection manner in advance, so that the terminal device 100 subsequently directly borrows the network connection manner selected in S104, to borrow the network connection capability of the terminal device 200.

In S104, the to-be-borrowed network connection manner determined by the terminal device 100 may include one or more manners. The network connection manner may include accessing the internet by using a cellular network, a WLAN, a wired network, or the like. The cellular network may further include 2G, 3G, 4G, 5G, 6G, or the like.

In some embodiments, the terminal device 100 may determine the to-be-borrowed network connection manner by default. For example, the terminal device 100 may determine a manner of accessing the internet by using the cellular network as the to-be-borrowed network connection manner by default.

In some other embodiments of this application, the terminal device 100 may determine the to-be-borrowed network connection manner in response to a received user operation (for example, a tap operation or a touch operation). For example, the terminal device 100 may provide one or more network connection manner options, and determine a network connection manner corresponding to a network connection manner option on which the user operation is detected as the network connection manner to be borrowed by the terminal device 100. For example, with reference to FIG. 3B, the notification bar 301 may further include an on/off control of a "distributed cellular network", an on/off control of a "distributed WLAN", and an on/off control of a "distributed wired network". The user may tap one or more on/off controls, to determine a network connection manner corresponding to the on/off control as the to-be-borrowed network connection manner. In this way, the user may determine, based on a requirement of the user, the network connection manner to be borrowed by the terminal device 100.

After determining the to-be-borrowed network connection manner, the terminal device 100 may notify the terminal device 200 of the determined network connection manner, for example, send indication information of the determined network connection manner to the terminal device 200.

In some other embodiments of this application, if the terminal device 100 does not have an information input/output apparatus, the control device, for example, the terminal device 300, of the terminal device 100 may determine the to-be-borrowed network connection manner for the terminal device 100, and then notify the terminal device 100 and the terminal device 200 of the determined network connection manner.

In S104, the to-be-borrowed network connection manner determined by the terminal device 100 may be referred to as a first network connection manner. The user operation that is entered by the user and that is used to determine the first network connection manner may be referred to as a second operation.

Optional step S105: The terminal device 100 determines a to-be-borrowed network, and notifies the terminal device 200 of the network.

In this embodiment of this application, by performing optional step S105, the terminal device 100 may determine the to-be-borrowed network in advance based on a network connection capability of the another device in a network to which the another device connects and that accesses the internet, so that the terminal device 100 subsequently directly borrows the network selected in S105.

In S105, the to-be-borrowed network determined by the terminal device 100 may include one or more networks. This is not limited in this application.

In some embodiments, the terminal device 100 may determine a network with best network quality as the to-be-borrowed network, determine a network borrowed for a largest quantity of times as the to-be-borrowed network, or determine a most recently borrowed network as the to-be-borrowed network.

In some other embodiments of this application, the terminal device 100 may determine the to-be-borrowed network in response to a received user operation (for example, a tap operation or a touch operation). For example, the terminal device 100 may provide one or more network options, and determine a network corresponding to a network option on which the user operation is detected as the network to be borrowed by the terminal device 100. In this way, the user may determine, based on a requirement of the user, the network to be borrowed by the terminal device 100.

For example, with reference to FIG. 3E, the terminal device 100 may detect a user operation performed on the cellular network option 302*b*-1 in the cellular network display area 302*b* of another device, and determine a network (namely, a cellular network to which a tablet computer connects) corresponding to the cellular network option 302*b*-1 as the to-be-borrowed network.

For another example, with reference to FIG. 3F, the terminal device 100 may detect a user operation performed on the WLAN option 303*b*-1 in the WLAN display area 303*b* of another device, and determine a network (namely, a WLAN that is named "Wi-Fi 3" and to which a tablet computer connects) corresponding to the WLAN option 303*b*-1 as the network to be borrowed by the terminal device 100.

For another example, with reference to FIG. 3H and FIG. 3I, the terminal device 100 may further detect a user operation performed on the cellular network option or the WLAN option, and determine a corresponding network as the to-be-borrowed network.

After determining the to-be-borrowed network, the terminal device 100 may notify the terminal device 200 of the determined network, for example, send an identifier of the determined network to the terminal device 200.

In some other embodiments of this application, if the terminal device 100 does not have an information input/output apparatus, the control device, for example, the terminal device 300, of the terminal device 100 may further determine the to-be-borrowed network for the terminal device 100, and then notify the terminal device 100 and the terminal device 200 of the determined network.

For example, with reference to FIG. 4C, the terminal device 300 may detect a user operation performed on the WLAN option 412*a*, and send an identifier of a network (namely, a WLAN that is named "Wi-Fi 3" and that is provided by a tablet computer) corresponding to the WLAN option 412*a* to the terminal device 100, and then the terminal device 100 determines the network (namely, the WLAN that is named "Wi-Fi 3" and that is provided by the tablet computer) indicated by the identifier as the to-be-borrowed network.

In S105, the to-be-borrowed network determined by the terminal device 100 may be referred to as a first network. The user operation that is entered by the user and that is used to determine the first network may be referred to as a third operation.

Step S106: The terminal device 100 establishes a communication connection to the terminal device 200 in a manner different from a hotspot.

Establishing a connection by using a hotspot means that the terminal device 200 works in an AP mode and creates a wireless local area network, and then the terminal device 100 connects to the wireless local area network created by the terminal device 200, to establish a connection to the terminal device 200.

In S106, the communication connection established between the terminal device 100 and the terminal device 200 may include any one of the following: a Wi-Fi direct/Wi-Fi P2P connection, a BT connection, an NFC connection, an IR connection, a wired connection, an Ethernet connection, a remote connection, or the like. The BT connection may be a classic Bluetooth connection, or may be a Bluetooth low energy (BLE) connection. The remote connection means that the terminal device 100 and the terminal device 200 each connect to a server and communicate with each other through the server.

A process of establishing, by the terminal device 100, a connection to the terminal device 200 in S106 is an internal device interaction process invisible to the user. In a process of performing S106, no user intervention or operation is required.

For example, if the terminal device 100 establishes a BT connection to the terminal device 200, the following steps do not need to be performed: After finding another nearby device by using a Bluetooth technology, the terminal device 100 displays an identifier of the another found device. Then, the user taps an identifier of the terminal device 200. Then, the terminal device 200 displays pairing confirmation information. After the user taps to confirm pairing, the terminal device 100 establishes a Bluetooth connection to the terminal device 200.

That is, based on S106 in this embodiment of this application, a manual pairing operation performed by the user can be omitted, and user behavior can be simplified, to improve efficiency of establishing a connection between devices, so as to improve user experience.

In some embodiments, the terminal device 100 may send a request message used to borrow the network connection capability to the terminal device 200. After receiving the request message, the terminal device 200 may directly respond to the request message to establish a communication connection, to the terminal device 100, that is different from the hotspot, or may establish a communication connection, to the terminal device 100, that is different from the hotspot after outputting prompt information and receiving a user operation. The prompt information may be referred to as third prompt information.

For example, with reference to FIG. 5A, after receiving the request message sent by the terminal device 100, the terminal device 200 displays the prompt window 501. Then, the terminal device 200 may send, to the terminal device 100 in response to a user operation performed on the control 501*b*, a feedback message indicating that the terminal device 200 agrees to lend the network connection capability, and establish a communication connection, to the terminal device 100, that is different from the hotspot, to lend the network connection capability to the terminal device 100. The control 501*b* may be referred to as a first control.

In some other embodiments, after receiving the request message that is sent by the terminal device 100 and that is used to borrow the network connection capability, the terminal device 200 may determine whether the terminal device 100 is a device in a trustlist, or determine whether the terminal device 100 is a trusted device of the terminal device 200. If a determining result is yes, the terminal device 200 establishes a communication connection, to the terminal device 100, that is different from the hotspot, to lend the network connection capability to the terminal device 100. The trustlist may be set by the terminal device 200. For a manner of setting the trustlist, refer to related descriptions in FIG. 5D and FIG. 5E. For a definition of the trusted device, refer to related descriptions in S103.

In some embodiments of this application, if the terminal device 100 and the terminal device 200 have established a communication connection in a manner different from the hotspot when joining the communication system 10, step S106 may be omitted. For example, if the terminal device 100 and the terminal device 200 have joined the communication system 10 by establishing a Bluetooth connection, S106 may not need to be performed. For another example, if the terminal device 100 and the terminal device 200 have joined the communication system 10 by establishing a remote connection, S106 may not need to be performed.

Step S107: The terminal device 100 communicates with the internet through the terminal device 200 based on the communication connection to the terminal device 200.

When the terminal device 100 communicates with the internet, an uplink path is terminal device 100→terminal device 200→internet. Uplink data to be sent by the terminal device 100 to the internet is transmitted by using the uplink path.

When the terminal device 100 communicates with the internet, a downlink path is internet→terminal device 200→terminal device 100. Downlink data to be sent by the internet to the terminal device 100 is transmitted by using the downlink path.

In a process in which the terminal device 100 communicates with the internet, the terminal device 100 communicates with the terminal device 200 by using the communication connection that is established in S106 and that is different from the hotspot, and the terminal device 200 communicates with the internet by using one or more networks. A network that is used to support the terminal device 100 in communicating with the internet and that is between the terminal device 200 and the internet may be referred to as a shared network. That is, the terminal device 200 shares the shared network with the terminal device 100, to support the terminal device 100 in communicating with the internet. The shared network is a network to which the terminal device connects 200 and that accesses the internet. There may be one or more shared networks.

In the process in which the terminal device 100 communicates with the internet, the shared network may be determined in any one or more of the following manners.

1. If the terminal device 100 performs S104, the terminal device 200 may select, as the shared network from a connected network that accesses the internet, a network corresponding to the network connection manner determined by the terminal device 100 in S104.

For example, if the terminal device 100 determines, in S104, that the to-be-borrowed network connection manner is accessing the internet by using the cellular network, the terminal device 200 selects the connected cellular network as the shared network.

For another example, if the terminal device 100 determines, in S104, that the to-be-borrowed network connection manner is accessing the internet by using the WLAN, the terminal device 200 may select the connected wireless local area network as the shared network.

2. If the terminal device 100 performs S105, the terminal device 200 selects, as the shared network, the network determined by the terminal device 100 in S105.

For example, with reference to FIG. 3E, after the terminal device 100 determines the network (namely, the cellular network to which the tablet computer connects) corresponding to the cellular network option 302*b*-1 as the to-be-borrowed network, the terminal device 200 selects the network (namely, the cellular network to which the tablet computer connects) corresponding to the cellular network option 302*b*-1 as the shared network.

For another example, with reference to FIG. 3F, after the terminal device 100 determines the network (namely, the WLAN that is named "Wi-Fi 3" and to which the tablet computer connects) corresponding to the WLAN option 303*b*-1 as the to-be-borrowed network, the terminal device 200 selects the network (namely, the WLAN that is named "Wi-Fi 3" and that is provided by the tablet computer) corresponding to the WLAN option 303*b*-1 as the shared network.

3. If the terminal device 100 performs neither S104 nor S105, the terminal device 200 may randomly select one or more networks as the shared network from a connected network that accesses the internet, select a network with best network quality as the shared network, select a network shared for a largest quantity of times as the shared network, or select a most recently shared network as the shared network.

This is not limited to the foregoing several manners. In this embodiment of this application, the terminal device 200 may further determine the shared network in another manner. This is not limited herein. For example, the terminal device 200 may use all connected networks that access the internet as the shared network. For another example, the user may preset the shared network on the terminal device 200, and the terminal device 200 may select the shared network based on a setting status of the user.

In some embodiments, after determining the shared network, the terminal device 200 may further notify the terminal device 100 of the shared network. For example, the terminal device 200 may send an identifier of the shared network to the terminal device 100.

In S107, a network connection manner used by the terminal device 200 may be referred to as a first network connection manner, and the shared network may be referred to as a first network.

In this embodiment of this application, after S106 is performed, in a process of performing S107, both the terminal device 100 and the terminal device 200 may display prompt information, to prompt the user with information indicating that the terminal device 100 is currently sharing the network connection capability of the terminal device 200. For a manner of outputting the prompt information by the terminal device 100, refer to FIG. 3F, FIG. 3I, and related descriptions. For a manner of outputting the prompt information by the terminal device 200, refer to FIG. 5B, FIG. 5C, and related descriptions. Herein, the prompt information output by the terminal device 100 may be referred to as first prompt information, and the prompt information output by the terminal device 200 may be referred to as second prompt information.

Based on S101 to S103, S106, and S107 in the network connection method shown in FIG. 6, provided that another device near the terminal device 100 can connect to the internet, the terminal device 100 may connect to the internet by borrowing a network connection capability of the another device. In some embodiments, the terminal device 100 may connect to the internet by borrowing a network connection capability of a remote device. In this way, a plurality of terminal devices at a short distance and the remote device may form a communication system, and each terminal device in the communication system may borrow a network connection capability of another device in the system, to implement free flowing of the network connection capability.

When the terminal device 100 cannot connect to the internet, the method shown in FIG. 6 may enable the terminal device 100 to access the internet by borrowing a network connection capability of another device. When network quality of the terminal device 100 is poor, the terminal device 100 may enhance a network connection between the terminal device 100 and the internet by using the method shown in FIG. 6. For example, when the terminal device 100 is a tablet computer and current network quality is poor, the terminal device 100 may access the internet by using a cellular network of a surrounding mobile phone.

In addition, the terminal device 100 establishes a communication connection to the terminal device 200 in a manner different from the hotspot. Therefore, neither the terminal device 100 needs to display an identifier of a WLAN created when another found device works in an AP mode, nor the user needs to select a WLAN identifier to borrow a network connection capability of the another device. That is, the terminal device 100 may borrow a network connection capability of another device without performing a complex operation. This is more convenient for the user.

According to S101 to S103, S106, and S107 in the network connection method shown in FIG. 6, even if the terminal device 100 does not have a display, the terminal device 100 may borrow a network connection capability of another device. Therefore, there is no case in which the internet cannot be accessed because an information input/output operation (for example, verifying a WLAN) cannot be performed.

According to S101 to S103, S106, and S107 in the network connection method shown in FIG. 6, the terminal device 100 may share a WLAN of the terminal device 200. If the WLAN is a network that can be accessed only after complex verification is performed, the terminal device 100 may borrow the WLAN without a complex verification process.

In a process of performing the network connection method shown in FIG. 6, the terminal device 100 may further access the internet by using one or more of a WLAN created by the wireless access point 400, a cellular network, or a wired manner. A connection relationship between the terminal device 100 and the internet does not affect borrowing, by the terminal device 100, a network connection capability of another device.

The terminal device 100 establishes a communication connection to the terminal device 200 in a manner different from the hotspot. Therefore, the terminal device 100 may simultaneously access the internet by using the WLAN created by the wireless access point 400. Even if only one Wi-Fi network interface controller is configured for the terminal device 100, the terminal device 100 may still use the Wi-Fi network interface controller to connect to the WLAN created by the wireless access point 400, and establish a communication connection to the terminal device 200 in a manner different from the hotspot.

In this way, when the terminal device 100 accesses the internet through the terminal device 200, the terminal device 100 may also access the internet, to implement multi-channel network concurrency and increase a speed and improve efficiency of communicating with the internet.

For example, the terminal device 100 may implement the following several dual-channel network concurrency scenarios:

The terminal device 100 accesses the internet by using a WLAN to which the terminal device 100 connects and a WLAN to which the terminal device 200 connects.

The terminal device 100 accesses the internet by using a WLAN to which the terminal device 100 connects and a cellular network to which the terminal device 200 connects.

The terminal device 100 accesses the internet by using a cellular network to which the terminal device 100 connects and a WLAN to which the terminal device 200 connects.

The terminal device 100 accesses the internet by using a cellular network to which the terminal device 100 connects and a cellular network to which the terminal device 200 connects.

This is not limited to the dual-channel concurrency scenario. The terminal device 100 may further implement a three-channel or more-channel network concurrency scenario. For example, the terminal device 100 may further access the internet by using a WLAN to which the terminal device 100 connects and a WLAN and a cellular network to which the terminal device 200 connects. For another example, the terminal device 100 may further access the internet by using a WLAN and a cellular network to which the terminal device 100 connects and a WLAN or a cellular network to which the terminal device 200 connects.

The foregoing listed multi-channel concurrency scenarios are merely examples. In specific implementation, the terminal device 100 may further have other or more multi-channel concurrency scenarios, which are not listed herein one by one.

Based on S104 in the method shown in FIG. 6, the terminal device 100 may determine the to-be-borrowed network connection manner, and notify the terminal device 200 of the to-be-borrowed network connection manner, and the terminal device 200 does not need to determine the to-be-provided network connection manner. This can improve efficiency of providing the network connection capability by the terminal device 200, and provide better user experience.

Based on S105 in the method shown in FIG. 6, the terminal device 100 may determine the to-be-borrowed network, and notify the terminal device 200 of the to-be-borrowed network, and the terminal device 200 does not need to determine the to-be-provided network. This can improve efficiency of providing the network connection capability by the terminal device 200, and provide better user experience.

In the network connection method shown in FIG. 6, the terminal device 200 may further enable traffic-free services of some or all applications by using a SIM card. An application for which the traffic-free service is enabled may be referred to as a traffic-free application. When the terminal device 200 runs the traffic-free application, data used for communication with the internet by using a cellular network corresponding to the SIM card is not charged. After the terminal device 200 enables the traffic-free service, a server 500 may record a correspondence between a SIM card and a traffic-free application, that is, associate and record an identifier of the SIM card and an identifier of the traffic-free application.

When S107 is performed, if the server 500 detects that data packets (including an uplink data packet and a downlink data packet) involved when the terminal device 100 communicates with the internet are from a traffic-free application, fees required for transmitting these data packets are waived.

Optionally, the data packet involved when the terminal device 100 communicates with the internet in S107 may carry a corresponding identifier of an application or other information about an application (for example, an identifier or an address of a server that provides a service for the application) and an identifier of a shared network of the terminal device 200. After the server 500 detects the data packet existing when the terminal device 100 communicates with the internet in S107, if a data packet is from a traffic-free application and carries an identifier of a cellular network corresponding to a SIM card for which the traffic-free service is activated, traffic fees required for transmitting the data packet are waived, and no charging processing is performed on the data packet.

That is, if the terminal device 200 enables the traffic-free service, when a data packet involved in running of a traffic-free application in the terminal device 100 is transmitted by using the cellular network of the terminal device 200, required traffic fees are not calculated.

In some other embodiments, data packets (including an uplink data packet and a downlink data packet) involved when the terminal device 100 communicates with the internet in S107 may further carry more information, for example, an IP address and a domain name of the terminal device 200. This is not limited herein. In this way, the server 500 considers that all data packets in the communication process in S107 are generated when the terminal device 200 runs, to implement sharing of free traffic.

In the communication system 10 shown in FIG. 1 and the method procedure shown in FIG. 6 that are provided in embodiments of this application, the terminal device 100 may also be referred to as a first device, and the terminal device 200 may also be referred to as a second device.

The communication connection established between the terminal device 100 and the terminal device 200 in S106 in a manner different from the hotspot may be referred to as a first communication connection.

The communication connection that is between the terminal devices, that is used to synchronize the network connection capability information, and that is in S102 may be referred to as a second communication connection.

Figure 7:
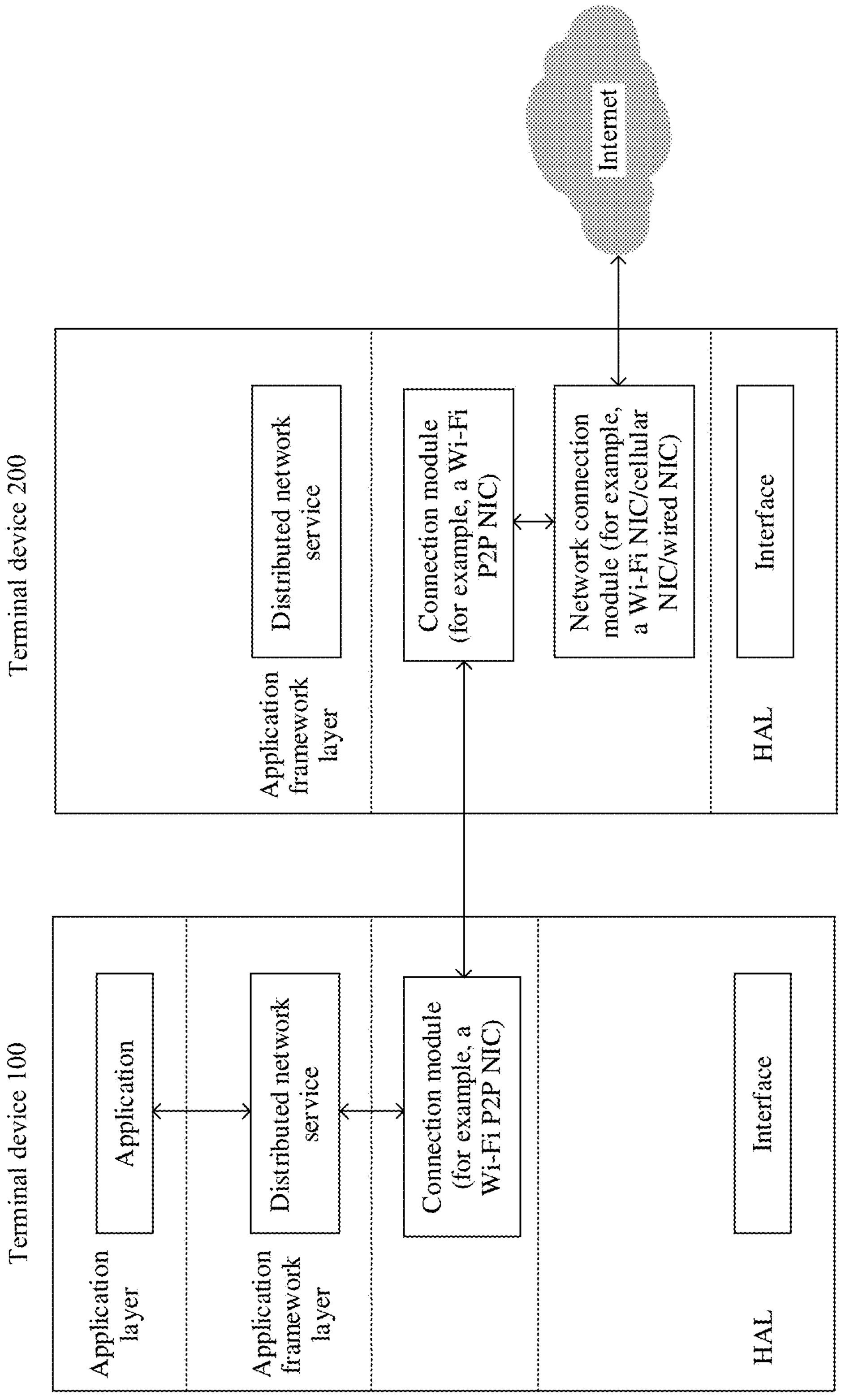
FIG. 7 is a diagram of a data flowing direction existing when a network sharing method is implemented according to an embodiment of this application.

FIG. 7 is an example of a diagram of a data flowing direction involved when a terminal device 100 communicates with the internet by using the network connection method provided in embodiments of this application.

As shown in FIG. 7, the terminal device 100 includes an application at an application layer, a distributed network connection service at an application framework layer, a connection module, and a HAL at a bottom layer. A terminal device 200 includes a distributed network connection service at an application framework layer, a connection module, a network connection module, and a HAL at a bottom layer.

It may be understood that structures of the terminal device 100 and the terminal device 200 in FIG. 7 are of simplified versions. For detailed structures of the terminal device 100 and the terminal device 200 and functions of modules, refer to related descriptions in FIG. 2A, FIG. 2B-1, and FIG. 2B-2.

For the terminal device 100, the application at the application layer may be an application that needs to interact with the internet, for example, may include a browser application or an online video application. After determining that the terminal device 200 connects to a network, the distributed network connection service notifies the application at the application layer, so that the application learns that a network can currently connect to the internet and runs normally. Then, the distributed network connection service establishes a connection to the connection module, for example, establishes a socket interface, to bind the distributed network connection service to the connection module, so as to facilitate subsequent communication.

The respective connection modules in the terminal device 100 and the terminal device 200 are configured to support the terminal device 100 and the terminal device 200 in establishing a communication connection in a manner different from a hotspot. For example, the connection module may include a Bluetooth communication module, configured to support the terminal device 100 and the terminal device 200 in establishing a Bluetooth communication. For another example, the connection module may include a Wi-Fi network interface controller that supports a Wi-Fi P2P technical specification, and is configured to support the terminal device 100 and the terminal device 200 in establishing a Wi-Fi P2P connection. Herein, the Wi-Fi network interface controller that is in the connection module and that supports the Wi-Fi P2P technical specification may be a physical network interface controller, or may be a result obtained by virtualizing some apparatuses that are in the Wi-Fi network interface controller and that support the Wi-Fi P2P technical specification.

The network connection module in the terminal device 200 is configured to support the terminal device 200 in accessing the internet. The network connection module may include one or more of a wireless communication module (for example, including a Wi-Fi network interface controller), a mobile communication module (for example, including a cellular network interface controller), or a wired communication module (for example, including a wired network interface controller), and may further include another related module such as an antenna. The wireless communication module is configured to support the terminal device 200 in accessing the internet by using a WLAN. The mobile communication module supports the terminal device 200 in accessing the internet by using a cellular network. The wired communication module supports the terminal device 200 in accessing the internet by using a wired network.

In both an uplink communication process and a downlink communication process, the terminal device 200 transmits data by using a network connection module corresponding to a shared network. For example, if the shared network is a cellular network, data is transmitted by using the cellular network interface controller; or if the shared network is a wireless local area network, data is transmitted by using the Wi-Fi network interface controller.

A double-arrow line in FIG. 7 represents a data flowing direction in a process in which the terminal device 100 communicates with the internet.

In the uplink communication process, an application in the terminal device 100 generates a data packet, and the data packet passes through the distributed network connection service and the connection module in the terminal device 100, the communication connection between the terminal device 100 and the terminal device 200, and the connection module and the network connection module in the terminal device 200, and then flows to the internet.

In the downlink communication process, a data packet returned by the internet is first sent to the network connection module in the terminal device 200, then passes through the connection module in the terminal device 200, the communication connection between the terminal device 100 and the terminal device 200, and the connection module and the distributed network connection service in the terminal device 100, and finally reaches the application in the terminal device 100.

If there is one shared network of the terminal device 200, the terminal device 200 transmits data in both the uplink communication process and the downlink communication process by using a network connection module corresponding to the shared network. For example, if the shared network is a cellular network, data is transmitted by using the cellular network interface controller; or if the shared network is a wireless local area network, data is transmitted by using the Wi-Fi network interface controller.

If there are a plurality of shared networks of the terminal device 200 and a plurality of types, the distributed network connection service in the terminal device 100 or the terminal device 200 is further responsible for fragmenting or assembling communication data.

For example, the terminal device 100 is responsible for data fragmentation and assembly. In the uplink communication process, the distributed network connection service in the terminal device 100 may classify data packets from the application into different types of shared networks, for example, add a cellular network identifier to some data packets, and add a WLAN identifier to the other data packets. Then, these data packets are transmitted by the distributed network connection service in the terminal device 100 to the distributed network connection service in the terminal device 200 without passing through the connection module. Then, the terminal device 200 transmits different data packets by using different network connection modules, for example, transmits a data packet including the cellular network identifier by using the cellular network interface controller, and transmits a data packet including the WLAN identifier by using the Wi-Fi network interface controller.

In the downlink communication process, the terminal device 200 may receive, by using a plurality of network connection modules, data packets delivered by the internet, and then transmit the data packets to the distributed network connection service in the terminal device 100 by using the distributed network connection service. The distributed network connection service in the terminal device 100 assembles the plurality of data packets, and then transmits the data packets to the upper-layer application.

A process in which the terminal device 200 fragments and assembles communication data is similar to the process in which the terminal device 100 fragments and assembles communication data. For details, refer to related descriptions.

The terminal device 100 in FIG. 7 may further include a network connection module. A specific structure of the network connection module is similar to a structure of the network connection module in the terminal device 200. For details, refer to the foregoing related descriptions.

If the terminal device 100 accesses the internet and accesses the internet by using the shared network of the terminal device 200, the distributed network connection service in the terminal device 100 is responsible for fragmenting or assembling communication data. Specifically, in the uplink communication process, the distributed network connection service in the terminal device 100 respectively classifies data packets from the application into a local network and the shared network. The data packet classified into the local network is sent by the distributed network connection service to the network connection module, and then sent to the internet. The data packet classified into the shared network is transmitted by the distributed network connection service to the network connection module in the terminal device 200 through a path shown in FIG. 7, and then sent to the internet. The downlink communication process is a reverse process of the uplink communication process. Details are not described herein. In this way, when the terminal device 100 accesses the internet through the terminal device 200, the terminal device 100 may also access the internet, to implement multi-channel network concurrency and increase a speed and improve efficiency of communicating with the internet.

In the network connection method provided in embodiments of this application, each device may transmit data by using the transmission control protocol/internet protocol (TCP/IP).

The TCP/IP transmission model includes four layers from bottom to top.

1. A link layer (data link layer/network interface layer) includes a device driver in an operating system and a corresponding network interface controller in a computer. Link layer protocols include the address resolution protocol (ARP), the reverse address resolution protocol (RARP), and the like.

2. A network layer (internet layer) is configured to process an activity of a packet in a network, for example, routing of the packet. Network layer protocols include the internet protocol (IP), the routing information protocol (RIP), the internet control message protocol (ICMP), and the like.

3. A transport layer is configured to provide peer-to-peer communication for applications on two hosts. Transport layer protocols may include the transmission control protocol (TCP), the user datagram protocol (UDP), and the like.

4. An application layer is responsible for processing specific application details. Application layer protocols may include the file transfer protocol (FTP), the hypertext transfer protocol (HTTP), the remote terminal protocol (telent), the simple mail transfer protocol (SMTP), the domain name service (DNS) protocol, and the like.

In a communication process, a data packet has different formats, which are sequentially referred to as a segment, a datagram, a frame, and data from top to bottom, at the layers. The data packet is transmitted downward from the application layer by using a protocol stack. Each time the data packet passes through a layer, a header of a protocol at the corresponding layer is added to the data packet. Finally, the data packet is encapsulated into a frame and sent to a transmission medium. When the data packet reaches a router or a destination host, a header is removed, and the data packet is delivered to an upper-layer party that needs the data packet.

In the network connection method shown in FIG. 6, in a process in which the terminal device 100 borrows the network connection capability of the terminal device 200 to communicate with the internet, each device differently processes a data packet.

Figure 8:
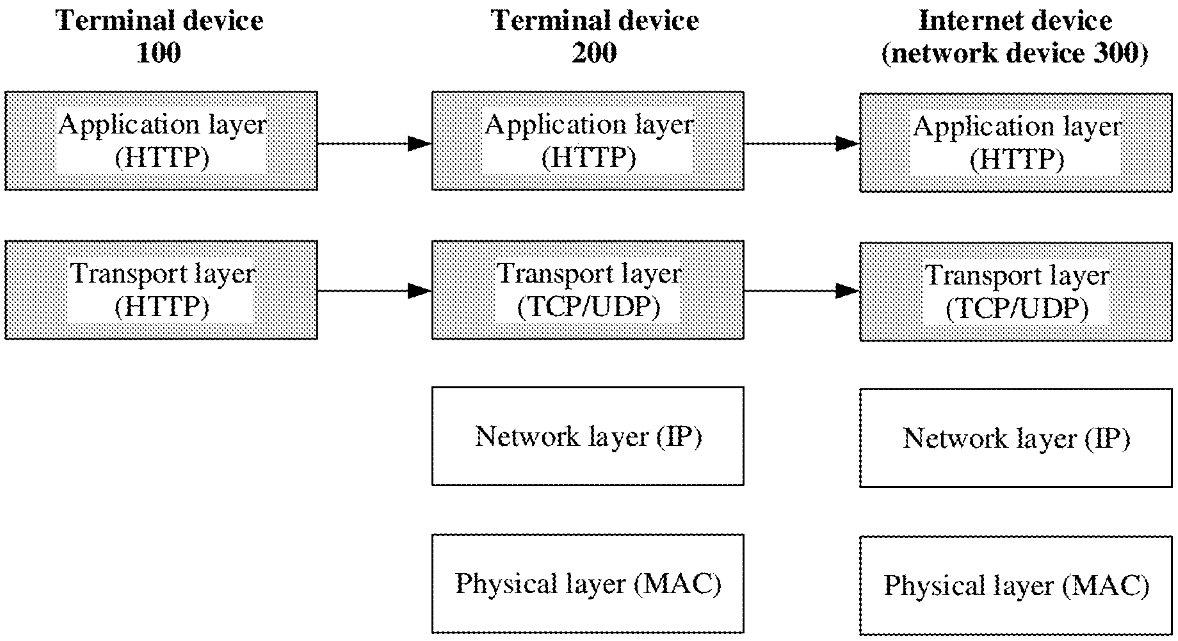
FIG. 8 shows a manner of processing a data packet by each device in a process in which a terminal device 100 borrows a network connection capability of a terminal device 200 to communicate with the internet.

FIG. 8 shows an example of a manner of processing a data packet by each device in a process in which a terminal device 100 borrows a network connection capability of a terminal device 200 to communicate with the internet.

As shown in FIG. 8, in the process in which the terminal device 100 accesses the internet through the terminal device 200, because the terminal device 100 does not directly access the internet, the terminal device 100 performs processing only at an application layer and a transport layer on the data packet, and does not perform processing at a network layer and a physical layer. The terminal device 100 and the terminal device 200 communicate with each other at the application layer and the transport layer, and do not communicate with each other at the network layer and the physical layer. The terminal device 200 may perform processing at the network layer and the physical layer on a data packet from the internet or the terminal device 100, and then send the data packet to the terminal device 100 or the internet. An internet device, for example, the network device 300 or the wireless access point 400, may perform processing at the foregoing four layers on the data packet.

The method for continuously borrowing, by a terminal device, a network connection capability of another device is described in the foregoing embodiments. The following describes a method for temporarily borrowing, by a terminal device, a web capability of another device to access a captive portal wireless network (captive portal Wi-Fi).

In the network connection method provided in embodiments of this application, when a terminal device that does not have a web capability needs to access captive portal Wi-Fi, the terminal device may temporarily use a web capability of another terminal device to complete authentication, and access captive portal Wi-Fi. Herein, the terminal device that does not have a web capability only temporarily borrows the web capability of the another device, and may no longer borrow the web capability of the another device after accessing captive portal Wi-Fi. A terminal device that requests to access captive portal Wi-Fi may also be referred to as a STA device.

Herein, captive portal Wi-Fi is provided by an AP. The AP may be the wireless access point 400 described in the foregoing process in which a terminal device borrows a network connection capability of another device. That is, in embodiments described above, the wireless access point 400 may be configured to provide captive portal Wi-Fi for which authentication needs to be performed.

A web application (for example, a browser application) is usually installed in a STA device having a web capability, and the STA device having a web capability may support the hypertext transfer protocol (HTTP) or the hypertext transfer protocol secure (HTTPS).

Herein, captive portal Wi-Fi is a web-based open wireless network that provides security authentication. When the STA device requests to access a wireless network of this type, if the AP does not store a media access control (MAC) address of the STA device that currently requests access, the AP may provide, by using a redirection technology, a page address of a captive portal website page (web page) for the STA device. If determining that the Wi-Fi type of the wireless network for which access is currently requested is captive portal Wi-Fi, the STA device may display the web page by using the web application (for example, a browser) based on the page address of the portal website page. The web page may require a user to enter authentication information, pay, accept some license agreement terms or other user authorization, or the like. After determining that the user completes a requirement such as authentication for the web page, the STA device sends a confirmation signal to the AP. The AP can provide captive portal Wi-Fi for the STA device only after it is determined, based on the received confirmation signal, that the user completes authentication for the web page. Then, the AP stores the MAC address of the STA device. Within a preset time, when requesting to access captive portal Wi-Fi again, the STA device can directly access captive portal Wi-Fi without performing the login procedure.

The redirection technology includes a hypertext transfer protocol (HTTP) redirection technology. The HTTP redirection technology means that the AP directs all traffic of a world wide web to a preset captive portal website. For example, the STA device sends an HTTP request (namely, a network access request) to the AP based on the HTTP protocol. When determining that the MAC address of the STA device is currently not stored (for example, when the STA device connects to the world wide web through the AP for the first time), the AP feeds back an HTTP 302 status code and an HTTP uniform resource locator (URL) of the portal website to the STA device based on the HTTP request sent by the STA device. Then, the STA device accesses a redirected URL based on the HTTP protocol, logs in to the portal website, and displays the web page. That is, before authentication is completed, when the STA device sends any HTTP requests to the AP, received URLs are URLs of the same portal website, and the HTTP 302 status code can be received. Based on this, the STA device can determine, based on the received HTTP status code, that the wireless network for which access is currently requested is captive portal Wi-Fi.

The redirection technology further includes a domain name system (DNS) redirection technology. The DNS redirection technology means that the AP directs all DNS queries to an internet protocol (IP) address of a preset captive portal website. For example, after receiving any domain name system request (namely, a network access request) sent by the STA device, the AP feeds back the IP address of the portal website to the STA device, that is, the AP uses the IP address of the portal website as a destination address of an internet resource requested by the STA device. Correspondingly, the STA device logs in to the portal website based on the received IP address, and displays the web page. Based on this, after the STA device sends two or more domain name system requests, if the same IP address is received, it is determined that the wireless network for which access is currently requested is captive portal Wi-Fi.

Figure 9:
FIG. 9 is a schematic diagram of a Wi-Fi authentication scenario according to an embodiment of this application.

For example, as shown in FIG. 9, it is assumed that a wireless network provided by an AP 11 is captive portal Wi-Fi, a mobile phone 12 sends a network access request to the AP 11, and the AP 11 sends a URL or an IP address of a captive portal page to the mobile phone 12. In this case, the mobile phone 12 enters the portal website page by using a browser application, and displays an interface 201 shown in FIG. 10, to request a user to perform authentication. Then, after the mobile phone 12 detects an operation of tapping a control 21 by the user, it indicates that the user completes authentication, and an authentication confirmation signal is sent to the AP 11. After determining, based on the authentication confirmation signal, that the user completes authentication, the AP 11 stores a MAC address of the mobile phone 12, and allows the mobile phone 12 to access captive portal Wi-Fi.

It may be learned that the STA device (for example, the mobile phone 12 shown in FIG. 9) can complete authentication on the portal website and access captive portal Wi-Fi only when the STA device has a web capability. A web application is usually installed in a STA device having a web capability, and the STA device having a web capability may support HTTP or HTTPS. The web application is an application that can be accessed by using a web, for example, a browser application. However, a device having no screen, a device having an ultra-small screen, or a device that does not have a web capability because a web application is not installed due to low memory or other reasons cannot access or has difficulty in accessing captive portal Wi-Fi. Consequently, a requirement of a user for such a device to access captive portal Wi-Fi cannot be met, and user experience is affected.

Therefore, an embodiment of this application provides a network connection method, so that a terminal device that does not have a web capability can use a terminal device having a web capability to complete access authentication for captive portal Wi-Fi, to meet a requirement of a user for different terminal devices to access captive portal Wi-Fi, and improve user experience.

Figure 11:
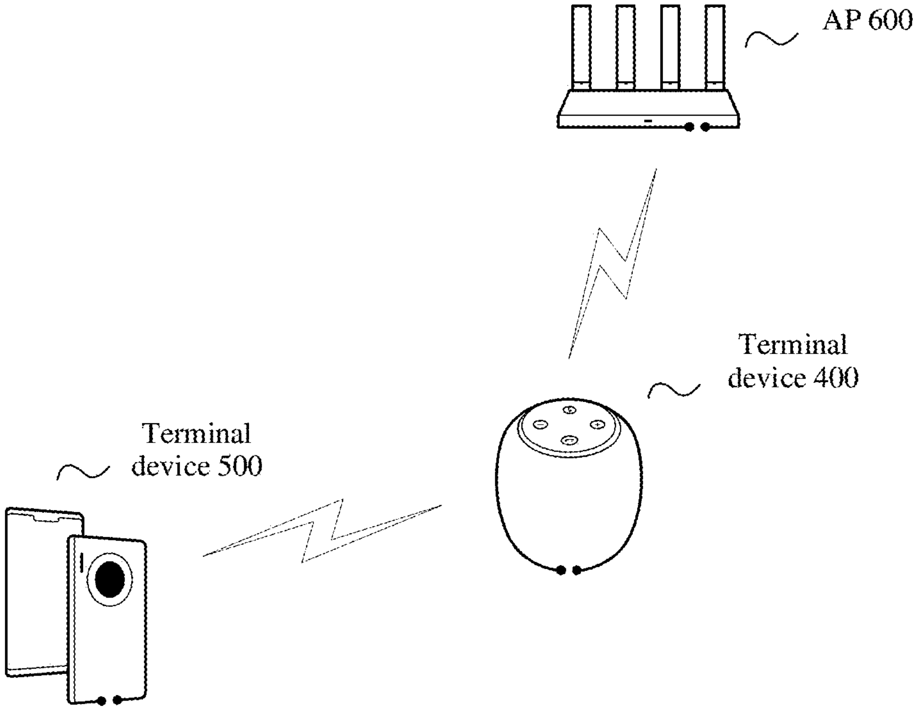
FIG. 11 is a schematic diagram of a communication system in a network connection method according to an embodiment of this application.

FIG. 11 is a schematic diagram of a communication system according to an embodiment of this application. As shown in FIG. 11, the communication system includes a terminal device 400, a terminal device 500, and an AP 600. A communication connection is established between the terminal device 400 and the terminal device 500. For example, the AP 600 may provide captive portal Wi-Fi, the terminal device 400 does not have a web capability, the terminal device 500 has a web capability, and a wireless communication connection is established between the terminal device 400 and the terminal device 500. The terminal device 400 may exchange authentication data by using the wireless communication connection to the terminal device 500, to access the AP 600.

Optionally, the terminal device 400 may establish a wireless communication connection to the terminal device 500 by using a wireless communication technology. The wireless communication technology includes but is not limited to at least one of the following: Bluetooth (BT) (for example, conventional Bluetooth or Bluetooth low energy (BLE)), a wireless local area network (WLAN) (for example, a Wi-Fi network), near field communication (NFC), ZigBee, frequency modulation (FM), infrared (IR), and the like.

In some embodiments, both the terminal device 400 and the terminal device 500 support a proximity discovery function. For example, after the terminal device 400 approaches the terminal device 500, the terminal device 400 and the terminal device 500 can discover each other, and then establish a wireless communication connection such as a Bluetooth connection or a Wi-Fi peer-to-peer (peer-to-peer, P2P) connection. Then, the terminal device 400 and the terminal device 500 can determine capabilities of each other through signal interaction. For example, the terminal device 400 sends a capability query request to the terminal device 500 by using a Bluetooth connection, and determines, based on a capability query response, that the terminal device has a web capability.

For example, the terminal device 400 includes but is not limited to a smart sound box, a wearable device (for example, a smartwatch, a smart band, or smart glasses), another internet of things (IoT) device, and a device that does not have a web capability and cannot or has difficulty in accessing captive portal Wi-Fi, for example, a device in which a web application is not installed due to low memory or other reasons. An operating system may be installed in the terminal device 400. The operating system installed in the terminal device 400 includes but is not limited to iOS®, Android®, Harmony®, Windows®, Linux®, or another operating system. Alternatively, an operating system may not be installed in the terminal device 400. A specific type of the terminal device 400, whether an operating system is installed, and a type of an installed operating system are not limited in this application.

For example, the terminal device 500 includes but is not limited to a device that has a web capability and can access captive portal Wi-Fi, for example, a smartphone, a tablet computer, a laptop computer (Laptop), a personal digital assistant (PDA), a vehicle-mounted device, or an artificial intelligence (AI) device. An operating system installed in the terminal device 500 includes but is not limited to iOS®, Android®, Harmony®, Windows®, Linux®, or another operating system. In some embodiments, the terminal device 500 may be a stationary device, or may be a portable device. A specific type and an installed operating system of the terminal device 500 are not limited in this application.

The terminal device 400 and the terminal device 100 described in the foregoing embodiment in which a terminal device borrows a network connection capability of another device may be a same device, or may be different devices.

The terminal device 500 and the terminal device 200 described in the foregoing embodiment in which a terminal device borrows a network connection capability of another device may be a same device, or may be different devices.

The AP 600 is configured to provide captive portal Wi-Fi for which authentication needs to be performed. The AP 600 may be the wireless access point 400 in the communication system shown in FIG. 1, or may be another wireless access point.

It should be noted that a web application is usually installed in a terminal device having a web capability, and the terminal device having a web capability may support a protocol stack for accessing a web page, for example, HTTP or HTTPS. The web application is an application that can be accessed by using a web, for example, a browser application. Details are not described below.

In this embodiment of this application, a structure of the terminal device 400 that borrows a web capability of another device to access captive portal Wi-Fi is similar to that of the terminal device shown in FIG. 3A. For details, refer to FIG. 2A and related descriptions. For example, the terminal device 400 may include at least one processor, at least one memory, a wireless communication module, a power management module, an audio module, a sensor module, a universal serial bus (USB) port, an indicator, a motor, and the like. The terminal device 400 does not include a display.

The memory may be configured to store application code, for example, application code used for performing wireless pairing and establishing a connection between the terminal device 400 and the terminal device 500, to establish a wireless connection between the terminal device 400 and the terminal device 500; process a wireless connection service of the terminal device 400; charge the terminal device 400; and the like.

The processor may be configured to: execute the application code, and invoke a related module to implement the function of the terminal device 400 in this embodiment of this application. For example, functions such as a wireless Bluetooth connection and wireless network access between the terminal device 400 and the terminal device 500 are implemented. For another example, signal interaction between the terminal device 400 and the terminal device 500 is implemented, and the terminal device 500 is used to complete authentication for a portal website of captive portal Wi-Fi.

The wireless communication module may be configured to support data exchange of wireless communication, including BT, a WLAN (for example, Wi-Fi), ZigBee, FM, NFC, IR, a general 2.4G/5G wireless communication technology, or the like, between the terminal device 400 and the terminal device 500.

In some embodiments, the wireless communication module may be a Bluetooth chip. The terminal device 400 may be paired with and establish a wireless connection to the Bluetooth chip in the terminal device 500 by using the Bluetooth chip, to implement wireless communication and service processing between the terminal device 400 and the terminal device 500 by using the wireless connection. Usually, the Bluetooth chip may support Bluetooth basic rate (BR)/enhanced data rate (EDR) and Bluetooth low energy (BLE), for example, may receive/send paging information, and receive/send a BLE broadcast message. The Bluetooth chip may alternatively be a Bluetooth transceiver. The terminal device 400 may establish a wireless connection to the terminal device 500 by using the Bluetooth transceiver, to implement short-distance data exchange between the terminal device 400 and the terminal device 500, for example, exchange portal website data and control data.

In some embodiments, the wireless communication module may be a Wi-Fi chip. The terminal device 400 may detect, by using the Wi-Fi chip, an AP that provides a wireless network, and request to access the AP, to access the wireless network.

In this embodiment of this application, a structure of the terminal device 500 that provides a web capability is similar to that of the terminal device shown in FIG. 2A. For details, refer to FIG. 2A and related descriptions.

The terminal device 500 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, a subscriber identity module (SIM) card interface 195, and the like.

In some embodiments, the terminal device 500 receives a data packet that corresponds to the portal website and that is sent by the terminal device 400, and displays a portal website page by using the display 194 based on the data packet. Then, the terminal device 500 detects, by using a touch sensor, an authentication operation performed by a user on the portal website page. The terminal device 500 generates a corresponding data packet based on the authentication operation performed by the user, and sends the data packet to the terminal device 400.

A software system of a terminal device may use a layered architecture, an event-driven architecture, a microkernel architecture, a micro service architecture, or a cloud architecture. In embodiments of this application, an Android system of a layered architecture is used as an example to describe a software structure of the terminal device.

Figure 12:
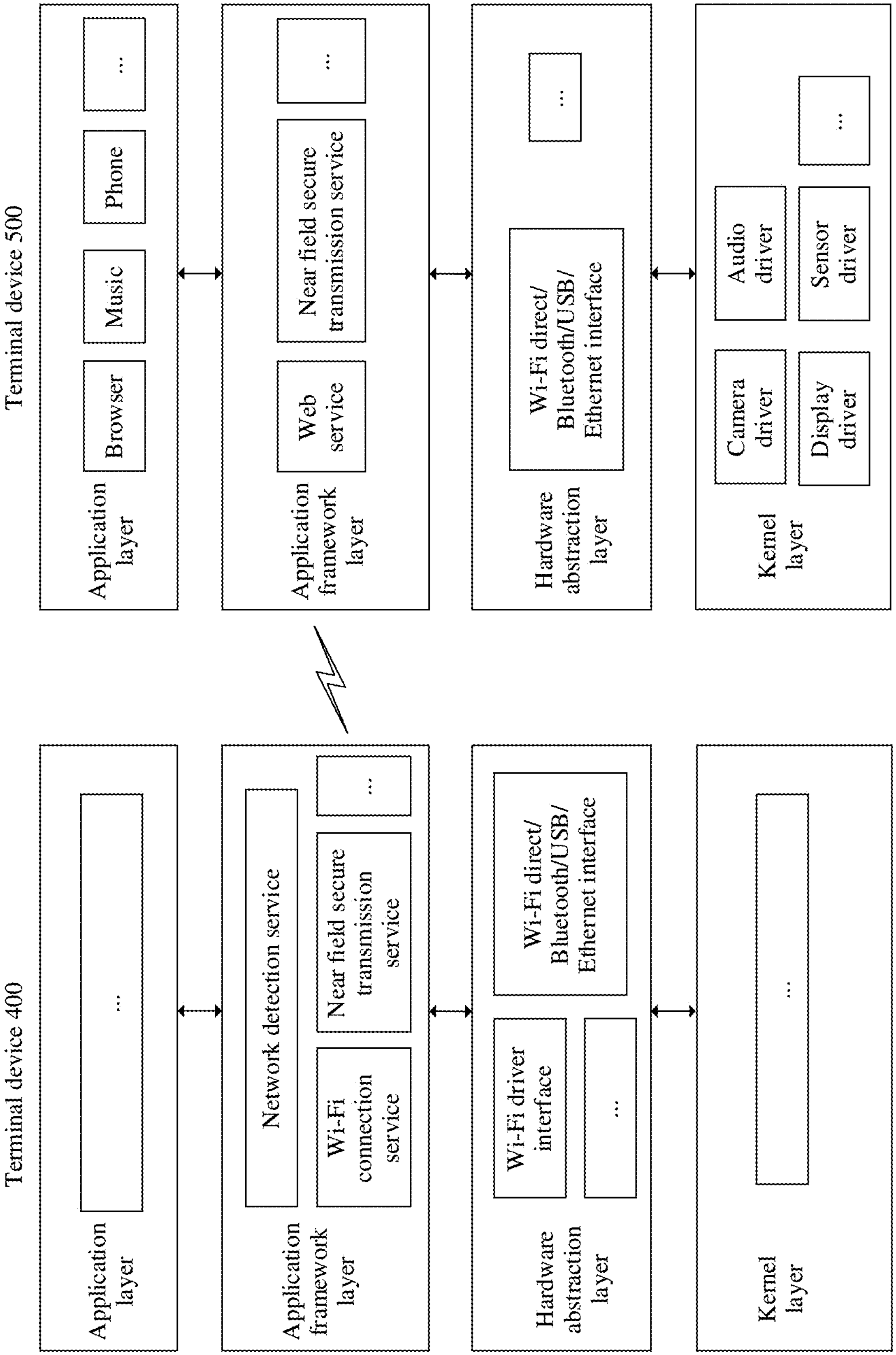
FIG. 12 is a block diagram of software structures of a terminal device 400 and a terminal device 500 according to an embodiment of this application.

FIG. 12 is a block diagram of software structures of a terminal device 400 and a terminal device 500 according to an embodiment of this application.

In a layered architecture, software is divided into several layers, and each layer has a clear role and task. The layers communicate with each other through a software interface. In some embodiments, an Android system is divided into four layers: an application layer, an application framework layer, a hardware abstraction layer (HAL), and a kernel layer from top to bottom.

The application layer may include a series of application packages. The application packages may include applications such as Camera, Gallery, Calendar, Phone, Map, Navigation, WLAN, Bluetooth, Music, Video, and Messaging.

For example, as shown in FIG. 12, an application layer of the terminal device 500 may include applications such as Browser, Music, and Call. The browser application is a web application. An application layer of the terminal device 400 does not include a web application. That is, the terminal device 400 does not have a web capability, and the terminal device 500 has a web capability.

Optionally, the block diagram of the software structure shown in this embodiment of this application does not constitute a specific limitation on the terminal device. For example, the terminal device may not include an application layer, that is, no application is installed in the terminal device.

The application framework layer provides an application programming interface (application programming interface, API) and a programming framework for an application at the application layer. The application framework layer includes some predefined functions.

For example, as shown in FIG. 12, an application framework layer of the terminal device 400 may include a network detection service, a Wi-Fi connection service, a near field secure transmission service, and the like. An application framework layer of the terminal device 500 may include a web service, a near field secure transmission service, and the like.

In some embodiments, the network detection service is used to determine whether a hotspot for which a connection is requested is a captive portal Wi-Fi hotspot, and perform processing such as data transmission in a process of requesting to access this type of hotspot.

The Wi-Fi connection service is used to control an on or off state of Wi-Fi, scan for a nearby Wi-Fi device, establish a Wi-Fi connection, and the like.

The near field secure transmission service is used for discovery, authentication, authorization, and information transmission between near field devices. For example, by using the near field secure transmission service, the terminal device 400 and the terminal device 500 discover each other, complete authentication and authorization, and then may perform data transmission. In some embodiments, the terminal device 400 that does not have a web capability can establish, by using the near field secure transmission service, a wireless connection to the terminal device 500 that has a web capability. In addition, the terminal device 400 determines, through signal interaction with the terminal device 500, that the terminal device 500 has a web capability.

The web service is used to provide HTTP access and interaction support for an application. In some embodiments, if the terminal device 500 has a web capability, the web service is configured at the application framework layer, to implement HTTP access of a web application (for example, a browser) and display a portal website of captive portal Wi-Fi.

The HAL is located between the kernel layer and the application framework layer, and is configured to: define an interface for implementation of driver application hardware, and convert a value implemented by the driver hardware into a software implementation programming language. For example, in the terminal device 500 shown in FIG. 12, a HAL identifies a value of a camera driver, converts the value into a software programming language, and uploads the software programming language to the application framework layer, to invoke a camera service system.

For example, as shown in FIG. 12, a HAL in the terminal device 400 may include a Wi-Fi driver interface, a Wi-Fi direct/Bluetooth/USB/Ethernet interface, and the like, and the HAL in the terminal device 500 may include a Wi-Fi direct/Bluetooth/USB/Ethernet interface, and the like.

The kernel layer is a layer between hardware and software. The kernel layer may include a display driver, a camera driver, an audio driver, a sensor driver, and the like.

Figure 13:
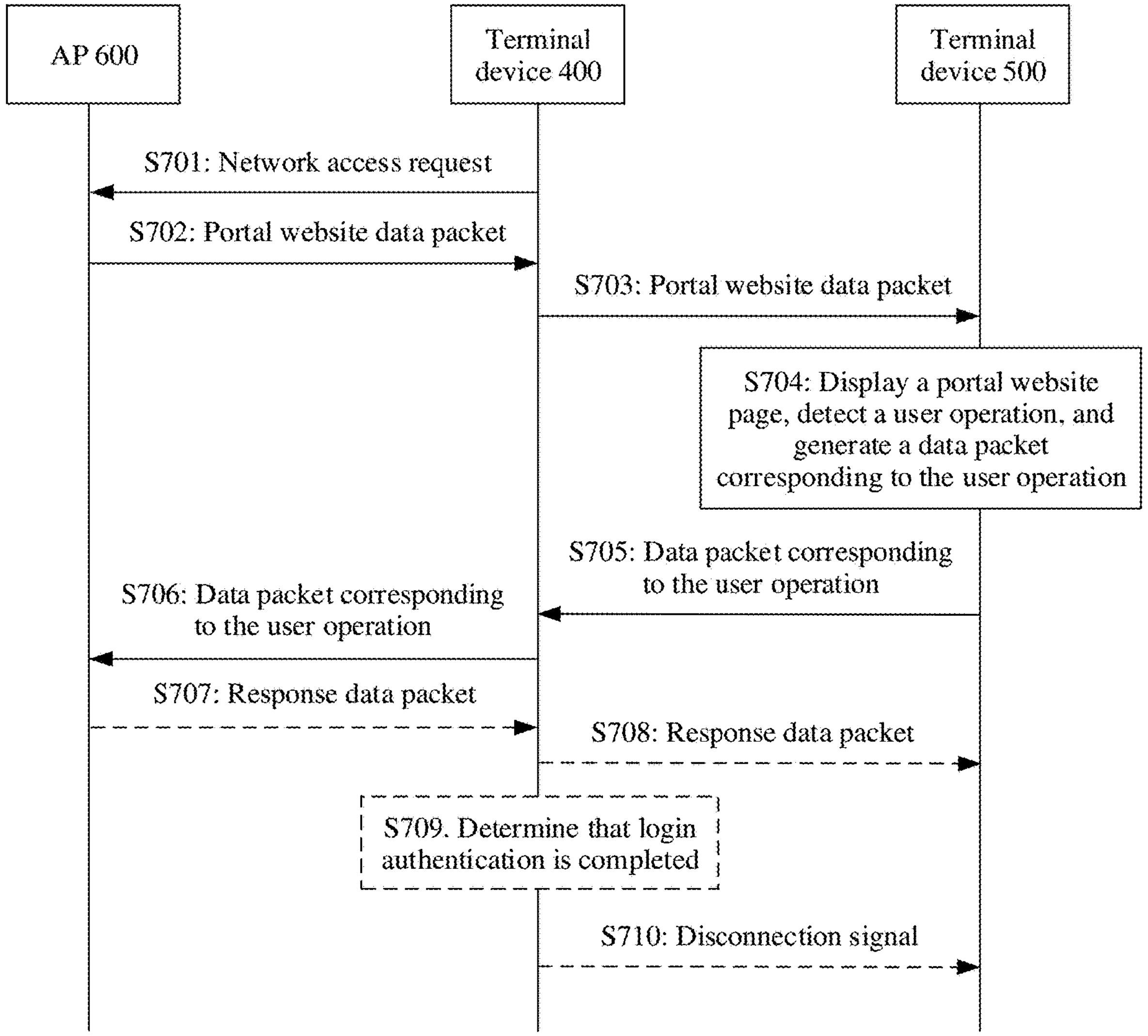
FIG. 13 is a flowchart of a network connection method according to an embodiment of this application.

For example, FIG. 13 is a schematic diagram of a network connection method according to an embodiment of this application. In the network connection method shown in FIG. 13, a terminal device 400 may temporarily borrow a web capability of another device to access captive portal Wi-Fi.

As shown in FIG. 13, the method may include the following steps.

Step S701: The terminal device 400 sends a network access request to an AP 600, to request to access a wireless network provided by the AP 600.

In some embodiments, when detecting, by using the network detection service at the application framework layer shown in FIG. 12, a Wi-Fi hotspot provided by the AP 600, the terminal device 400 sends the network access request to the AP 600, to request to access the wireless network provided by the AP 600. The network access request carries a MAC address of the terminal device 400. Correspondingly, the AP 600 receives the network access request sent by the terminal device 400.

Step S702: The AP 600 sends a portal website data packet to the terminal device 400.

The portal website data packet may be referred to as a first data packet.

If a Wi-Fi type provided by the AP 600 is captive portal Wi-Fi, the AP 600 determines, based on the MAC address in the received network access request, whether the MAC address is locally stored. If the MAC address is stored, the AP 600 may allow the terminal device 400 to directly access the wireless network, and send an access acknowledgment response to the terminal device 400, or send network data corresponding to the network access request. If the MAC address is not stored, it is determined that portal website login authentication needs to be performed on the terminal device 400.

In some embodiments, if the AP 600 does not store the MAC address of the terminal device 400, the AP 600 may directly send the portal website data packet to the terminal device 400 in response to the network access request received in S701.

In some other embodiments, if the AP 600 does not store the MAC address of the terminal device 400, the AP 600 may send, to the terminal device 400 in response to the network access request received in S701, a network access response that carries an address of a portal website (which may also be referred to as a portal website address). Herein, a data packet of the network access response that carries the portal website address may be referred to as a third data packet.

The terminal device 400 receives and parses the network access response sent by the AP 600, and determines, based on the network access response, whether the Wi-Fi type is captive portal Wi-Fi. If the Wi-Fi type provided by the AP 600 is captive portal Wi-Fi, after receiving and parsing the network access response, the terminal device 400 obtains the portal website address, and determines that login authentication needs to be performed.

In some embodiments, as described above, corresponding to an HTTP redirection technology and a DNS redirection technology of the AP 600, the terminal device 400 determines, by using two methods, whether the Wi-Fi type is captive portal Wi-Fi. One method is to determine, based on an HTTP status code received after an HTTP request is sent, whether the Wi-Fi type is captive portal Wi-Fi. The other method is to determine, based on whether IP addresses received after DNS query requests with different domain names are sent are the same, whether the Wi-Fi type is captive portal Wi-Fi.

For example, in step S701, if the network access request sent by the terminal device 400 to the AP 600 includes an HTTP request, the terminal device 400 determines the Wi-Fi type based on an HTTP status code carried in the received network access response. If the HTTP status code carried in the network access response received by the terminal device 400 is 302, it is determined that the Wi-Fi type is captive portal Wi-Fi. Correspondingly, if the HTTP status code carried in the network access response received by the terminal device 400 is another status code (for example, 204), it is determined that the Wi-Fi type is not captive portal Wi-Fi. The HTTP request sent by the terminal device 400 may be an HTTP request corresponding to any website address.

For another example, in step S701, if the network access request sent by the terminal device 400 to the AP 600 includes at least two DNS query requests with different domain names, in step S703, the terminal device 400 determines the Wi-Fi type based on IP addresses carried in the received network access response.

Specifically, if the AP 600 does not provide captive portal Wi-Fi, after DNS query requests with different domain names are received, the network access response carries different IP addresses corresponding to the DNS query requests with different domain names. If the AP 600 provides captive portal Wi-Fi, after DNS query requests with different domain names are received, an IP address of the portal website is returned for each DNS query request. In this case, the network access response carries a same IP address, and the IP address is the address of the portal website. Therefore, if the IP addresses carried in the network access response received by the terminal device 400 are a same IP address, it is determined that the Wi-Fi type is captive portal Wi-Fi; or if the network access response received by the terminal device 400 carries different IP addresses, it is determined that the Wi-Fi type is not captive portal Wi-Fi.

In some embodiments, a redirection technology preconfigured in the AP 600 for application includes an HTTP redirection technology or a DNS redirection technology, and the terminal device 400 neither knows in advance whether the AP 600 provides captive portal Wi-Fi, nor knows a redirection technology currently applied to the AP 600. Therefore, based on the foregoing two redirection technologies, in step S701, the network access request sent by the terminal device 400 includes at least one HTTP request and at least two DNS query requests with different domain names. Therefore, after receiving the network access request, the AP 600 may implement redirection of the portal website address by using the HTTP redirection technology or the DNS redirection technology, and send a network access response carrying an HTTP status code and a URL to the terminal device 400, or send a network access response carrying an IP address to the terminal device 400. Alternatively, the terminal device 400 sends two network access requests that respectively carry at least one HTTP request and at least two DNS query requests with different domain names to the AP 600, so that a corresponding network access response can be received regardless of a redirection technology applied to the AP 600.

In some other embodiments, if the terminal device 400 learns in advance of a redirection technology applied to the AP 600, in step S701, the terminal device 400 sends a network access request carrying corresponding data to the AP 600 based on the redirection technology applied to the AP 600. For example, if learning in advance that the redirection technology applied to the AP 600 is an HTTP redirection technology, the terminal device 400 sends a network access request carrying at least one HTTP request to the AP 600. For another example, if learning in advance that the redirection technology applied to the AP 600 is a DNS redirection technology, the terminal device 400 sends a network access request carrying at least two DNS query requests with different domain names to the AP 600.

In some embodiments, the portal website address carried in the network access response obtained by the terminal device 400 includes, for example, a URL or an IP address, and a portal website access request may be sent to the AP 600 based on the portal website address, to request to access the portal website. Correspondingly, after receiving the portal website access request, the AP 600 may send the corresponding portal website data packet to the terminal device 400.

In S702, the portal website data packet sent by the AP 600 to the terminal device 400 includes page data corresponding to the portal website, and is used to display a portal website login page.

Step S703: The terminal device 400 forwards the portal website data packet to a terminal device 500.

In some embodiments, the terminal device 400 does not have a web capability, after determining that the Wi-Fi type of the hotspot that needs to be accessed is captive portal Wi-Fi, may determine that the hotspot needs to be accessed by using a web capability of another device, and therefore needs to establish a communication connection to the nearby terminal device 500 having a web capability. The communication connection between the terminal device 400 and the terminal device 500 may be a Bluetooth connection, a Wi-Fi direct connection, or the like.

For example, the terminal device 400 scans for a nearby device that can establish a Bluetooth connection, for example, obtains the terminal device 500 through scanning, and establishes a Bluetooth connection to the terminal device 500. Then, a capability request signal is sent to the terminal device 500 based on the Bluetooth connection, to determine whether the terminal device 500 has a web capability. If determining, based on signal feedback sent by the terminal device 500, that the terminal device 500 has a web capability, the terminal device 400 may transmit data to the terminal device 500 based on the Bluetooth connection, for example, send the portal website data packet to the terminal device 500. If determining, based on signal feedback sent by the terminal device 500, that the terminal device 500 does not have a web capability, the terminal device 400 may disconnect the Bluetooth connection, and rescan to access another terminal device having a web capability.

Optionally, in a process of establishing a communication connection (for example, a Bluetooth connection), the terminal device 400 may further determine, through signal interaction, whether a to-be-connected terminal device has a web capability. If the to-be-connected terminal device has a web capability, a communication connection is established. If the to-be-connected terminal device does not have a web capability, no communication connection is established. An occasion for determining the web capability of the terminal device 500 is not specifically limited in this embodiment of this application.

It should be noted that an occasion for establishing, by the terminal device 400, a communication connection to the terminal device 500 is not limited in this embodiment of this application. For example, the terminal device 400 may establish a communication connection to the terminal device 500 before step S701 (that is, before requesting to access the hotspot). For another example, after determining that the Wi-Fi type is captive portal Wi-Fi and the terminal device 400 does not have a web capability, the terminal device 400 establishes a communication connection to the terminal device 500 having a web capability.

In addition, an occasion for determining, by the terminal device 400, a nearby device having a web capability is not limited in this embodiment of this application. For example, before step S701 (that is, before requesting to access the hotspot), the terminal device 400 first scans for a nearby device, to determine one or more devices having a web capability. Then, when needing to access captive portal Wi-Fi, the terminal device 400 directly establishes a communication connection to any determined device (for example, the terminal device 500) having a web capability, and forwards the portal website data packet to the device.

Further, the terminal device 400 may scan for a nearby device based on a preset period, and update a list of nearby devices having a web capability, to avoid a case in which a communication connection cannot be established because a device moves beyond a communication distance.

In some implementations, the terminal device 400 establishes, by using the near field secure transmission service at the application framework layer shown in FIG. 12, a communication connection to the terminal device 500 having a web capability. Then, the terminal device 400 forwards the received portal website data packet to the terminal device 500. Correspondingly, the terminal device 500 receives the portal website data packet sent by the terminal device 400.

Step S704: The terminal device 500 displays a portal website page, detects a user operation, and generates a data packet corresponding to the user operation.

In some embodiments, after receiving the portal website data packet, the terminal device 500 renders the portal website page in a browser application or another web application by using a web service based on the portal website data packet, and displays the portal website page visible to a user, to receive a login confirmation operation performed by the user in a login authentication process.

Figure 10:
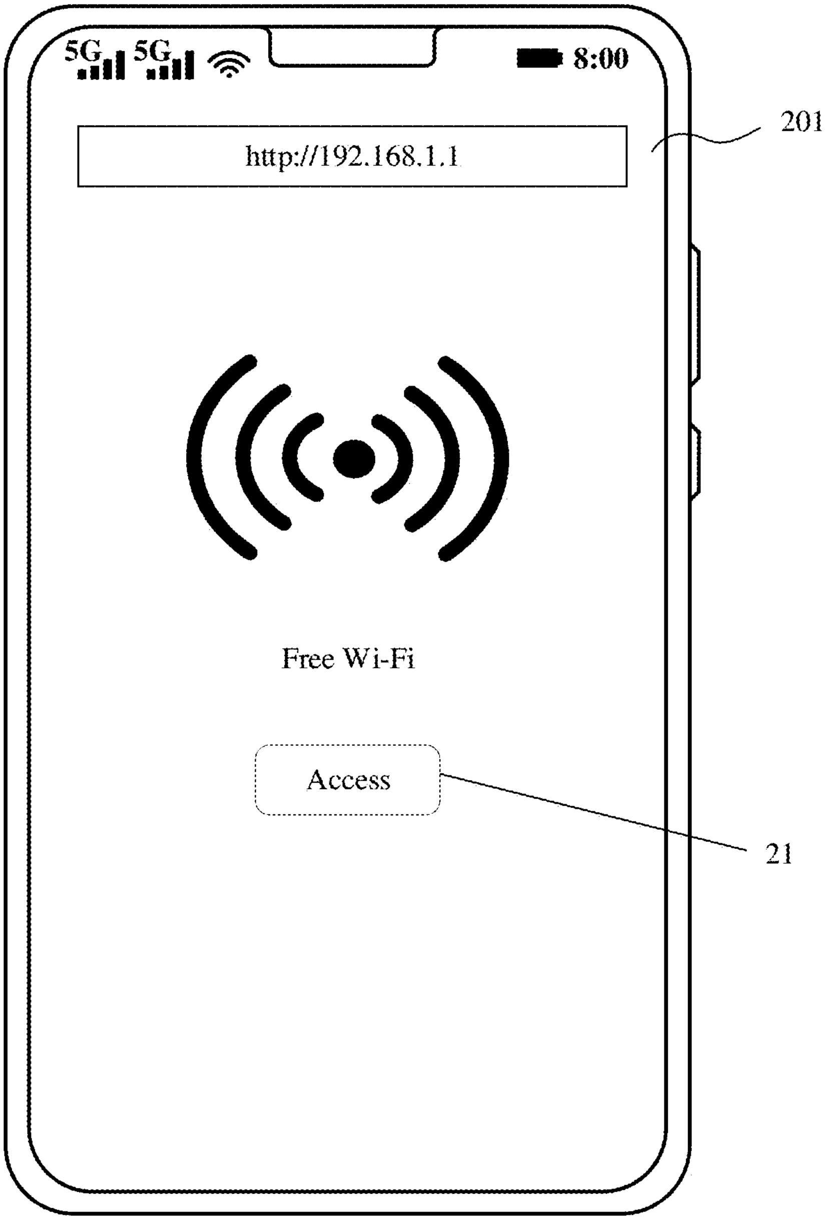
FIG. 10 is a schematic diagram of an interface according to an embodiment of this application.

For example, for the interface 201 shown in FIG. 10, the terminal device 500 may display the interface 201, to detect a login authentication operation performed by the user, and generate a data packet corresponding to the user operation. For example, if detecting an operation of tapping the control 21 by the user, the terminal device 500 generates data corresponding to the operation of tapping the control 21.

In some embodiments, when another application is run in foreground (for example, when the user is playing a game and a game interface is displayed), if the portal website data packet is received, the terminal device 500 may first display prompt information (for example, display the prompt information by using a notification bar or display the prompt information by using a prompt card) after receiving the portal website data packet, to prompt the user to determine whether to help the terminal device 400 perform Wi-Fi login authentication. Then, after detecting an operation of tapping an OK control by the user, the terminal device 500 displays the portal website interface, to avoid a case in which an operation that is being performed by the user is disturbed because the portal website page is directly displayed.

In addition, if detecting a non-confirmation operation (for example, an operation of tapping a cancel control) performed by the user, the terminal device 500 sends a display failure response to the terminal device 400, to notify the terminal device 400 that the portal website fails to be displayed, so that the terminal device 400 reselects another terminal device having a web capability to establish a communication connection and perform Wi-Fi login authentication.

Further, if the terminal device 400 does not receive, within a preset response time, a response signal (for example, the data packet that corresponds to the user operation and that is sent by the terminal device 500 in the following step S705) sent by the terminal device 500, it may be determined that Wi-Fi login authentication on the terminal device 500 fails, and another terminal device having a web capability needs to be reselected to establish a communication connection and perform Wi-Fi login authentication.

In some other embodiments, when receiving the portal website data packet in a screen-locked state, the terminal device 500 displays prompt information, to prompt the user with information indicating that the portal website page used to help the terminal device 400 perform Wi-Fi login authentication currently needs to be displayed. After receiving a confirmation operation and an unlock operation performed by the user, the terminal device 500 may display the portal website page.

The login confirmation operation detected in step S704 may be referred to as a sixth operation, and the data packet generated in S704 may be referred to as a second data packet.

Step S705: The terminal device 500 sends the data packet corresponding to the user operation to the terminal device 400.

In some embodiments, the web service in the terminal device 500 monitors a data packet generated in the browser application or another web application, and then forwards the data packet to the terminal device 400. Correspondingly, the terminal device 400 receives the data packet corresponding to the user operation. For example, in the scenario that is shown in FIG. 10 and that is in the example in step S704, the terminal device 500 generates the corresponding data packet after detecting the operation of tapping the control 21 by the user, packages the data packet, and then sends the data packet to the terminal device 400. The data packet can indicate the login confirmation operation performed by the user. The operation that is of tapping the control 21 by the user and that is detected by the terminal device 500 may be referred to as a seventh operation.

In some embodiments, in a process of performing a step (for example, step S704) related to accessing the AP 600 by the terminal device 400, the terminal device 500 may further perform a step of accessing a network by the terminal device 500, for example, accessing a hotspot, and receiving and sending a network message. For example, the web service in the terminal device 500 may selectively monitor and forward, in a preset manner, a network data packet (for example, the data packet corresponding to the user operation) related to login authentication on the terminal device 400 for captive portal Wi-Fi, and send such a data packet to the terminal device 400, instead of directly exchanging such a data packet with the AP 600. The preset manner includes, for example, presetting a special system interface, presetting a specific field of a data packet, or another manner. A network data packet corresponding to the terminal device 400 and a network data packet of the terminal device 400 are distinguished in the preset manner.

Step S706: The terminal device 400 forwards the data packet corresponding to the user operation to the AP 600.

In some embodiments, after receiving the data packet that corresponds to the user operation and that is sent by the terminal device 500, the terminal device 400 forwards the data packet to the AP 600 by using a source address and a source port of the terminal device 400, and performs login authentication interaction with the AP 600 for the portal website. The AP 600 determines, based on the address and the port corresponding to the received data packet, to perform login authentication on the terminal device 400. In this case, only after subsequent login authentication succeeds, the AP 600 can allow the terminal device 400 with the source address and the source port to perform data interaction with the AP 600.

That is, in a login authentication process for the portal website corresponding to the terminal device 400, the terminal device 500 needs to send, to the terminal device 400, a received feedback data packet of a data packet sent by the terminal device 400, and then the terminal device 400 forwards the feedback data packet to the AP 600. Correspondingly, a data packet sent by the AP 600 to the terminal device 400 also needs to be forwarded by the terminal device 400 to the terminal device 500. That is, the data packet corresponding to the terminal device 400 is not directly transmitted between the terminal device 500 and the AP 600, and the terminal device 400 plays a role of data packet forwarding.

It should be noted that step S707 to step S709 in a dashed line box shown in FIG. 13 may be performed for a plurality of times until login authentication for captive portal Wi-Fi is completed. For example, in some embodiments, after receiving the data packet corresponding to the user operation, the AP 600 determines a data meaning of the data packet corresponding to the user operation, to determine whether login authentication is completed or whether further login authentication is required. If further authentication is required, S704 to S706 further need to be performed again. In this case, in a process of displaying the portal website page, the terminal device 500 receives one or more login confirmation operations performed by the user.

For example, if a login authentication manner for the portal website is SMS verification code login authentication, the portal website page displayed by the terminal device 500 is an SMS verification page. After detecting that the user enters a phone number (the phone number may be a phone number corresponding to the terminal device 500 or a phone number corresponding to another terminal device) and determining an operation of sending a verification code (that is, step S704), the terminal device 500 sends the data packet corresponding to the user operation to the terminal device 400 (that is, step S705). The terminal device 400 forwards the data packet to the AP 600 (that is, step S706). After receiving the data packet, the AP 600 sends the verification code to the terminal device corresponding to the received phone number by using a module such as an SMS service center connected in background, and sends a response data packet to the terminal device 400. The response data packet indicates that the verification code is successfully requested. The terminal device 400 forwards the response data packet to the terminal device 500. Then, the user views the verification code on the terminal device that receives the verification code, and enters the verification code on the portal website page displayed by the terminal device 500 (that is, step S704). After detecting an operation of entering the verification code by the user and confirming that filling of the verification code is completed, the terminal device 500 sends the corresponding data packet to the terminal device 400 (that is, step S705), and then the terminal device 400 forwards the data packet to the AP 600 (that is, step S706).

After step S704 to step S706 are performed for one or more times, the AP 600 may determine that login authentication on the terminal device 400 for the portal website succeeds, and allow the terminal device 400 to access captive portal Wi-Fi provided by the AP 600. In this case, the terminal device 400 successfully accesses, by temporarily borrowing the web capability of the terminal device 500 in S704, captive portal Wi-Fi provided by the AP 600.

Based on steps S701 to S706, when the terminal device 400 that does not have a web capability needs to access captive portal Wi-Fi, the terminal device 400 may temporarily use a web capability of another terminal device (for example, the terminal device 500) to complete authentication, and access captive portal Wi-Fi, to meet a requirement of the user for different terminal devices to access captive portal Wi-Fi, and improve user experience.

Optional step S707 to step S709: The AP 600 notifies that the terminal device 400 successfully accesses captive portal Wi-Fi.

In some embodiments, after allowing the terminal device 400 to access captive portal Wi-Fi, the AP 600 may notify the terminal device 400 that the terminal device 400 successfully accesses captive portal Wi-Fi. In this way, the terminal device can learn, in a timely manner, that the terminal device accesses captive portal Wi-Fi, to provide various services for the user.

Certainly, in some embodiments, the AP 600 may not need to notify the terminal device 400 that the terminal device 400 successfully accesses captive portal Wi-Fi, but only needs to provide a normal service for the terminal device 400 by using captive portal Wi-Fi. The terminal device 400 is not notified, so that communication resources between devices can be saved.

Optional step S707: The AP 600 sends a response data packet to the terminal device 400.

The response data packet may be a data packet indicating that login authentication is completed.

Optional step S708: The terminal device 400 forwards the response data packet to the terminal device 500.

In some embodiments, if the terminal device 400 does not have a web capability, the terminal device 400 forwards the received response data packet to the terminal device 500 for processing.

Optional step S709: The terminal device 400 determines that login authentication is completed.

In some embodiments, in a process of forwarding data packets sent by the AP 600 and the terminal device 500, the terminal device 400 may determine, in a preset login confirmation manner based on a preset login confirmation occasion, whether login authentication is completed, and then after determining that login authentication is completed, access captive portal Wi-Fi provided by the AP 600. The preset login confirmation occasion may be referred to as a first preset occasion.

In some embodiments, the preset login confirmation occasion includes, for example, one or more of the following content: a state corresponding to a data packet that is sent by the AP 600 and that is received by the terminal device 400 or a data packet sent by the terminal device 500 is a state indicating that sending of an HTTP data packet is disabled, a preset period, a preset time point, or a signal that is sent by the terminal device 500 and that is used for confirming completion of login authentication is received. The terminal device 400 may select the preset login confirmation occasion based on conditions such as a performance requirement and a power consumption requirement of the terminal device 400, and determine whether login authentication is completed.

For example, in an HTTP data packet interaction process between two devices, when either device confirms that transmission of all HTTP data packets is completed, the device sends a data packet whose state is a state indicating that sending of the HTTP data packet is disabled to the peer device, for example, sends an HTTP data packet carrying a "byebye signal". Therefore, the terminal device 400 may determine, based on states of the data packets forwarded in step S705 and step S707, whether it needs to determine, in the preset login confirmation manner, that login authentication is completed.

For another example, in a login authentication process, the terminal device 400 determines, in a preset login confirmation manner based on a preset period, whether login authentication is completed. The preset login confirmation manner may also be referred to as a first preset manner.

For another example, the terminal device 400 periodically determines, in a preset login confirmation manner based on a preset time point, whether login authentication is completed.

For still another example, the terminal device 500 displays a confirmation interface, and the user confirms whether all login authentication operations are completed.

Figure 14:
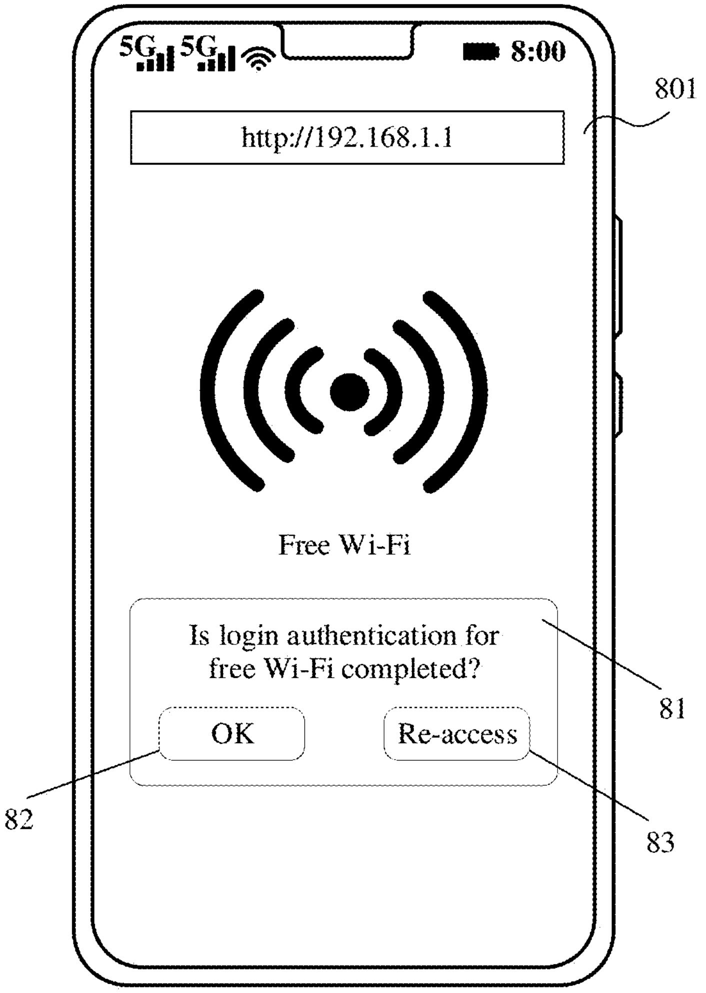
FIG. 14 is a schematic diagram of an interface according to an embodiment of this application.

For example, in an interface 801 shown in FIG. 14, the terminal device 500 (for example, a mobile phone) displays a prompt box 81, to prompt the user whether to confirm that login authentication is completed. If detecting an operation of tapping an OK control 82 by the user, the terminal device 500 sends a signal for confirming completion of login authentication to the terminal device 400. Then, after receiving the signal for login authentication, the terminal device 400 determines, in the preset login confirmation manner, whether login authentication is completed. If the terminal device 500 detects an operation of tapping a "determine to re-access" control 83 by the user, step S705 to step S708 are repeated, and login authentication is performed again.

In some embodiments, the preset login confirmation manner may include, for example, sending an HTTP request to the AP 600, and determining, based on an HTTP status code carried in a received network access response, whether login authentication for captive portal Wi-Fi is completed. If the HTTP status code is any status code in 200 to 207, it may be determined that login authentication for captive portal Wi-Fi is completed. Alternatively, at least two DNS query requests with different domain names are sent to the AP 600, and it is determined, based on whether IP addresses carried in a received network access response are a same IP address, whether login authentication for captive portal Wi-Fi is completed. If the IP addresses are different, it is determined that login authentication for captive portal Wi-Fi is completed.

It should be noted that as described in the foregoing steps, the terminal device 400 may not know a specific redirection technology used by the AP 600. Therefore, in a process of determining, in the preset login confirmation manner, whether login authentication is completed, the preset login confirmation manner includes: The terminal device 400 sends an HTTP request and/or at least two DNS query requests with different domain names to the AP 600.

In some embodiments, after determining that login authentication on the terminal device 400 for the portal website succeeds, the AP 600 directly sends a corresponding network resource to the terminal device 400 based on the network access request sent by the terminal device 400 to the AP 600 in step S701. In this case, the terminal device 400 may not need to perform the step of determining that login authentication is completed in step S709, and directly determine, based on the received network resource, that login authentication for the portal website is completed, to access captive portal Wi-Fi. That is, step S709 is an optional step.

In this way, the terminal device 400 that does not have a web capability can display a login authentication page of the portal website by using the web capability of the terminal device 500, and complete login authentication for captive portal Wi-Fi, to access captive portal Wi-Fi.

In some scenarios, after determining that login authentication is completed, the terminal device 400 may be disconnected from the terminal device 500. Therefore, after step S709, optional step S710 may be further included.

Optional step S710: The terminal device 400 sends a disconnection signal to the terminal device 500.

In some embodiments, after determining that login authentication for captive portal Wi-Fi is completed, the terminal device 400 no longer needs to send a data packet related to login authentication for captive portal Wi-Fi to the terminal device 500, and may send the disconnection signal to the terminal device 500, to disconnect the communication connection to the terminal device 500 and independently access captive portal Wi-Fi.

Optionally, after receiving the disconnection signal, the terminal device 500 may further disconnect the communication connection to the terminal device 400, and send a disconnection response to the terminal device 400, to confirm disconnection.

In this way, after completing login authentication by using the web capability of the terminal device 500, the terminal device 400 disconnects the communication connection to the terminal device 500, to independently access captive portal Wi-Fi.

Based on S701 to S706, the terminal device 400 successfully borrows the web capability of the terminal device 500 to access captive portal Wi-Fi, and subsequently does not need to borrow the web capability of the terminal device 500 again. The connection between the terminal device 400 and the terminal device 500 is disconnected in S710, so that communication resources of the terminal device 400 can be saved, and communication between the terminal device 500 and captive portal Wi-Fi is not affected.

In the network connection method shown in FIG. 13, in a process in which the terminal device 400 borrows the web capability of the terminal device 500 to access captive portal Wi-Fi, each device differently processes a data packet.

Figure 15:
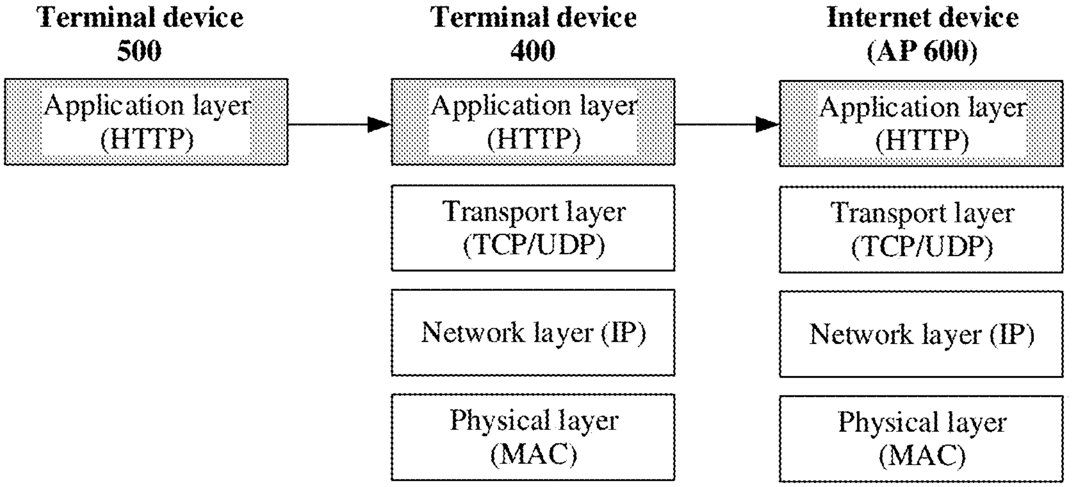
FIG. 15 shows a manner of processing a data packet by each device in a process in which a terminal device 400 borrows a web capability of a terminal device 500 to access captive portal Wi-Fi.

FIG. 15 shows an example of a manner of processing a data packet by each device in a process in which a terminal device 400 borrows a web capability of a terminal device 500 to access captive portal Wi-Fi.

As shown in FIG. 15, in the process in which the terminal device 400 borrows the web capability of the terminal device 500 to access captive portal Wi-Fi, because the terminal device 400 does not have a web capability, the terminal device 400 performs processing only at a transport layer, a network layer, and a physical layer on the data packet, and does not perform processing at an application layer, and the terminal device 500 performs processing at the application layer on the data packet. The terminal device 400 may transparently transmit an application layer data packet from the internet to the terminal device 500, and the terminal device 500 performs processing at the application layer on the data packet. The terminal device 400 may further perform processing at the transport layer, the network layer, and the physical layer on an application layer data packet from the terminal device 500, and then send the data packet to the internet. An internet device, for example, the AP 600, may perform processing at the foregoing four layers on the data packet.

Figure 16:
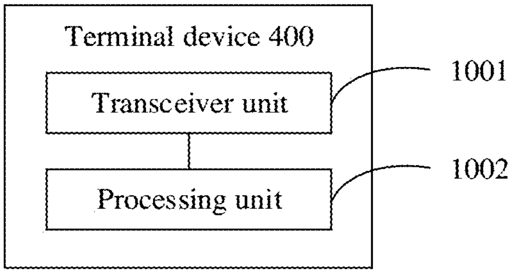
FIG. 16 is a schematic diagram of a structure of a terminal device 400 according to an embodiment of this application.
Figure 17:
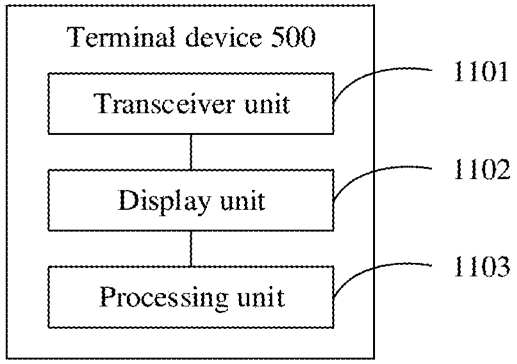
FIG. 17 is a schematic diagram of a structure of a terminal device 500 according to an embodiment of this application.

The method for temporarily borrowing, by a terminal device, a web capability of another device to access a captive portal wireless network (captive portal Wi-Fi) is described above in detail with reference to FIG. 13. With reference to FIG. 16 and FIG. 17, the following describes in detail a Wi-Fi authentication apparatus provided in an embodiment of this application.

In a possible design, FIG. 16 is a schematic diagram of a structure of a terminal device 400 according to an embodiment of this application. As shown in FIG. 16, the terminal device 400 used as a Wi-Fi authentication apparatus may include a transceiver unit 1001 and a processing unit 1002. The terminal device 400 may be configured to implement the function of the terminal device in the foregoing method embodiments. The terminal device does not have a web capability. A web application is usually installed in a terminal device having a web capability, and the terminal device having a web capability supports the HTTP/HTTPS protocol.

Optionally, the transceiver unit 1001 is configured to support the terminal device 400 in performing S701, S702, S703, S705, S706, S708, and S710 in FIG. 13.

Optionally, the processing unit 1002 is configured to support the terminal device 400 in performing S709 in FIG. 13.

The transceiver unit may include a receiving unit and a sending unit, may be implemented by a transceiver or a transceiver-related circuit component, and may be a transceiver or a transceiver module. Operations and/or functions of the units in the terminal device 400 are respectively intended to implement corresponding procedures of the network connection method in the foregoing method embodiments. All related content of the steps in the foregoing method embodiments may be cited in function descriptions of the corresponding functional units. For brevity, details are not described herein.

Optionally, the terminal device 400 shown in FIG. 16 may further include a storage unit (not shown in FIG. 16), and the storage unit stores a program or instructions. When the transceiver unit 1001 and the processing unit 1002 execute the program or the instructions, the terminal device 400 shown in FIG. 16 may perform the network connection method in the method embodiment in FIG. 13.

For technical effects of the terminal device 400 shown in FIG. 16, refer to the technical effects of the network connection method in the foregoing method embodiment. Details are not described herein.

In addition to a form of the terminal device 400, the technical solutions provided in this application may be implemented by a functional unit or a chip in a terminal device, or an apparatus used together with a terminal device.

In a possible design, FIG. 17 is a schematic diagram of a structure of a terminal device 500 according to an embodiment of this application. As shown in FIG. 17, the terminal device 500 used as a Wi-Fi authentication apparatus may include a transceiver unit 1101, a display unit 1102, and a processing unit 1103. The terminal device 500 may be configured to implement the function of the terminal device in the foregoing method embodiments. The terminal device has a web capability. A web application is usually installed in a terminal device having a web capability, and the terminal device having a web capability supports the HTTP/HTTPS protocol.

Optionally, the transceiver unit 1101 is configured to support the terminal device 500 in performing S703, S705, S708, and S710 in FIG. 13.

Optionally, the display unit 1102 is configured to support the terminal device 500 in performing S704 in FIG. 13.

Optionally, the processing unit 1103 is configured to support the terminal device 500 in performing S704 in FIG. 13.

The transceiver unit may include a receiving unit and a sending unit, may be implemented by a transceiver or a transceiver-related circuit component, and may be a transceiver or a transceiver module. Operations and/or functions of the units in the terminal device 500 are respectively intended to implement corresponding procedures of the network connection method in the foregoing method embodiments. All related content of the steps in the foregoing method embodiments may be cited in function descriptions of the corresponding functional units. For brevity, details are not described herein.

Optionally, the terminal device 500 shown in FIG. 17 may further include a storage unit (not shown in FIG. 17), and the storage unit stores a program or instructions. When the transceiver unit 1101, the display unit 1102, and the processing unit 1103 execute the program or the instructions, the terminal device 500 shown in FIG. 17 may perform the network connection method in the foregoing method embodiments.

For technical effects of the terminal device 500 shown in FIG. 17, refer to the technical effects of the network connection method in the foregoing method embodiment. Details are not described herein.

In addition to a form of the terminal device 500, the technical solutions provided in this application may be implemented by a functional unit or a chip in a terminal device, or an apparatus used together with a terminal device.

In the embodiments in FIG. 13 to FIG. 17, the terminal device 400 that needs to use a web capability provided by another device to access captive portal Wi-Fi may be referred to as a fourth device, and the terminal device 500 that provides a web capability may be referred to as a fifth device.

The method for temporarily borrowing, by a terminal device, a web capability of another device to access a captive portal wireless network (captive portal Wi-Fi) is described in the foregoing embodiments. The following describes a method for temporarily borrowing, by a terminal device, a network connection capability of another device to activate an eSIM or a blank SIM, to access the internet.

An electronic device that supports the eSIM or the blank SIM may include, for example, a network-side device such as an AP (for example, CPE), and may further include a terminal device such as a smartwatch, a smart band, or an in-vehicle infotainment. Subsequent implementation is mainly described by using the AP as an example. Subsequent embodiments do not limit the protection scope of this application. In the network connection method provided in embodiments of this application, another electronic device that supports the eSIM or the blank SIM and that is different from the AP may also use the network connection method to activate the eSIM or the blank SIM by using a network connection capability of another device. This is not limited herein.

The CPE is an access device that receives a mobile signal and forwards the mobile signal in a form of a Wi-Fi signal. The CPE may simultaneously provide Wi-Fi signals for a plurality of terminals, may further enhance the Wi-Fi signals for a second time, and is a widely applied access device.

Figure 18:
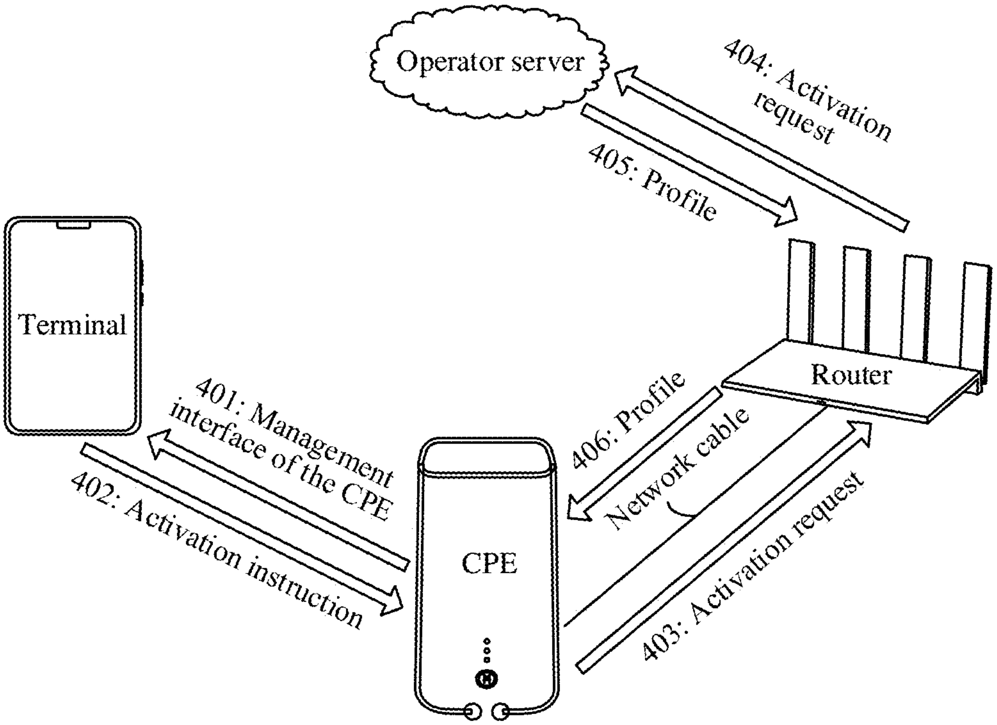
FIG. 18 is a schematic diagram of an existing activation scenario of CPE.

FIG. 18 shows an activation scenario of CPE. As shown in FIG. 18, in this scenario, a terminal and a router need to be used to activate the CPE that supports an eSIM card. The CPE connects to the router by using a network cable, so that the CPE can obtain a network connection capability. After purchasing the CPE that supports an eSIM card, a user may purchase a package from an online store of an operator by using the terminal, and obtain an activation code of the eSIM, or a user may purchase a package from a physical operator store, and obtain an activation code of the eSIM. In step 401, the CPE may provide management interface data of the CPE for the terminal, so that a management interface of the CPE may be displayed on the terminal. In step 402, the user may enter the activation code of the eSIM in the management interface that is of the CPE and that is displayed by the terminal, to generate an activation instruction, and send the activation instruction to the CPE. In step 403, the CPE generates an activation request based on the activation instruction, and transmits the activation request to the router by using the network cable. In step 404, the router may forward the activation request from the CPE to an operator server. In step 405, the operator server may check data carried in the activation request sent by the CPE. If the check succeeds, the operator server sends a profile to the router. In step 406, the router helps the operator server forward the profile to the CPE, to activate the eSIM card. However, in an actual scenario, the CPE may not have a condition for connecting to the router. In this case, an activation operation cannot be performed on the eSIM.

In the foregoing scenario, the router provides a network service for the CPE, the router is a server, and the CPE is a client. In addition, the CPE provides a service for the terminal to log in to the management interface of the CPE, the CPE is a server, and the terminal is a client.

In the foregoing scenario, if the router that provides a network service for the CPE is replaced with a terminal that can provide a network service for the CPE by using a hotspot, where for ease of description, the terminal may be referred to as a first terminal, and the terminal used to log in to the management interface of the CPE is referred to as a second terminal, the first terminal is a server of the CPE, the CPE is a client of the first terminal, and the CPE is a server of the second terminal. However, in an actual scenario, there may not be a condition that the first terminal and the second terminal coexist. That is, when only one terminal with a network connection capability is available, if the terminal is used as the first terminal to provide a network service for the CPE, the terminal cannot be used as a client to log in to the management interface of the CPE, or if the terminal is used as the second terminal to log in to the management interface of the CPE, the terminal cannot be used as a server of the CPE to provide a network service for the CPE. In this case, an activation operation also cannot be performed on the eSIM.

Therefore, an embodiment of this application provides a network connection method. An AP and a terminal may exchange data by using a near field transmission connection, so that the terminal and the AP may serve as two peer network-connected parties, and serve as a server and a client for each other to provide respective services for each other. In this way, a user can perform an activation operation on a blank SIM or an eSIM by using one terminal with a network connection capability, and may further perform a setting operation on the AP in a process of implementing the activation operation. For example, the setting operation may include setting a user name and a password of the AP. The setting operation may further include setting a parameter of a quantity of terminal devices that can be simultaneously allowed to access the AP, and the like.

It should be understood that for ease of description, data related to the activation operation on the blank SIM or the eSIM may be referred to as activation data. For example, a profile, an activation instruction, an activation request, and a fourth data packet fed back by an operator for an activation request of the AP may all be considered as the activation data. Data related to the setting operation on the AP is referred to as setting data, for example, management interface data that is of the AP and that is provided by the AP for the terminal and setting information sent by the terminal to the AP. The setting information may include, for example, related information about setting, by the terminal, the user name and the password of the AP. The setting information may further include related information about controlling the quantity of terminal devices that can be simultaneously allowed to access the AP. The setting information in this application includes but is not limited this.

In this embodiment of this application, near field transmission may mean that devices (for example, the AP and the terminal described above) may communicate with each other in a near field condition, for example, perform data transmission. For example, communication between the devices may be implemented based on a communication function of a wireless communication module in the terminal. A prerequisite for near field transmission is to establish a near field connection. The establishing a near field connection may include, for example, discovery of a near field device, check on the near field device, and connection establishment between the devices. It should be understood that in this embodiment of this application, a connection is established between the devices only after the check on the near field device succeeds, and communication can be performed between the devices only after the connection is successfully established. Otherwise, connection establishment between the devices fails, and communication cannot be performed between the devices.

For example, in a possible implementation, the devices communicate with each other by using Bluetooth. A Bluetooth communication protocol may implement device discovery within a range of 50 meters. All electronic devices having a Bluetooth function in a circular area range in which the device whose Bluetooth function is enabled is used as a center and a radius is 50 meters are near field devices (including the device whose Bluetooth function is enabled). However, it may be understood that only when a Bluetooth function is enabled, a device in this circular range can establish a Bluetooth connection to a device in the center and communicate with the device by using Bluetooth.

It should be understood that an implementation of near field transmission is not limited to Bluetooth. For example, two devices may establish a near field connection by using Wi-Fi direct. For another example, two devices may establish a near field connection by using a universal USB port. For another example, two devices may establish a near field connection by using a network cable and an Ethernet interface. A manner of establishing the near field connection is not limited in this application.

The near field device may be a device in a near field condition, for example, an AP device (for example, a router or CPE) or a terminal device (for example, a mobile phone or a notebook computer). The near field condition in this embodiment of this application may mean that a near field connection may be established between devices.

The profile may be an operator profile. The profile may include, for example, but is not limited to a combination of a file system, file content, data, and an application installed on a UICC, and mainly carries information such as an IMSI and an authentication parameter. After the profile is activated, a mobile network corresponding to the profile may be accessed. In this embodiment of this application, after the profile is activated, the subscriber identity module may connect to the network, and the AP for which the subscriber identity module is configured may be activated, to provide a communication service. The UICC may include a SIM and an eSIM. This is not limited in this application.

Figure 19:
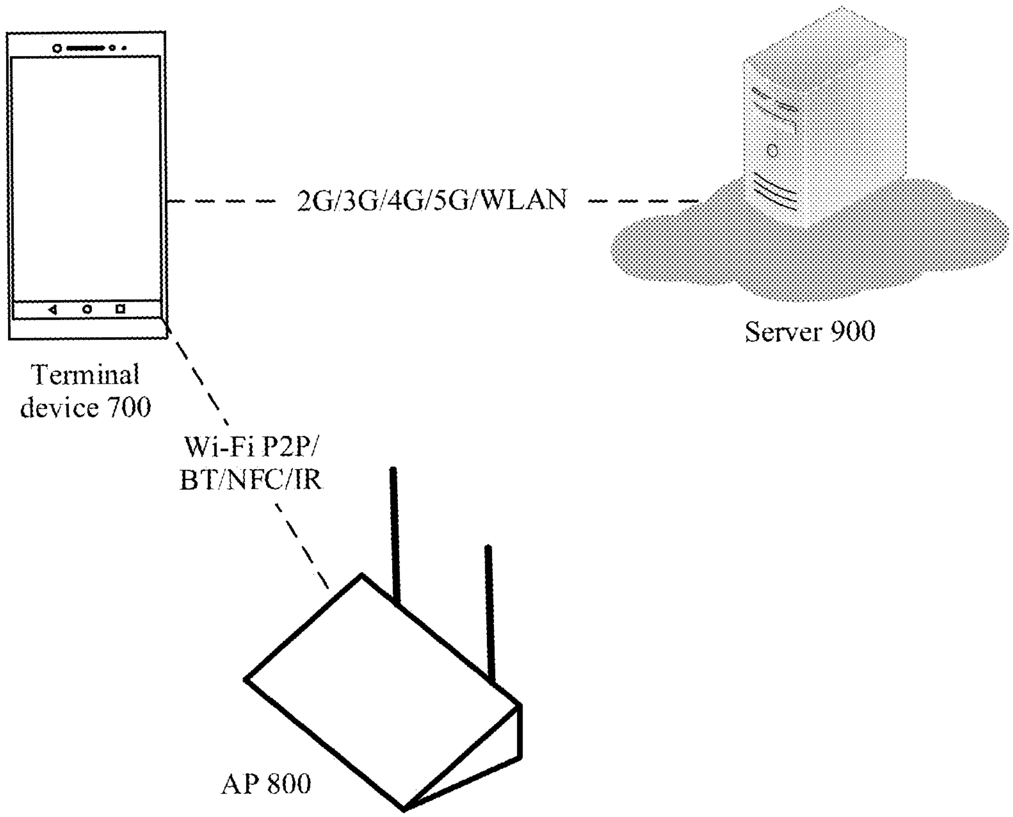
FIG. 19 is a schematic diagram of a communication system according to an embodiment of this application.

FIG. 19 is a schematic diagram of a communication system according to an embodiment of this application. As shown in FIG. 19, the communication system includes a terminal device 700, an AP 800, and a server 900 provided by a communication service operator.

The terminal device 700 may also be referred to as a mobile device or the like. The terminal device may include a wireless terminal and a wired terminal. In this embodiment of this application, the terminal device 700 may include but is not limited to a mobile phone, a tablet computer, a smartwatch, a wearable device, a vehicle-mounted device, an augmented reality (AR)/virtual reality (VR) device, a notebook computer, a personal computer (PC), an ultra-mobile personal computer (UMPC), a netbook, a personal digital assistant (PDA), a distributed device, and the like.

The terminal device 700 has a network connection capability. That is, the terminal may access the operator server 900 in a plurality of manners such as a cellular mobile network, a WLAN, Ethernet, a USB, and Bluetooth.

The terminal device 700 may be the network-connected terminal device 200 in the communication system shown in FIG. 1, may be the terminal device 500 in the communication system shown in FIG. 11, or may be another network-connected terminal device. This is not limited herein.

The AP 800 is an access point for a wireless terminal to access a wired network, is mainly used in a broadband home, a building, a campus, a park, a warehouse, a factory, and other places that require wireless monitoring, typically covers a distance of dozens of meters to hundreds of meters, may also be used for long-distance transmission, and may cover a longest distance of approximately 30 kilometers. The AP 800 is equivalent to a bridge that connects a wired network to a wireless network. A main function of the AP 800 is to connect wireless network clients together, and then connect the wireless network to the Ethernet. A router, CPE, a gateway, a bridge, or another device may be used as the AP 800.

The AP 800 is configured to create a WLAN. After joining the network created by the AP 800, the terminal device may connect to the internet through the AP 800.

A device such as a router, a gateway, or a bridge may be configured to convert a wired network into a wireless WLAN, to facilitate access by the terminal device.

The CPE is configured to: receive a mobile signal (namely, a cellular network signal) sent by a network device (for example, a base station), and forward the mobile signal in a form of a Wi-Fi signal. The CPE may simultaneously provide Wi-Fi signals for a plurality of terminal devices, may further enhance the Wi-Fi signals for a second time, and is a widely applied access device.

The AP 800 may be the wireless access point 400 in the communication system shown in FIG. 1, may be the AP 600 in the communication system shown in FIG. 11, or may be another wireless access point.

The terminal device 700 communicates with the AP 800 based on a near field connection. The terminal device 700 is configured to send an activation instruction to the AP 800. The activation instruction is used to download a profile. The AP 800 is configured to send an activation request to the terminal device 700 in response to the received activation instruction. The activation request is used to request to download the profile from the operator server 900. The terminal device 700 is configured to forward the activation request to the operator server 900, and is configured to forward the profile received from the operator server 900 to the AP 800.

The server 900 may communicate with the terminal device 700, and is configured to: receive an activation request sent by the terminal device 700, and send the profile to the terminal device 700 in response to the activation request. The server 900 and the terminal device 700 may communicate with each other in a plurality of manners such as a cellular mobile network, a WLAN, Ethernet, a USB, and Bluetooth. This is not limited herein.

The server 900 and the server 500 in the communication system 10 shown in FIG. 1 may be a same server or different servers. This is not limited herein.

In this embodiment of this application, a structure of the terminal device 700 that provides a network connection capability to activate an eSIM or a blank SIM is similar to that of the terminal device shown in FIG. 2A. For details, refer to FIG. 2A and related descriptions.

A memory may be configured to: store application code, for example, application code used by the terminal device 700 to provide the network connection capability to activate the eSIM or the blank SIM, to establish a near field transmission connection between the terminal device 700 and the AP 800; process a wireless connection service of the terminal device 700; and the like.

A processor may be configured to: execute the application code, and invoke a related module to implement the function of the terminal device 700 in this embodiment of this application. For example, functions such as a near field transmission connection between the terminal device 700 and the AP 800 are implemented.

A wireless communication module may be configured to support data exchange of wireless communication, including BT, a WLAN (for example, Wi-Fi), ZigBee, FM, NFC, IR, a general 2.4G/5G wireless communication technology, or the like, between the terminal device 700 and the AP 800.

Figure 20:
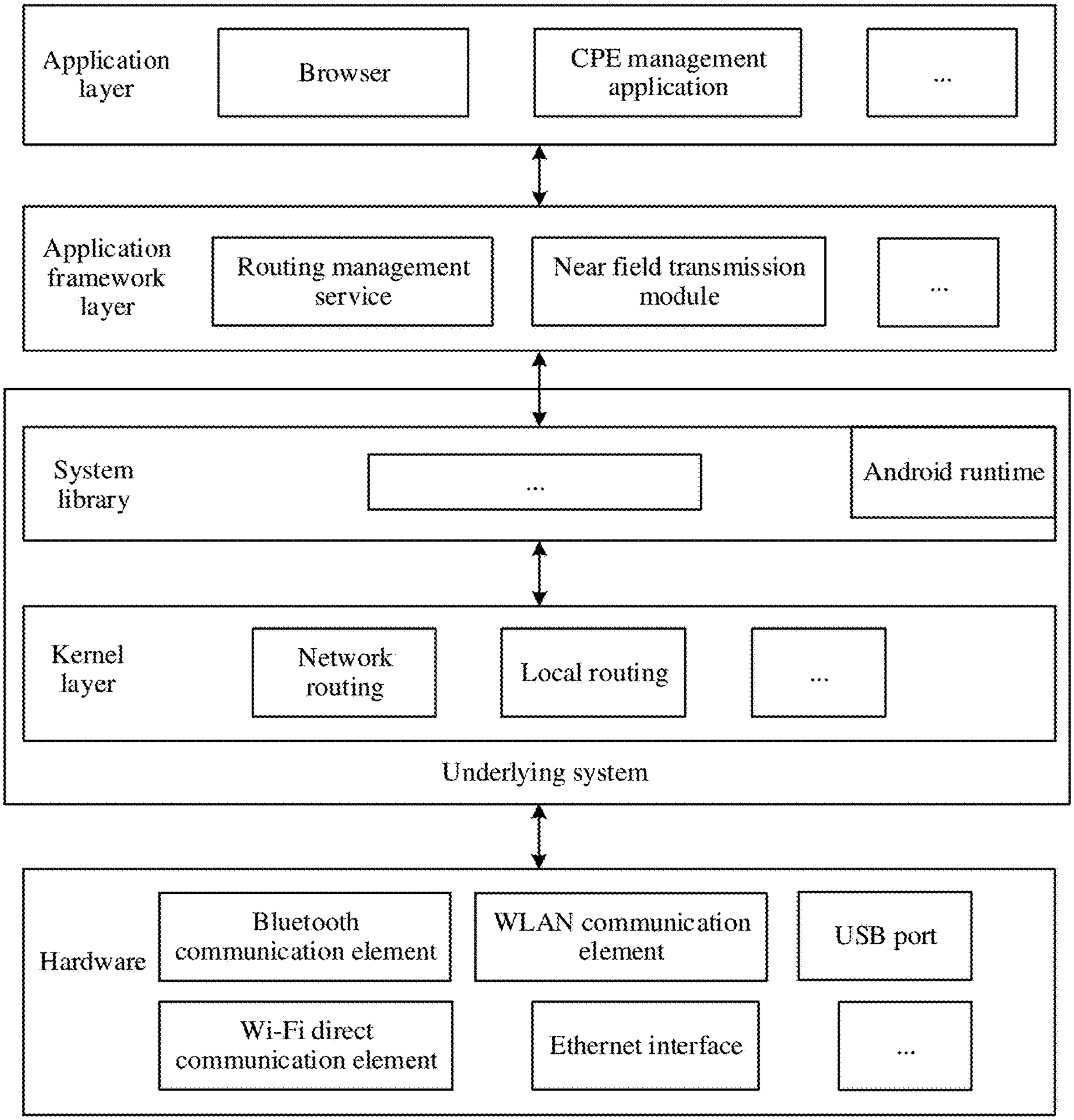
FIG. 20 is a schematic block diagram of software and hardware structures of a terminal in a network connection method according to an embodiment of this application.

FIG. 20 is a block diagram of software and hardware structures of a terminal device 700 that provides a network connection capability to activate an eSIM or a blank SIM.

As shown in FIG. 20, a software architecture of the terminal device 700 may include four layers: an application layer, an application framework layer, a system library, and a kernel layer. Functions of the layers in the terminal device 700 are similar to those of the software architecture shown in FIG. 2B-1 and FIG. 2B-2. For details, refer to FIG. 2B-1, FIG. 2B-2, and related descriptions.

A difference lies in that the application layer in the terminal device 700 may include at least a browser and/or a CPE management application. The browser may be used to access a world wide web (Web) application, and the terminal device 700 may access, by using the browser, a CPE management service provided by CPE. The CPE management application may be used to manage and control an application of the CPE, and the terminal device 700 may access and control the CPE management service by using the application of the CPE.

As shown in FIG. 20, the application framework layer in the terminal device 700 may include at least a routing management service, a near field transmission module, and the like.

The routing management service in the terminal device 700 may be used to manage transmission of data to be exchanged between the terminal device 700 and the CPE.

The near field transmission module in the terminal device 700 is a functional module abstracted based on a near field communication capability such as Bluetooth, a WLAN, a USB, or Ethernet. The near field transmission module does not necessarily actually physically exist, but in terms of function implementation, the module may implement a corresponding function by using program code. The near field transmission module may be used for near field transmission between the terminal device 700 and the CPE, and may include device discovery, identity authentication, check, and transmission in a plurality of manners between the terminal device 700 and the CPE, so that instructions, information, network data, and the like can be transmitted between the terminal device 700 and the CPE.

It should be understood that at a physical level, the near field transmission module may use a physical communication element, including but not limited to a Bluetooth communication element, a WLAN communication element, a Wi-Fi direct communication element, an Ethernet interface, a USB port, and the like, in a near field and/or a local area network. At a system level, the near field transmission module may be configured to discover a nearby device, may be further configured to authenticate whether devices that need to establish a connection belong to a same user, and may be further configured to transmit information between devices that establish a connection.

The kernel layer in the terminal device 700 may include network routing and local routing.

Figure 21:
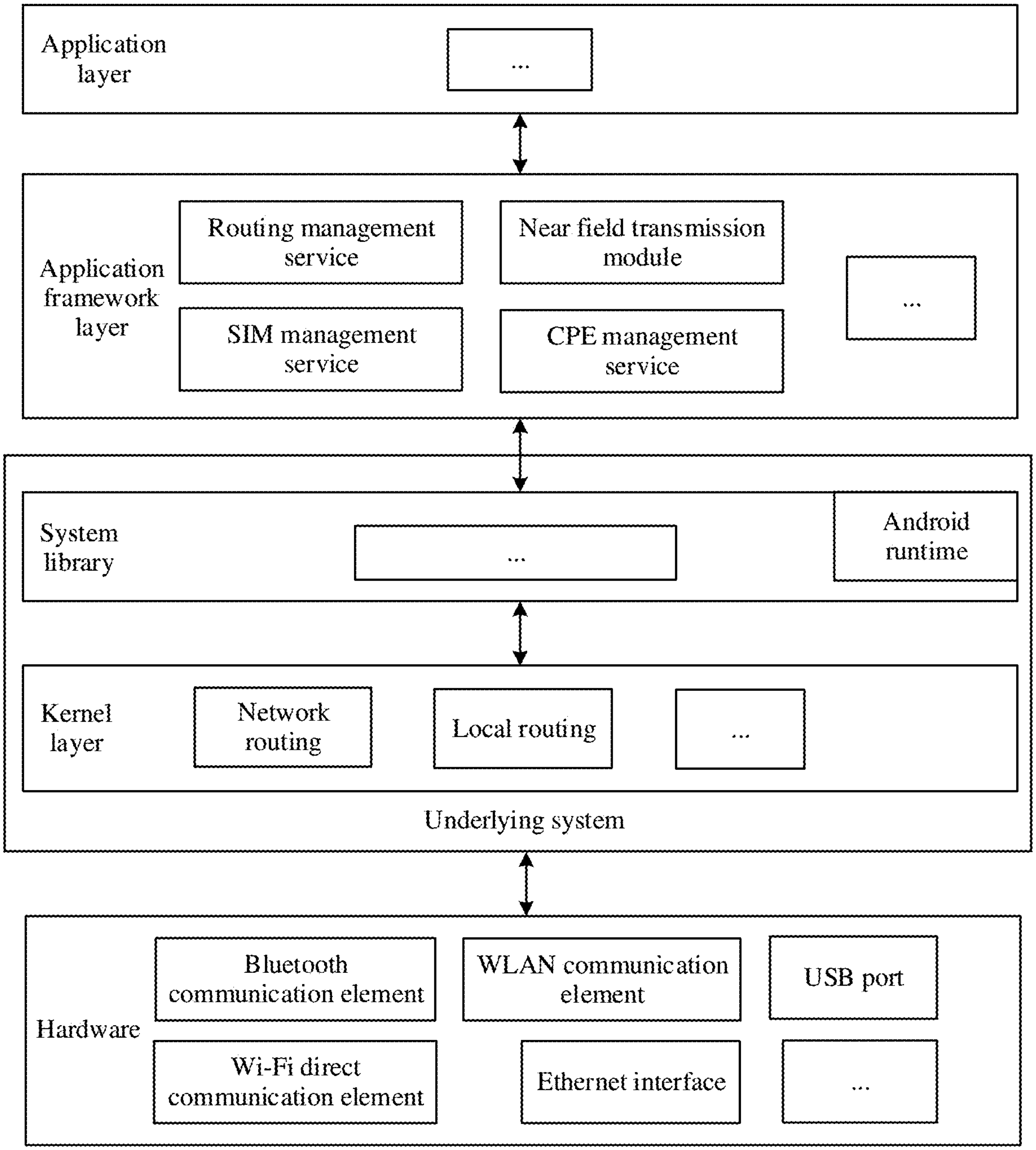
FIG. 21 is a schematic block diagram of software and hardware structures of CPE in a network connection method according to an embodiment of this application.

FIG. 21 is a block diagram of software and hardware structures of CPE that borrows a network connection capability of another device to activate an eSIM or a blank SIM.

As shown in FIG. 21, a software architecture of the CPE may include four layers: an application layer, an application framework layer, a system library, and a kernel layer. Functions of the layers in the CPE are similar to those of the software architecture shown in FIG. 2B-1 and FIG. 2B-2. For details, refer to FIG. 2B-1, FIG. 2B-2, and related descriptions.

As shown in FIG. 21, the CPE is used as an example of an AP 800, and the application framework layer in the CPE may include at least a CPE management service, a SIM management service, a routing management service, and a near field transmission module.

The CPE management service of the CPE may be in a form of a hypertext transfer protocol (HTTP) service, and is used for visual display of a terminal and control over each configuration of the CPE.

The routing management service in the CPE may be used to manage transmission of data to be exchanged between the CPE and the terminal.

The SIM management service may be used to manage activation of a SIM, for example, generate an activation request based on an activation instruction of the terminal. A CPE control service may be used to set or control the CPE, for example, make a corresponding setting response based on setting information of the terminal. It should be understood that when the CPE is CPE that supports an eSIM, the SIM management service may be an eSIM management service.

The near field transmission module in the CPE may be the same as or similar to the near field transmission module in the terminal. For brevity, details are not described herein. For detailed descriptions, refer to the near field transmission module in the terminal.

The kernel layer in the CPE may also include network routing and local routing.

Currently, in the market, CPE supports two types of data cards: a SIM card and an eSIM card. When CPE that supports insertion of a physical blank SIM is used, for example, the blank SIM is a SIM provided with the CPE, or when CPE that supports an eSIM card is used, a user may purchase a package online, perform real-name authentication, remotely perform self-service account opening and cancellation, and independently select a to-be-used network. However, this manner has a problem of initial network connection and activation of the CPE. That is, after the user purchases the CPE that supports insertion of a physical blank SIM or the CPE that supports an eSIM card, an operator server needs to be connected to activate the blank SIM or the eSIM card. However, before the blank SIM or the eSIM card is activated, the CPE cannot connect to a network, and needs to use another device with a network connection capability to provide a network. However, there is usually no such an activation condition.

It should be understood that before the blank SIM and the eSIM are activated, a profile that can provide a service is not configured, and therefore no service can be provided. Therefore, even if a SIM is inserted into the CPE, if the SIM is a blank SIM, the CPE still cannot connect to a network; or if the CPE is CPE that supports the eSIM, before the eSIM is activated, the CPE still cannot connect to a network. Activating the blank SIM or activating the eSIM may be understood as downloading a profile from the operator server, activating the profile, and then configuring the profile in the blank SIM or the eSIM. The blank SIM and the eSIM can provide a service after the activated profile is configured. Therefore, the CPE has a network connection capability, and can externally provide a service, that is, the CPE is activated.

For better understanding of the method provided in this application, the following describes, with reference to FIG. 22, FIG. 23, FIG. 24A, and FIG. 24B, in detail the network connection method provided in embodiments of this application.

Figure 22:
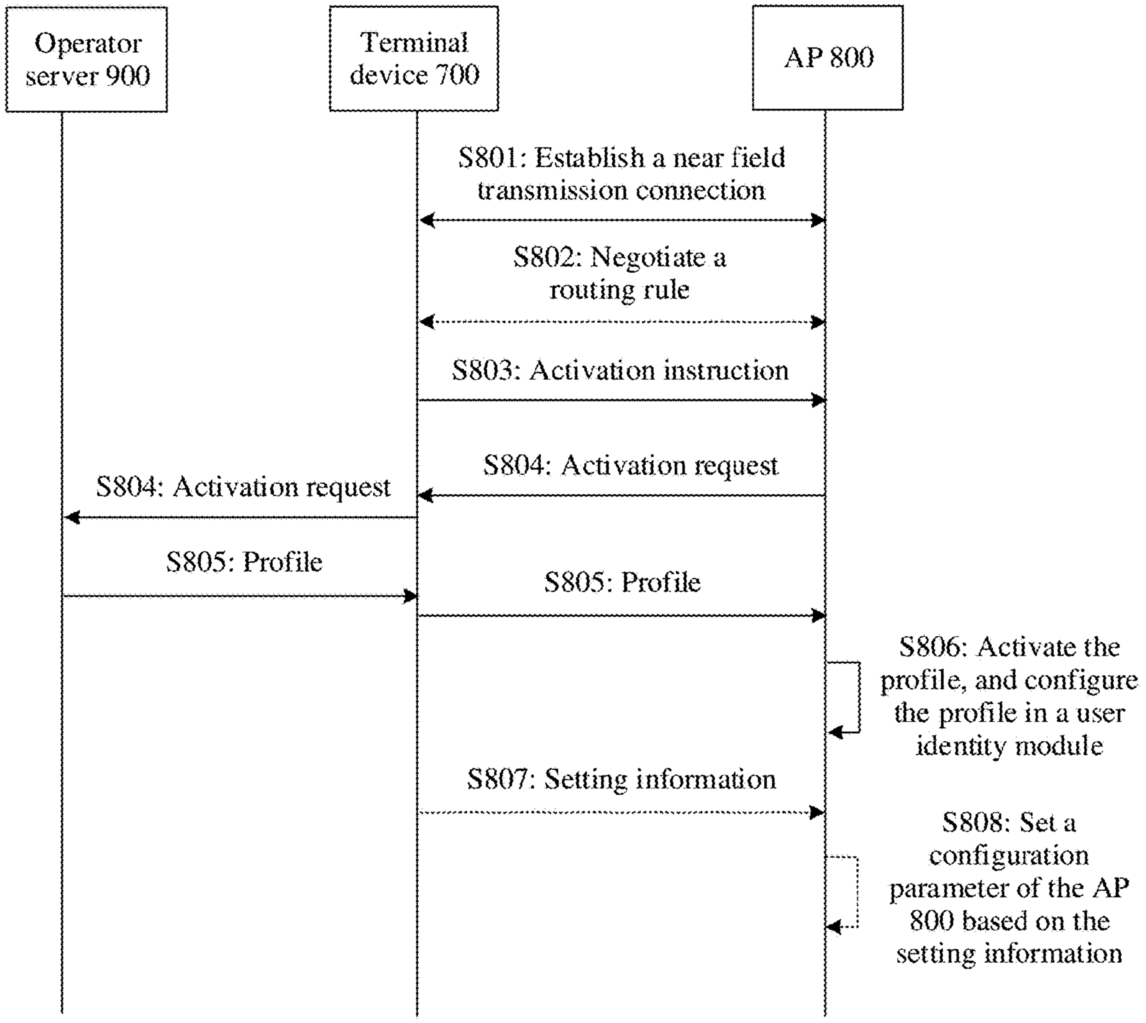
FIG. 22 is a schematic flowchart of a network connection method according to an embodiment of this application.

FIG. 22 is a schematic flowchart of a network connection method according to an embodiment of this application. The method may include the following steps.

Step S801: A terminal device 700 and an AP 800 establish a near field transmission connection.

It should be understood that as described above, the AP 800 and the terminal device 700 may establish a near field connection by using Bluetooth, Wi-Fi direct, a USB, an Ethernet interface, and the like.

For example, when both the AP 800 and the terminal device 700 have a Bluetooth communication element, the AP 800 and the terminal device 700 may establish a near field connection by using Bluetooth. Alternatively, when both the AP 800 and the terminal device 700 have a Wi-Fi direct communication element, the AP 800 and the terminal device 700 may establish a near field connection by using Wi-Fi direct. Alternatively, when both the AP 800 and the terminal device 700 have a USB port, the AP 800 and the terminal device 700 may establish a near field connection by using the USB port with assistance of a data line, and sometimes may establish a near field connection by using the USB port with assistance of a data line and an adapter. Alternatively, when both the AP 800 and the terminal device 700 have an Ethernet interface, the AP 800 and the terminal device 700 may establish a near field connection by using the Ethernet interface with assistance of a network cable.

Optional step S802: The AP 800 and the terminal device 700 negotiate a routing rule.

A transmission path of activation data and a transmission path of setting data may be preset by using the routing rule.

The routing rule may indicate a transmission path of data. Alternatively, it may be understood as that the routing rule indicates the transmission path of the activation data and the transmission path of the setting data. The activation data may include data related to an activation operation on a physical blank SIM or an eSIM. The setting data may include data related to a setting operation on the AP 800. The transmission path of the activation data is different from the transmission path of the setting data.

Specifically, the routing rule may be used to direct the terminal device 700 and the AP 800 to process received data, for example, forward the data or perform corresponding processing on the data. For the AP 800, the routing rule may indicate a transmission path of data that is to reach the AP 800. For the terminal device 700, the routing rule may indicate a transmission path of data that is to reach the terminal device 700. That is, the routing rule is a rule that should be followed during data transmission between the AP 800 and the terminal device 700. The routing rule may be prestored in routing management services in the AP 800 and the terminal device 700, so that the AP 800 and the terminal device 700 can properly process data related to the activation operation and data related to the setting operation.

There may be a plurality of routing rules, for example, a destination address-based routing rule, a routing rule based on a manner of establishing a near field connection, or a routing rule based on a network transmission port. It should be understood that the network transmission port is a logical port, for example, may be a port supporting the transmission control protocol (transmission control protocol, TCP). This is not limited in this application.

The AP 800 and the terminal device 700 may select a corresponding routing rule based on a manner of establishing a near field connection.

Several routing rules are provided as examples below.

Destination address-based routing rule.

In the routing rule, a destination address of the activation data is different from a destination address of the setting data.

For example, for data received from the AP 800 or an operator server and data generated by the terminal device 700, the terminal device 700 may determine whether the data is setting data by determining whether a destination address of the data is the terminal device 700. If the destination address is the terminal device 700, the data is setting data. If the destination address is the operator server or the AP 800, the data is activation data. For the activation data, the terminal device 700 needs to forward the data to the operator server or the AP 800 based on the destination address. For the setting data, the terminal device 700 may send the data to the AP 800, or perform corresponding processing.

Routing rule based on a manner of establishing a near field connection.

In the routing rule, a near field connection manner used for transmitting the activation data is different from a near field connection manner used for transmitting the setting data.

There may be a plurality of near field connection manners between the AP 800 and the terminal device 700, and the AP 800 and the terminal device 700 may simultaneously establish a near field connection in a plurality of manners. Therefore, there may be a plurality of routing rules based on the manner of establishing a near field connection. After the AP 800 and the terminal device 700 establish the near field connection, the AP 800 and the terminal device 700 may determine a specific routing rule based on the manner of establishing a near field connection. This implementation may be applied to a case in which the AP 800 and the terminal device 700 establish at least two near field connections. For example, when the AP 800 and the terminal device 700 simultaneously establish two near field connections: a Wi-Fi direct connection and a USB near field connection, the AP 800 and the terminal device 700 may negotiate to transmit the setting data by using the Wi-Fi direct near field connection, and transmit other data including the activation data by using the USB near field connection.

Routing rule based on a network transmission port.

In the routing rule, a port through which the activation data is transmitted is different from a port through which the setting data is transmitted.

This implementation may be applied to a case in which each of the AP 800 and the terminal device 700 has at least two same transmission ports. The AP 800 and the terminal device 700 need to agree on a transmission port in advance. For example, the AP 800 has two transmission ports: a port 1 and a port 2, and the terminal device 700 also has two ports, namely, a port 1 and a port 2, corresponding to the AP 800. In this case, the AP 800 and the terminal device 700 may negotiate to determine that the routing rule is to transmit the setting data through the port 1 and transmit data including the activation data through the port 2, or the routing rule may be to transmit the activation data through the port 1 and transmit other data including the setting data through the port 2. It should be understood that the port described herein may be a logical port, or may be a physical port, provided that the AP 800 and the terminal device 700 negotiate a specific port through which a specific type of data is to be transmitted. This is not limited in this application.

Correspondingly, after the AP 800 and the terminal device 700 determine the routing rule through negotiation, the AP 800 also needs to process data according to the routing rule.

Destination address-based routing rule.

For example, the AP 800 may set a destination address of activation data generated by the AP 800 to the server, and set a destination address of setting data generated by the AP 800 to the terminal device 700.

Routing rule based on a manner of establishing a near field connection.

For example, the AP 800 may send, by using a USB port, data including activation data generated by the AP 800, and send, by using Wi-Fi direct, setting data generated by the AP 800.

Routing rule based on a network transmission port.

The AP 800 needs to send, according to a specific routing rule determined by the AP 800 and the terminal device 700 and by using the determined routing rule, data generated by the AP 800. For example, according to the routing rule, the AP 800 may send, through the port 1, data including activation data generated by the AP 800, and send, through the port 2, setting data generated by the AP 800; or according to the routing rule, may send, through the port 2, data including activation data generated by the AP 800, and send, through the port 1, setting data generated by the AP 800. It should be understood that after the AP 800 and the terminal device 700 establish the near field connection, data transmission between the AP 800 and the terminal device 700 is performed by using the near field connection. It should be further understood that after the AP 800 and the terminal device 700 establish the near field connection, the AP 800 and the terminal device 700 may know internet protocol (IP) addresses of each other. For example, the AP 800 may serve as a dynamic host configuration protocol server to allocate an IP address to the terminal device 700, and the AP 800 provides management interface data of the AP 800 for the terminal device 700 by using a fixed IP address, so that the AP 800 and the terminal device 700 may know the IPs of each other. For example, when a terminal device 700 performs a setting operation on the AP 800, the AP 800 may know the terminal device 700 that performs the setting operation on the AP 800. A user may directly open a management application of the AP 800, for example, a CPE management application, in the terminal device 700, to directly display a management interface of CPE. Alternatively, the fixed IP address of the AP 800 may be presented on the AP 800 in a form of a two-dimensional code or text, and a user may log in to a management interface of the AP 800 by scanning the two-dimensional code of the IP address of the AP 800 by using the terminal device 700, or may log in to a management interface of the AP 800 by entering the IP address of the AP 800 in a browser in the terminal device 700. Display data of the management interface of the AP 800 may be considered as data related to the setting operation. The AP 800 sends the data to the terminal device 700 by using the near field connection, and the terminal device 700 displays the management interface of the AP 800 by using the browser or the management application of the AP 800.

The terminal device 700 and the AP 800 may transmit data based on the near field connection, and determine, according to the routing rule, transmission paths and processing manners of data generated by the terminal device 700 and the AP 800 and data received from the peer device.

Based on optional step S802, the terminal device 700 and the AP 800 may negotiate the routing rule, so that subsequently the transmission paths and the processing manners of the data generated by the terminal device 700 and the AP 800 and the data received from the peer device are determined according to the routing rule, to support the AP 800 in borrowing a network connection capability of the terminal device 700 to activate an eSIM or a blank SIM.

Step S803: The AP 800 receives an activation instruction from the terminal device 700 based on the near field connection to the terminal device 700.

In some embodiments, based on the near field connection, the terminal device 700 may request to access the management interface of the AP 800 by using the fixed IP address of the AP 800, and the AP 800 may send the management interface data of the AP 800 to the terminal device 700.

The management interface data of the AP 800 is used to generate the management interface. The management interface data is sent to the terminal device 700, so that the terminal device 700 displays the management interface of the AP 800. The management interface of the AP 800 is used by the user to enter an activation code and/or setting information. The activation code corresponds to a profile, and the setting information is used to configure a parameter of the AP 800.

As described above, after purchasing the CPE, the user may purchase a package from an online store of an operator by using the terminal device 700, and may obtain an activation code, or the user may purchase a package from a physical operator store, and obtain an activation code.

After accessing the management interface of the AP 800 by using the terminal device 700, the user may perform an operation in the management interface of the AP 800, for example, an activation operation on a physical blank SIM or eSIM. As described above, the activation operation may be, for example, entering the activation code in the management interface of the AP 800 displayed by the terminal device 700. The setting operation may be, for example, setting, in the management interface of the AP 800 displayed by the terminal device 700, a user name and a password of the AP 800, and a maximum quantity of terminal devices 700 for which simultaneous access can be implemented.

The user may enter the activation code in the management interface of the AP 800 displayed by the terminal device 700. The terminal device 700 generates the activation instruction in response to the operation performed by the user, and sends the activation instruction to the AP 800 by using the near field connection. Correspondingly, the AP 800 receives the activation instruction from the terminal device 700 by using the near field connection.

The activation instruction is used to download the profile. The activation instruction may include a download instruction for the profile. The download instruction for the profile may carry the activation code, and may further include an activation instruction for the profile. The activation instruction for the profile may carry an integrated circuit card identity (ICCID) of the profile. The ICCID is a unique identifier of the profile. After the profile is configured in the SIM or the eSIM, it may be considered that the ICCID is a unique identifier of the SIM or the eSIM.

As described above, the activation instruction may specifically include the download instruction for the profile and the activation instruction for the profile. The download instruction for the profile may carry the activation code, and the activation instruction for the profile may carry the ICCID. The activation instruction may indicate the AP 800 to activate the blank SIM or the eSIM. The activation instruction may be understood as a carrier used to carry an activation code of the blank SIM or the eSIM. This is not limited in this application.

As described above, the activation instruction, an activation request, and the profile are activation data, and the management interface data and the setting information are setting data.

Optionally, a transmission path of the activation data is different from a transmission path of the setting data.

Step S804: The AP 800 sends an activation request to the operator server through the terminal device 700 based on the near field connection in response to the activation instruction.

The activation request is used to request to download the profile from the operator server. The AP 800 generates the activation request in response to the activation instruction sent by the terminal device 700. The activation request may be understood as a download request for the profile, or the activation request is a series of HTTP request data used to download the profile stored in the operator server. A destination address of the activation request is the operator server. The AP 800 currently has no network connection capability. Therefore, the AP 800 may first transmit the activation request to the terminal device 700 by using the near field secure transmission connection according to the routing rule pre-determined with the terminal device 700. The terminal device 700 may help the AP 800 forward the activation request to the operator server according to the routing rule. For example, the terminal device 700 may forward the activation request to the operator server by using a network of the terminal device 700.

Step S805: The AP 800 receives a profile from the operator server from the terminal device 700 based on the near field connection.

After check performed by the operator server on the activation request sent by the AP 800 to the operator server through the terminal device 700, the operator server may send the profile to the terminal device 700, and the terminal device 700 forwards the profile to the AP 800.

In a possible implementation, the AP 800 receives a fourth data packet from the operator server from the terminal device 700 based on the near field connection.

The fourth data packet may be specifically a data packet that is generated by the operator server and that is used to feed back the activation request, and the fourth data packet carries the profile. For example, after receiving the activation request sent by the AP 800, the operator server may respond to the activation request, and generate the corresponding data packet for feeding back the activation request. For example, the operator server checks request data sent by the AP 800. If the check succeeds, the operator server sends the profile to the AP 800. In this case, the fourth data packet includes the profile. If the check fails, the operator server feeds back data indicating that activation fails to the AP 800. In this case, the fourth data packet does not include the profile. For ease of differentiation and description, the data packet generated by the operator server for the activation request is recorded as the fourth data packet herein.

Step S806: The AP 800 activates the profile, and configures the profile in a subscriber identity module.

It should be understood that the subscriber identity module may be a physical blank SIM or an eSIM.

The AP 800 may activate the downloaded profile based on the activation instruction for the profile included in the activation instruction, and configure the activated profile in the subscriber identity module, to activate the blank SIM or the eSIM. This may also be understood as activation of the AP 800.

Based on steps S801 and S803 to S806, the terminal device 700 and the AP 800 may exchange data by using the near field transmission connection, so that the terminal device 700 and the AP 800 may serve as two peer network-connected parties, and serve as a server and a client for each other to provide respective services for each other. In this way, the user can perform an activation operation on the blank SIM or eSIM by using one terminal device 700 with a network connection capability.

In some embodiments, the user may further set a configuration parameter of the AP 800 by using the terminal device 700. The method shown in FIG. 22 may further include the following optional steps.

Optional step S807: The terminal device 700 sends the setting information to the AP 800 based on the near field transmission connection.

After accessing the management interface of the AP 800 by using the terminal device 700, the user may perform an operation in the management interface of the AP 800, for example, a setting operation on the CPE. As described above, the setting operation may be, for example, setting, in the management interface of the AP 800 displayed by the terminal device 700, a user name and a password of the AP 800, and a maximum quantity of terminal devices 700 for which simultaneous access can be implemented.

The setting information may be used to set or control the AP 800. For example, the setting information may include related information about setting the user name and the password of the AP 800. The setting information may further include related information about controlling the quantity of terminal devices 700 that can be simultaneously allowed to access the AP 800. This application includes but is not limited to this.

Optional step S808: The AP 800 sets the configuration parameter of the AP 800 based on the setting information.

For example, if the user wants to change a user name and a login password of the AP 800, the user may change, in the management interface of the AP 800 displayed by the terminal device 700, an initial user name and password of the AP 800 to a user name and a password defined by the user. The AP 800 may change the user name and the password of the AP 800 based on the setting information sent by the terminal device 700. After the change succeeds, the AP 800 may provide a service for the terminal device 700 based on the changed user name and password. The service may include a network service, or may include a display service of the management page of the AP 800 displayed by the terminal device 700.

Based on optional steps S807 and S808, the user may further set the configuration parameter of the AP 800 by using the terminal device 700. In this way, an actual requirement of the user can be met, and better user experience can be provided.

It should be understood that steps S801 and S803 to S806 may be understood as steps of activating the AP 800, and steps S807 and S808 may be understood as steps of setting the CPE. In a process of performing steps S801 and S803 to S806, steps S807 and S808 may also be performed, that is, in a process of performing an activation operation on the AP 800, a setting operation may be further performed on the AP 800.

It should be noted that the terminal device 700 in the network connection method provided in this embodiment of this application needs to be a terminal device 700 with a network connection capability, that is, the terminal device 700 may access the operator server in a plurality of manners such as a cellular mobile network, a WLAN, Ethernet, a USB, and Bluetooth, so that the terminal device 700 can help the CPE send the activation request to the operator server, and help the CPE receive the fourth data packet from the operator server. For example, the terminal device 700 may help the CPE forward the activation request to the operator server by using a cellular mobile network of the terminal device 700, and may further help the CPE receive the fourth data packet from the operator server by using the cellular mobile network of the terminal device 700. A network connection manner of the terminal device 700 is not limited in this application.

The AP 800 may be an AP 800 for which an eSIM is configured or into which a physical blank SIM is inserted. The terminal device 700 is a terminal device 700 with a network connection capability. The AP 800 may establish a near field connection to the terminal device 700, so that the terminal device 700 and the AP 800 may serve as two peer network-connected parties, and serve as a server and a client for each other to provide respective services for each other. The AP 800 may receive the activation instruction from the terminal device 700, further send the activation request to the operator server through the terminal device 700, receive the profile from the operator server through the terminal device 700, activate the profile, and configure the profile in the subscriber identity module in the AP 800, so that the AP 800 can be activated by using one terminal device 700 with a network connection capability. In addition, the AP 800 and the terminal device 700 establish a near field connection, and the AP 800 and the terminal device 700 may further determine the routing rule under a condition that the near field connection is established, to implement data exchange between the AP 800 and the terminal device 700, so that the terminal device 700 and the AP 800 may serve as two peer network-connected parties, and serve as a server and a client for each other to provide respective services for each other. Therefore, when the user performs the setting operation on the AP 800 by using the terminal device 700, no other device needs to be used to connect to a network to activate the blank SIM or the eSIM. When the user activates the blank SIM or the eSIM by using the network provided by the terminal device 700, no other device needs to be used to perform the setting operation on the AP 800. The user may activate the blank SIM or the eSIM and perform the setting operation on the AP 800 by using a same terminal device 700, that is, the AP 800 can be activated by using one terminal device 700. An operation is convenient, it is easier to meet an activation condition, and user experience is better.

Figure 23:
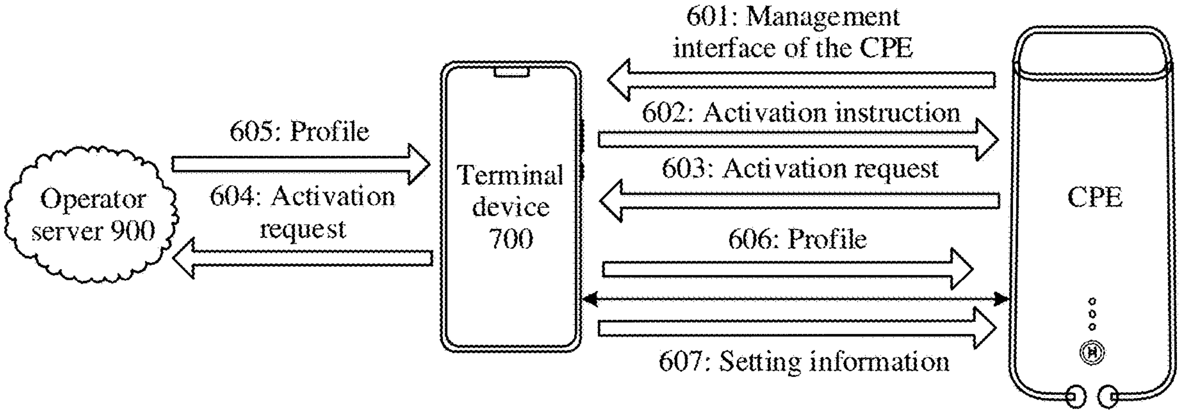
FIG. 23 is a schematic diagram of a scenario of a network connection method according to this application.

To better understand the method provided in embodiments of this application, the following provides descriptions with reference to a specific scenario. FIG. 23 is a schematic diagram of a scenario of a network connection method according to an embodiment of this application. As shown in FIG. 23, in this application scenario, CPE is used as an example of an AP 800, and there is a near field transmission connection between a terminal device 700 and the CPE.

In step 601, the CPE may send management interface data of the CPE to the terminal device 700 by using a near field transmission module, so that the terminal device 700 displays a management interface of the CPE, and a user may enter an activation code in the management interface that is of the CPE and that is displayed by the terminal device 700, or a user may scan a two-dimensional code carrying an activation code by using a scanning function in the management interface of the CPE, to identify the activation code.

It should be understood that the terminal device 700 displays the management interface of the CPE not only when the CPE sends the management interface data to the terminal device 700, but also when the terminal device 700 scans a two-dimensional code carrying the management interface of the CPE, or the terminal device 700 may respond to an operation of entering, by the user, a website address of the management interface of the CPE in a browser in the terminal device 700, or the like. It should be further understood that in some possible implementations, step **60*i*** may not be performed. This is not limited in this application.

In step 602, in response to the operation performed by the user, the terminal device 700 may generate an activation instruction, and send the activation instruction to the CPE.

It should be understood that step 601 and step 602 merely provide a method for receiving, by the CPE, the activation instruction from the terminal device 700, but should not constitute a limitation on this application.

In step 603, the CPE may generate an activation request based on the activation instruction, and may transmit the activation request to the terminal device 700 by using the near field transmission module.

In step 604, the terminal device 700 may forward the activation request of the CPE to an operator server.

In step 605, the operator server may check data carried in the activation request sent by the CPE. If the check succeeds, the operator server may send a profile to the terminal device 700.

In step 606, the terminal device 700 may forward the profile to the CPE, to activate a blank SIM or an eSIM.

It should be noted that in a process in which the CPE sends the activation request to the operator server through the terminal device 700 and obtains the profile from the operator server through the terminal device 700, the terminal device 700 may further perform a setting operation on the CPE. That is, in a process of performing an activation operation, a setting operation may be further performed. For example, in a process of performing step 602 to step 606, step 607 may be further performed.

In step 607, the user may perform a setting operation on the CPE in the management interface that is of the CPE and that is displayed by the terminal device 700. In response to the operation performed by the user, the terminal device 700 generates setting information, and transmits the setting information to the CPE by using a near field transmission module, to set the CPE.

It should be understood that FIG. 23 is merely an example, and step 610 to step 607 are merely possible implementation steps, and should not constitute any limitation on this application.

Figure 24A:
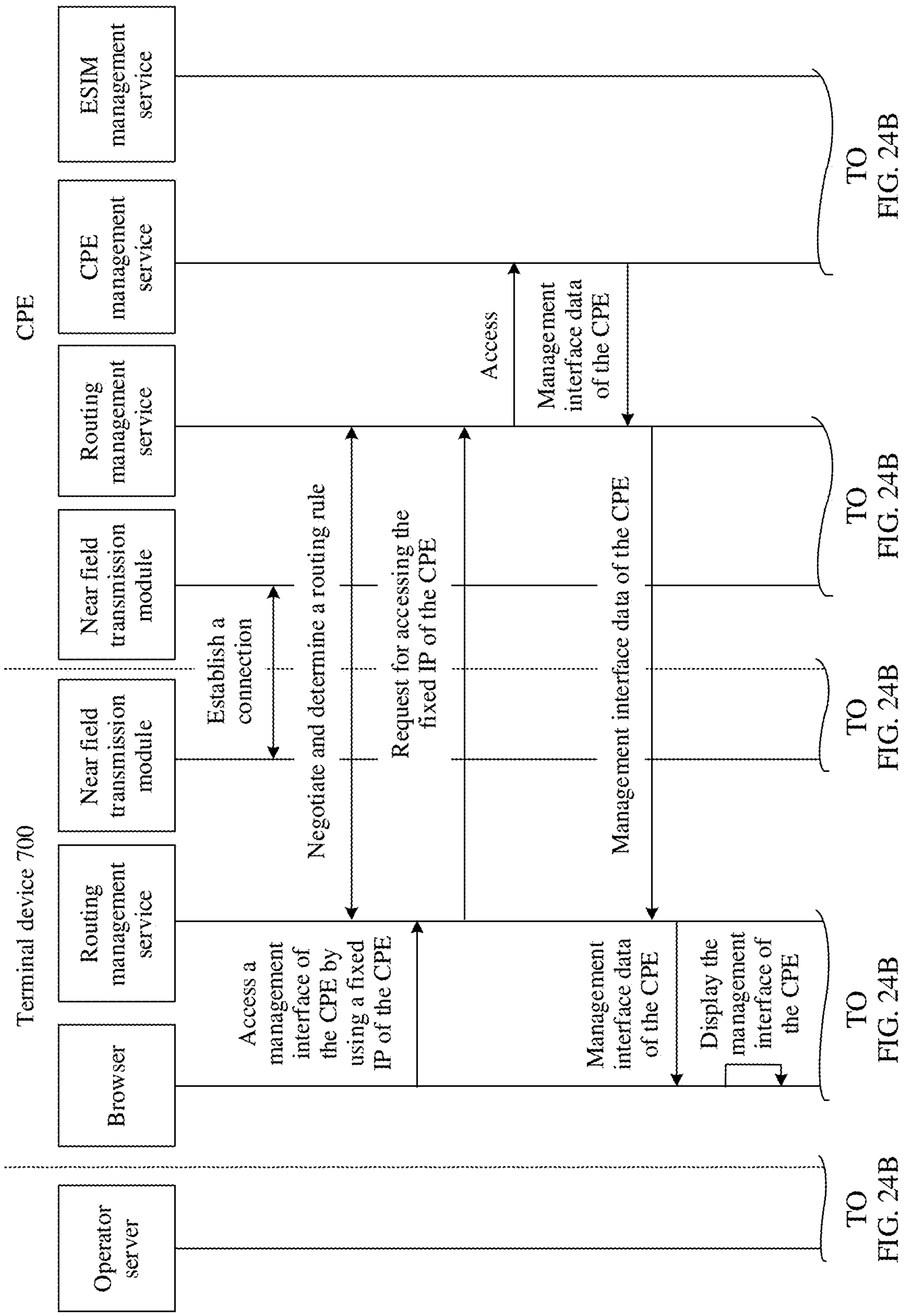
FIG. 24A and FIG. 24B are a schematic diagram of an interaction procedure among CPE, a terminal, and an operator server according to an embodiment of this application.
Figure 24B:
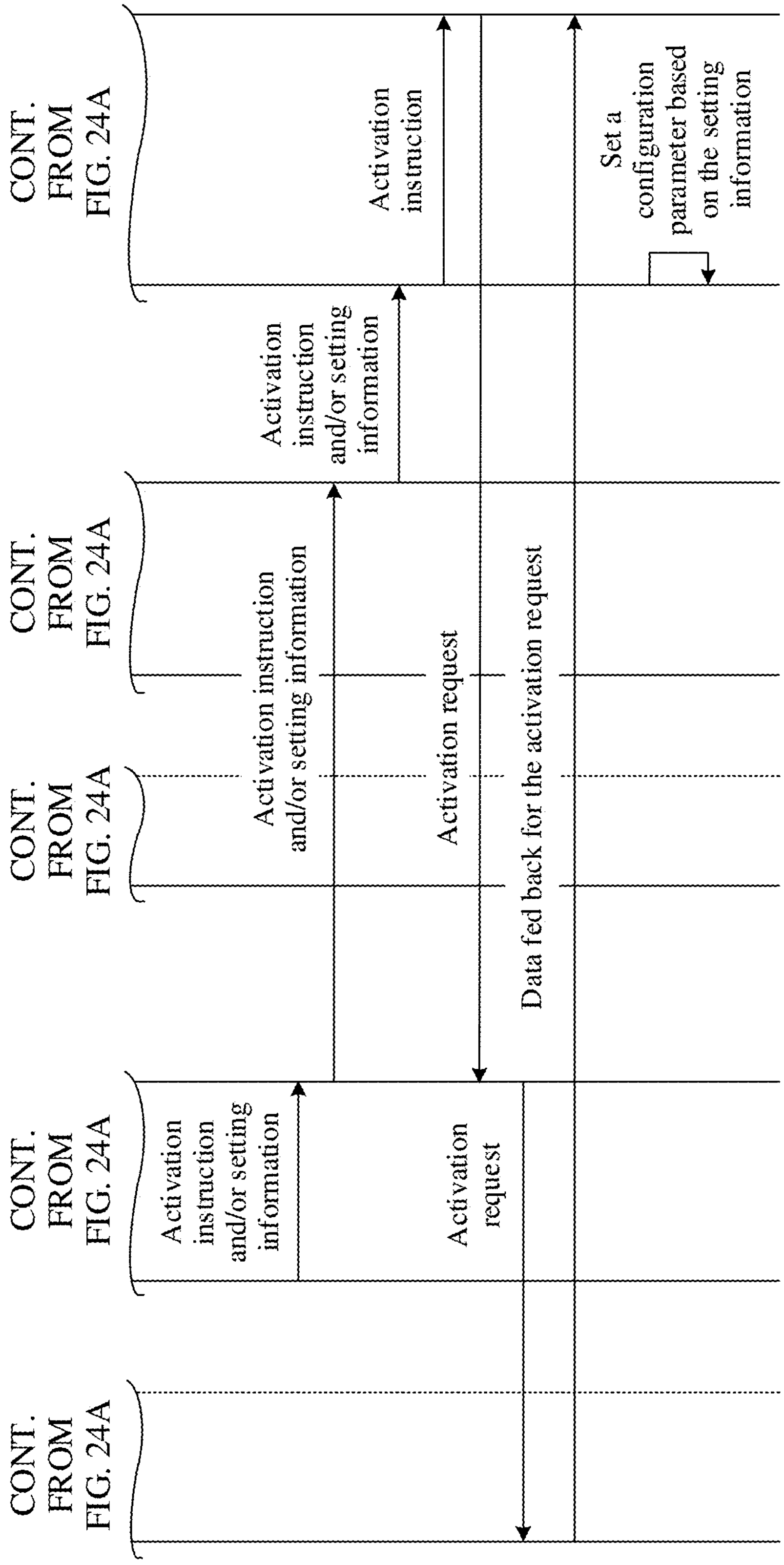

The following uses the CPE as an example of the AP 800 again to describe, with reference to FIG. 24A and FIG. 24B, the network connection method provided in embodiments of this application. It should be understood that the CPE in FIG. 24A and FIG. 24B is CPE that supports an eSIM.

As shown in FIG. 24A and FIG. 24B, a near field transmission module in the CPE may first establish a connection to a near field transmission module in a terminal device 700, so that data to be exchanged between the CPE and the terminal device 700 may be subsequently transmitted based on the near field connection. After the near field connection is established between the CPE and the terminal device 700, a routing management service in the CPE and a routing management service in the terminal device 700 may negotiate and determine a routing rule, and subsequently data to be exchanged between the CPE and the terminal device 700 may be transmitted according to the determined routing rule. A user may access a management interface of the CPE by using a browser in the terminal device 700 and a fixed IP address of the CPE. The routing management service in the terminal device 700 sends a request for accessing the fixed IP address of the CPE to the routing management service in the CPE. The routing management service in the CPE accesses a CPE management service in the CPE. The CPE management service sends management interface data of the CPE to the routing management service in the CPE, then the routing management service in the CPE sends the management interface data to the routing management service in the terminal device 700, and then the routing management service in the terminal device 700 sends the management interface data to the browser in the terminal device 700, so that the browser in the terminal device 700 can display the management interface of the CPE. In response to an activation operation and/or a setting operation performed by the user in the management interface that is of the CPE and that is displayed by the terminal device 700, the browser in the terminal device 700 sends a generated activation instruction and/or setting information to the routing management service in the CPE through the routing management service and the near field transmission module in the terminal device 700 and the near field transmission module in the CPE. The CPE management service in the CPE sends the activation instruction to an eSIM management service in the CPE. The eSIM management service in the CPE generates, based on the activation instruction sent by the terminal device 700, an activation request to be sent to an operator server, and sends the activation request to the operator server through the terminal device 700 by using a cellular mobile network of the terminal device 700. The operator server sends, through the terminal device 700, data for feeding back the activation request to the eSIM management service in the CPE. In a process in which the CPE performs data interaction with the operator server through the terminal device 700 based on the activation instruction, the CPE management service in the CPE may set a configuration parameter of the CPE management service based on the setting information sent by the terminal device 700.

It should be understood that as described above, the terminal device 700 in the network connection method provided in embodiments of this application needs to be a terminal device 700 with a network connection capability, that is, the terminal device 700 may access the operator server in a plurality of manners such as a cellular mobile network, a WLAN, Ethernet, a USB, and Bluetooth. In the foregoing descriptions, that “the activation request is sent to the operator server through the terminal device 700 by using a cellular mobile network of the terminal device 700" is merely an example. If the terminal device 700 accesses the Ethernet by using a network cable, the activation request may be sent to the operator server through Ethernet to which the terminal device 700 connects. This is not limited in this application, provided that the terminal device 700 is a terminal device 700 with a network connection capability, and can access the operator server.

It should be further understood that the steps in the foregoing methods may be completed by using an integrated logic circuit of hardware in the processor, or by using instructions in a form of software. The steps in the methods disclosed with reference to embodiments of this application may be directly performed and completed by a hardware processor, or may be performed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory, and completes the steps in the foregoing methods in combination with the hardware in the processor. To avoid repetition, details are not described herein.

Optionally, the AP 800 is further configured to send management interface data of the AP 800 to the terminal device 700. The terminal device 700 is further configured to display a management interface based on the received management interface data. The management interface is used to enter an activation code and/or setting information. The activation code corresponds to a profile, and the setting information is used to configure a parameter of the AP 800.

Optionally, the activation instruction, the activation request, and the profile are activation data, the management interface data and the setting information are setting data, and a transmission path of the activation data is different from a transmission path of the setting data.

In the network connection method shown in FIG. 22, FIG. 23, FIG. 24A, and FIG. 24B, in a process in which the AP 800 borrows the network connection capability of the terminal device 700 to activate the eSIM or the blank SIM, each device differently processes a data packet.

Figure 25:
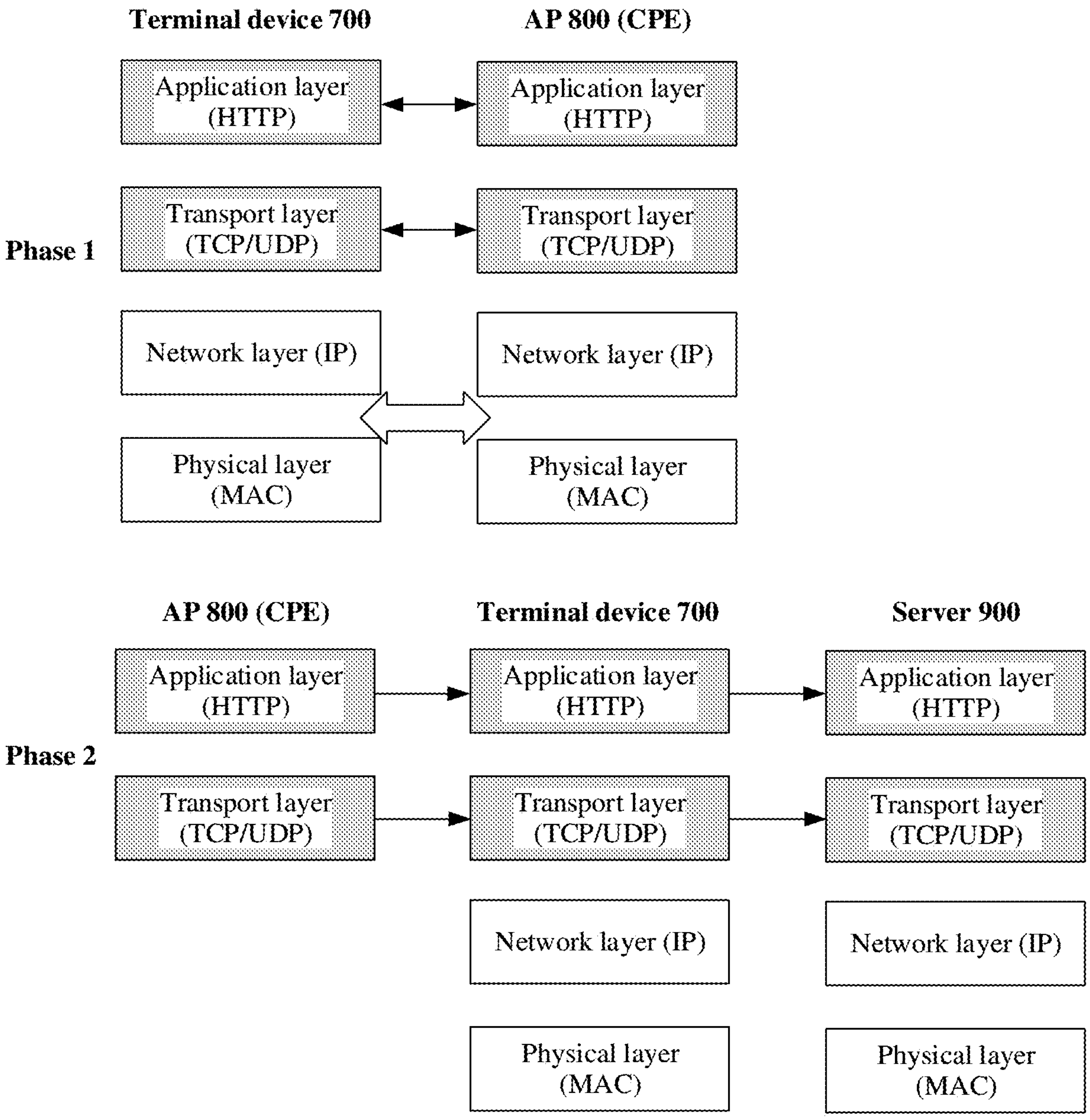
FIG. 25 shows a manner of processing a data packet by each device in a process in which an AP 800 borrows a network connection capability of a terminal device 700 to activate an eSIM or a blank SIM.

FIG. 25 shows an example of a manner of processing a data packet by each device in a process in which an AP 800 borrows a network connection capability of a terminal device 700 to activate an eSIM or a blank SIM.

As shown in FIG. 25, the process in which the AP 800 borrows the network connection capability of the terminal device 700 to activate the eSIM or the blank SIM is divided into two phases.

In one phase, the AP 800 sends the management interface data to the terminal device 700, the terminal device 700 serves as a client, and the AP 800 serves as a server. In this phase, a data packet may be transmitted between the terminal device 700 and the AP 800 by using a four-layer model, or a data packet may be transmitted by using only an application layer and a transport layer. Data transmission at a network layer and a physical layer that are at a bottom layer is replaced with a near field transmission connection between the terminal device 700 and the AP 800.

In the other phase, the AP 800 obtains the profile from the server 900 through the terminal device 700, the terminal device 700 serves as a server, and the AP 800 serves as a client. In this phase, because the AP 800 does not have a network connection capability, the AP 800 performs processing only at the application layer and the transport layer on the data packet, and does not perform processing at the network layer and the physical layer, and the terminal device 700 performs processing at the network layer and the physical layer on the data packet. The terminal device 700 may perform processing at the network layer and the physical layer on a data packet from the internet or the AP 800, and then send the data packet to the AP 800 or the internet. The server 900 may perform processing at the foregoing four layers on the data packet.

In the embodiments shown in FIG. 18 to FIG. 25 in this application, the AP 800 may also be referred to as a first device, and the terminal device 700 may also be referred to as a second device. The near field transmission connection between the AP 800 and the terminal device 700 may also be referred to as a first communication connection.

It should be understood that the steps in the foregoing method embodiments may be completed by using an integrated logic circuit of hardware in the processor, or by using instructions in a form of software. The steps in the methods disclosed with reference to embodiments of this application may be directly performed and completed by a hardware processor, or may be performed and completed by using a combination of hardware in the processor and a software module.

This application further provides an electronic device. The electronic device may include a memory and a processor. The memory may be configured to store a computer program. The processor may be configured to invoke the computer program in the memory, so that the electronic device performs the method performed by any one of the terminal device 100, the terminal device 200, the network device 300, the terminal device 400, the terminal device 500, the AP 600, the terminal device 700, the AP 800, or the server 900 in any one of the foregoing embodiments.

This application further provides a chip system. The chip system includes at least one processor, configured to implement a function in the method performed by any one of the terminal device 100, the terminal device 200, the network device 300, the terminal device 400, the terminal device 500, the AP 600, the terminal device 700, the AP 800, or the server 900 in any one of the foregoing embodiments, for example, receive or process data and/or information in the foregoing method.

In a possible design, the chip system further includes a memory. The memory is configured to store program instructions and data, and the memory is located inside the processor or outside the processor.

The chip system may include a chip, or may include a chip and another discrete component.

Optionally, there may be one or more processors in the chip system. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may also be one or more memories in the chip system. The memory may be integrated with the processor, or may be disposed separately from the processor. This is not limited in this embodiment of this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this embodiment of this application.

For example, the chip system may be a field programmable gate array (FPGA), an application-specific integrated circuit (ASIC), a system-on-a-chip (SoC), a central processing unit (CPU), a network processor (NP), a digital signal processing circuit, a microcontroller unit (MCU), a programmable controller (PLD), or another integrated chip.

This application further provides a computer program product. The computer program product includes a computer program (which may also be referred to as code or an instruction). When the computer program is run, a computer is enabled to perform the method performed by any one of the terminal device 100, the terminal device 200, the network device 300, the terminal device 400, the terminal device 500, the AP 600, the terminal device 700, the AP 800, or the server 900 in any one of the foregoing embodiments.

This application further provides a computer-readable storage medium. The computer-readable storage medium stores a computer program (which may also be referred to as code or an instruction). When the computer program is run, a computer is enabled to perform the method performed by any one of the terminal device 100, the terminal device 200, the network device 300, the terminal device 400, the terminal device 500, the AP 600, the terminal device 700, the AP 800, or the server 900 in any one of the foregoing embodiments.

It should be understood that the processor in embodiments of this application may be an integrated circuit chip, and has a signal processing capability. In an implementation process, the steps in the foregoing method embodiments may be completed by using an integrated logic circuit of hardware in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory, and completes the steps in the foregoing methods in combination with the hardware in the processor.

In addition, an embodiment of this application further provides an apparatus. The apparatus may be specifically a component or a module, and the apparatus may include one or more processors and memories that connect to each other. The memory is configured to store a computer program. When the computer program is executed by one or more processors, the apparatus is enabled to perform the network connection method in the foregoing method embodiments.

The apparatus, the computer-readable storage medium, the computer program product, or the chip provided in embodiments of this application is configured to perform the corresponding method provided above. Therefore, for beneficial effects that can be achieved by the apparatus, the computer-readable storage medium, the computer program product, or the chip, refer to the beneficial effects in the corresponding method provided above. Details are not described herein.

The implementations of this application may be randomly combined, to achieve different technical effects.

All or some of the foregoing embodiments may be implemented by using software, hardware, firmware, or any combination thereof. When the foregoing embodiments are implemented by using software, all or some of the foregoing embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, into which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the procedures of the methods in the foregoing embodiments may be implemented by a computer program by instructing related hardware. The program may be stored in a computer-readable storage medium. When the program is executed, the procedures in the foregoing method embodiments may be performed. The foregoing storage medium includes any medium that can store program code, for example, a ROM, a random access memory RAM, a magnetic disk, or an optical disc.

In conclusion, the foregoing descriptions are merely embodiments of the technical solutions of this application, and are not intended to limit the protection scope of this application. Any modification, equivalent replacement, improvement, and the like made based on the disclosure of this application shall fall within the protection scope of this application.

What is claimed is:

1. A first device, comprising:

a first Wi-Fi network interface controller;

at least one memory storing program instructions; and at least one processor configured to execute the program instructions, to cause the first device to perform:

enabling a distributed networking capability, wherein the distributed networking capability is configured to support the first device and a second device that accesses the internet in establishing a first communication connection, the first communication connection comprises a wireless fidelity peer-to-peer (Wi-Fi P2P) connection, the first Wi-Fi network interface controller of the first device is configured to support the first device and the second device in establishing the first communication connection, wherein the second device is configured to access a cellular network and communicate with the internet through the cellular network, the second device comprises a second Wi-Fi network interface controller and a cellular network interface controller, and the second Wi-Fi network interface controller of the second device is configured to receive a data packet from the first Wi-Fi network interface controller of the first device;

prompting a user that the distributed networking capability and a wireless local area network (WLAN) capability are both enabled;

communicating with the internet through the first communication connection established with the second device, wherein the first device accesses the internet through the second device;

while communicating through the first communication connection established with the second device, accessing the internet based on a wireless local area network (WLAN) to which the first device connects; and displaying, in a status bar, network quality of the cellular network of the second device that is shared and network quality of the WLAN.

2. The first device according to claim 1, wherein the second Wi-Fi network interface controller of the second device is a physical Wi-Fi network interface controller, or is a virtual Wi-Fi network interface controller obtained by virtualizing some apparatuses in a physical Wi-Fi network interface controller in the second device that supports a Wi-Fi P2P technical standard; or the first Wi-Fi network interface controller of the first device is a physical Wi-Fi network interface controller, or is a virtual Wi-Fi network interface controller obtained by virtualizing some apparatuses in a physical Wi-Fi network interface controller in the first device that supports a Wi-Fi P2P technical standard.

3. The first device according to claim 1, wherein the at least one processor is further configured to execute the program instructions, to cause the first device to perform:

displaying, in the status bar, an identifier of the cellular network of the second device that is shared or an identifier of a terminal device that provides the cellular network.

4. The first device according to claim 1, wherein the first device and the second device are logged in to a same system account.

5. The first device according to claim 1, wherein the second device is further configured to transparently transmit data packets of communication between the first device and the internet.

6. The first device according to claim 1, wherein the at least one processor is further configured to execute the program instructions, to cause the first device to perform:

receiving networking capability information sent by the second device, the networking capability information comprising one or more of the following: a networking manner of the second device, an identifier of a network to which the second device connects and that accesses the internet, or quality of the network to which the second device connects and that accesses the internet.

7. The first device according to claim 1, wherein the at least one processor is further configured to execute the program instructions, to cause the first device to perform:

receiving networking capability information sent by a third device, wherein the networking capability information sent by the third device indicates whether the third device connects to a network; and selecting the second device from a network-connected device.

8. The first device according to claim 1, wherein the at least one processor is further configured to execute the program instructions, to cause the first device to perform:

receiving an activation instruction from the second device based on the first communication connection;

sending an activation request to an operator server through the second device based on the first communication connection in response to the activation instruction, wherein the activation request is used to request to download a profile from the operator server;

receiving the profile from the operator server through the second device based on the first communication connection; and performing activation by using the profile, wherein the activated first device has a network connection capability.

9. The first device according to claim 8, wherein the at least one processor is further configured to execute the program instructions, to cause the first device to perform:

before receiving the activation instruction, sending management interface data to the second device based on the first communication connection, wherein the management interface data is used to generate a management interface, the management interface is used to enter an activation code or setting information, the activation code corresponds to the profile, and the setting information is used to configure a parameter of the first device.

10. A method, performed by a first device, the method comprising:

enabling a distributed networking capability, wherein the distributed networking capability supports the first device and a second device that accesses the internet in establishing a first communication connection, the first communication connection comprises a wireless fidelity peer-to-peer (Wi-Fi P2P) connection, a first Wi-Fi network interface controller of the first device supports the first device and the second device in establishing the first communication connection, wherein the second device accesses a cellular network and communicates with the internet through the cellular network, the second device comprises a second Wi-Fi network interface controller and a cellular network interface controller, and the second Wi-Fi network interface controller of the second device is configured to receive a data packet from the first Wi-Fi network interface controller of the first device;

prompting a user that the distributed networking capability and a wireless local area network (WLAN) capability are both enabled;

communicating with the internet through the first communication connection established with the second device, wherein the first device accesses the internet through the second device;

while communicating through the first communication connection established with the second device, accessing the internet based on a wireless local area network (WLAN) to which the first device connects; and displaying, in a status bar, network quality of the cellular network of the second device that is shared and network quality of the WLAN.

11. The method according to claim 10, wherein the second Wi-Fi network interface controller of the second device is a physical Wi-Fi network interface controller, or is a virtual Wi-Fi network interface controller obtained by virtualizing some apparatuses in a physical Wi-Fi network interface controller in the second device that supports a Wi-Fi P2P technical standard; or the first Wi-Fi network interface controller of the first device is a physical Wi-Fi network interface controller, or is a virtual Wi-Fi network interface controller obtained by virtualizing some apparatuses in a physical Wi-Fi network interface controller in the first device that supports a Wi-Fi P2P technical standard.

12. The method according to claim 10, further comprising:

displaying, in the status bar, an identifier of the cellular network of the second device that is shared or an identifier of a terminal device that provides the cellular network.

13. The method according to claim 10, wherein the first device and the second device are logged in to a same system account.

14. The method according to claim 10, wherein the second device transparently transmits data packets of communication between the first device and the internet.

15. The method according to claim 10, further comprising:

receiving networking capability information sent by the second device, the networking capability information comprising one or more of the following: a networking manner of the second device, an identifier of a network to which the second device connects and that accesses the internet, or quality of the network to which the second device connects and that accesses the internet.

16. The method according to claim 10, further comprising:

receiving networking capability information sent by a third device, wherein the networking capability information sent by the third device indicates whether the third device connects to a network; and selecting the second device from a network-connected device.

17. The method according to claim 10, further comprising:

receiving an activation instruction from the second device based on the first communication connection;

sending an activation request to an operator server through the second device based on the first communication connection in response to the activation instruction, wherein the activation request is used to request to download a profile from the operator server;

receiving the profile from the operator server through the second device based on the first communication connection; and performing activation by using the profile, wherein the activated first device has a network connection capability.

18. The method according to claim 17, further comprising:

before receiving the activation instruction, sending management interface data to the second device based on the first communication connection, wherein the management interface data is used to generate a management interface, the management interface is used to enter an activation code or setting information, the activation code corresponds to the profile, and the setting information is used to configure a parameter of the first device.

19. A non-transitory computer readable storage medium storing instructions that are executable by at least one processor, wherein execution of the instructions causes a first device to:

enable a distributed networking capability, wherein the distributed networking capability supports the first device and a second device that accesses the internet in establishing a first communication connection, the first communication connection comprises a wireless fidelity peer-to-peer (Wi-Fi P2P) connection, a first Wi-Fi network interface controller of the first device supports the first device and the second device in establishing the first communication connection, wherein the second device accesses a cellular network and communicates with the internet through the cellular network, the second device comprises a second Wi-Fi network interface controller and a cellular network interface controller, and the second Wi-Fi network interface controller of the second device is configured to receive a data packet from the first Wi-Fi network interface controller of the first device;

prompt a user that the distributed networking capability and a wireless local area network (WLAN) capability are both enabled;

communicate with the internet through the first communication connection established with the second device, wherein the first device accesses the internet through the second device;

while communicating through the first communication connection established with the second device, access the internet based on a wireless local area network (WLAN) to which the first device connects; and display, in a status bar, network quality of the cellular network of the second device that is shared and network quality of the WLAN.

20. The non-transitory computer readable storage medium according to claim 19, wherein the second Wi-Fi network interface controller of the second device is a physical Wi-Fi network interface controller, or is a virtual Wi-Fi network interface controller obtained by virtualizing some apparatuses in a physical Wi-Fi network interface controller in the second device that supports a Wi-Fi P2P technical standard; or the first Wi-Fi network interface controller of the first device is a physical Wi-Fi network interface controller, or is a virtual Wi-Fi network interface controller obtained by virtualizing some apparatuses in a physical Wi-Fi network interface controller in the first device that supports a Wi-Fi P2P technical standard.

* * * * *